US010954090B2

(12) United States Patent
Anouar et al.

(10) Patent No.: US 10,954,090 B2
(45) Date of Patent: Mar. 23, 2021

(54) ACTIVE STEERING SYSTEM

(71) Applicant: Crane Payment Innovations, Inc., Malvern, PA (US)

(72) Inventors: Fatiha Anouar, Glenmoore, PA (US); Mustafa Emresoy, Philadelphia, PA (US); Michael David Nunn, West Chester, PA (US); Ruben-Dario Gonzalez-Lizcano, Chesterbrook, PA (US); Vasily Bobryshev, Downingtown, PA (US)

(73) Assignee: Crane Payment Innovations, Inc., Malvern, PA (US)

( * ) Notice: Subject to any disclaimer, the term of this patent is extended or adjusted under 35 U.S.C. 154(b) by 0 days.

(21) Appl. No.: 16/178,465

(22) Filed: Nov. 1, 2018

(65) Prior Publication Data
US 2019/0325687 A1    Oct. 24, 2019

Related U.S. Application Data

(60) Provisional application No. 62/660,781, filed on Apr. 20, 2018.

(51) Int. Cl.
*B65H 9/00* (2006.01)
*B65H 5/06* (2006.01)
(Continued)

(52) U.S. Cl.
CPC ............ *B65H 9/002* (2013.01); *B65H 5/06* (2013.01); *B65H 7/06* (2013.01); *B65H 9/166* (2013.01);
(Continued)

(58) Field of Classification Search
CPC ... B65H 7/02; B65H 7/10; B65H 7/06; B65H 7/08; B65H 7/20; B65H 9/002; B65H 9/166; B65H 2511/242; B65H 2553/42
See application file for complete search history.

(56) References Cited

U.S. PATENT DOCUMENTS 5,293,431 A    3/1994    Hayduchok et al.
5,649,026 A    7/1997    Heins, III
(Continued)

FOREIGN PATENT DOCUMENTS

JP    2015099425 A    5/2015

OTHER PUBLICATIONS

Notification of Transmittal of the International Search Report and the Written Opinion of the International Searching Authority, or the Declaration dated Jan. 17, 2019 in connection with International Patent Application No. PCT/US2018/058802, 13 pages.
(Continued)

*Primary Examiner* — Jeremy R Severson

(57) ABSTRACT

This disclosure relates to a banknote validator. The banknote validator comprises a banknote path formed within an interior of the banknote validator to transport a banknote from an opening of the banknote path through the interior of the banknote validator, one or more banknote edge detection surfaces each configured to provide images of edges of a banknote in the banknote path, an image sensor configured to capture the images of the edges of the banknote provided by the one or more banknote edge detection surfaces, a steerable drive wheel at least partially disposed within the banknote path, the steerable drive wheel operable to reorient a banknote in the banknote path, and the steerable drive wheel operable to move from a first position to a second position to angle the steerable drive wheel in relation to the banknote path.

24 Claims, 54 Drawing Sheets

(51) Int. Cl.
    *B65H 7/06*            (2006.01)
    *B65H 9/16*            (2006.01)

(52) U.S. Cl.
    CPC .............. *B65H 2404/15212* (2013.01); *B65H 2511/242* (2013.01); *B65H 2553/42* (2013.01); *B65H 2701/1912* (2013.01)

(56) References Cited

U.S. PATENT DOCUMENTS

| | | | |
|---|---|---|---|
| 6,053,494 | A | 4/2000 | Baskette et al. |
| 6,441,891 | B1 | 8/2002 | Levasseur et al. |
| 6,498,867 | B1 | 12/2002 | Potucek et al. |
| 6,512,539 | B1 | 1/2003 | Dance et al. |
| 6,581,930 | B2 | 6/2003 | Kim |
| 6,757,419 | B1 | 6/2004 | Ross et al. |
| 6,779,791 | B2 | 8/2004 | Kawamura et al. |
| 6,891,180 | B2 | 5/2005 | Holl et al. |
| 7,006,111 | B1 | 2/2006 | Rothrock |
| 7,014,189 | B2 | 3/2006 | Liu et al. |
| 7,929,749 | B1 * | 4/2011 | Jones ............... G07D 11/28 382/135 |
| 8,232,867 | B2 | 7/2012 | Ashby et al. |
| 8,331,643 | B2 | 12/2012 | Yacoubian et al. |
| 8,401,268 | B1 | 3/2013 | Yacoubian et al. |
| 8,417,016 | B2 | 4/2013 | Bell et al. |
| 8,817,277 | B2 * | 8/2014 | Matsushima ........ B65H 7/08 271/171 |
| 8,910,936 | B2 * | 12/2014 | Tsou ............... B65G 47/24 271/227 |
| 9,714,149 | B2 * | 7/2017 | Gillier .............. B65H 9/16 |
| 9,868,604 | B2 | 1/2018 | Repetyuk et al. |
| 9,904,989 | B2 | 2/2018 | Holl |
| 2002/0060417 | A1 * | 5/2002 | Hiramitsu .......... B65H 9/002 271/227 |
| 2003/0053045 | A1 | 3/2003 | Doering |
| 2003/0057637 | A1 | 3/2003 | Kawamura et al. |
| 2004/0051862 | A1 | 3/2004 | Alcock et al. |
| 2004/0211839 | A1 | 10/2004 | Liu et al. |
| 2004/0238619 | A1 | 12/2004 | Nagasaka et al. |
| 2004/0240722 | A1 * | 12/2004 | Tsuji ............... G07D 7/121 382/137 |
| 2009/0022390 | A1 | 1/2009 | Yacoubian et al. |
| 2009/0324053 | A1 | 12/2009 | Ross et al. |
| 2012/0140254 | A1 | 6/2012 | Matsushima |
| 2013/0038913 | A1 | 2/2013 | Shimoda et al. |
| 2014/0168719 | A1 | 6/2014 | Miura et al. |
| 2015/0310242 | A1 | 10/2015 | Wehrle |
| 2016/0063791 | A1 | 3/2016 | Su et al. |
| 2016/0353945 | A1 * | 12/2016 | Osborne, Jr. ........ B65H 20/02 |
| 2018/0124266 | A1 | 5/2018 | Seremet |

OTHER PUBLICATIONS

Non-final Office Action in connection with U.S. Appl. No. 16/178,471 dated Apr. 13, 2020, 13 pages.
Non-final Office Action in connection with U.S. Appl. No. 16/178,479 dated May 15, 2020, 24 pages.
International Search Report and Written Opinion of the International Searching Authority in connection with International Application No. PCT/US2018/058796 dated Jan. 18, 2019, 11 pages.
International Preliminary Report on Patentability in connection with International Application No. PCT/US2018/058796 dated Oct. 29, 2020, 11 pages.
International Search Report and Written Opinion of the International Searching Authority in connection with International Application No. PCT/US2018/058799 dated Jan. 18, 2019, 11 pages.
International Preliminary Report on Patentability in connection with International Application No. PCT/US2018/058799 dated Oct. 29, 2020, 11 pages.
International Preliminary Report on Patentability in connection with International Application No. PCT/US2018/058802 dated Oct. 29, 2020, 12 pages.
Final Office Action dated Nov. 27, 2020 in connection with U.S. Appl. No. 16/178,479, 26 pages.

* cited by examiner

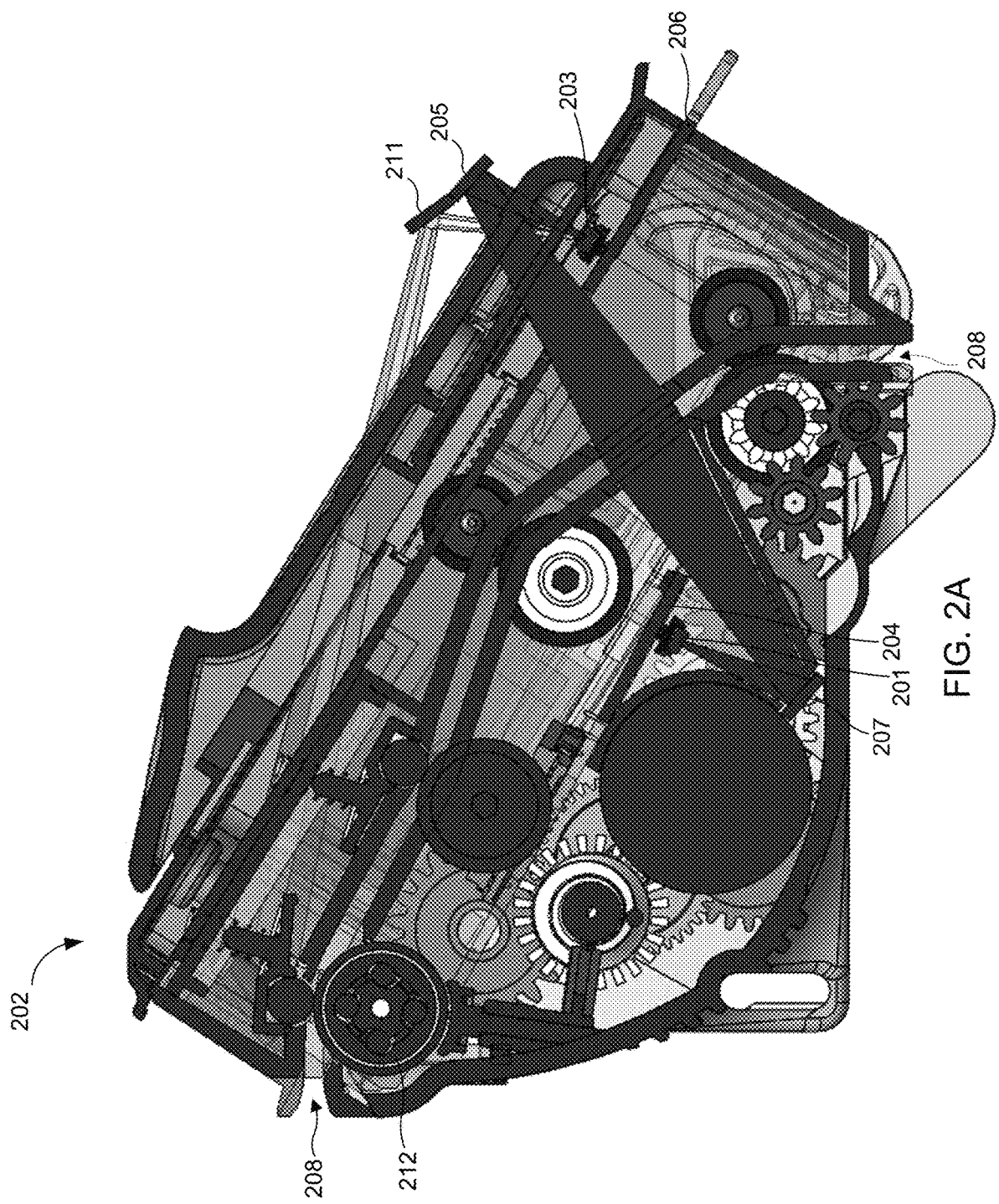

ACTIVE STEERING SYSTEM

CROSS-REFERENCE TO RELATED APPLICATIONS

This application claims priority to U.S. Provisional Patent Application No. 62/660,781, filed Apr. 20, 2018, entitled, MULTI-PURPOSE IMAGING METHOD AND SYSTEM FOR BANKNOTE VALIDATOR, which is incorporated herein by reference in its entirety.

TECHNICAL FIELD

This disclosure is generally directed to automated payment systems. More specifically, this disclosure is directed to an active steering system for a banknote validator.

SUMMARY

This disclosure provides an active steering system for a banknote validator.

In one aspect thereof, a banknote validator is provided. The banknote validator comprises a banknote path formed within an interior of the banknote validator to transport a banknote from an opening of the banknote path through the interior of the banknote validator, one or more banknote edge detection surfaces each configured to provide images of edges of a banknote in the banknote path, an image sensor configured to capture the images of the edges of the banknote provided by the one or more banknote edge detection surfaces, a steerable drive wheel at least partially disposed within the banknote path, the steerable drive wheel operable to reorient a banknote in the banknote path, and a steerable drive wheel operable to move from a first position to a second position to angle the steerable drive wheel in relation to the banknote path.

In another aspect thereof, a method of a banknote validator comprises reorienting a banknote in a banknote path, wherein the banknote path is formed within an interior of the banknote validator, and wherein reorienting the banknote in the banknote path includes capturing by an image sensor one or more images of edges of a banknote in the banknote path, the one or more images provided by one or more edge detection surfaces, controlling a steerable drive wheel to move from a first position to a second position, and angling, as a result of moving the steerable drive wheel from the first position to the second position, the steerable drive wheel in relation to the banknote path, and transporting the banknote from an opening of the banknote path through an interior of the banknote validator.

Other technical features may be readily apparent to one skilled in the art from the following figures, descriptions, and claims.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 2A illustrates a side cross-section view of a banknote validator according to embodiments of the present disclosure;

Figure 1A:
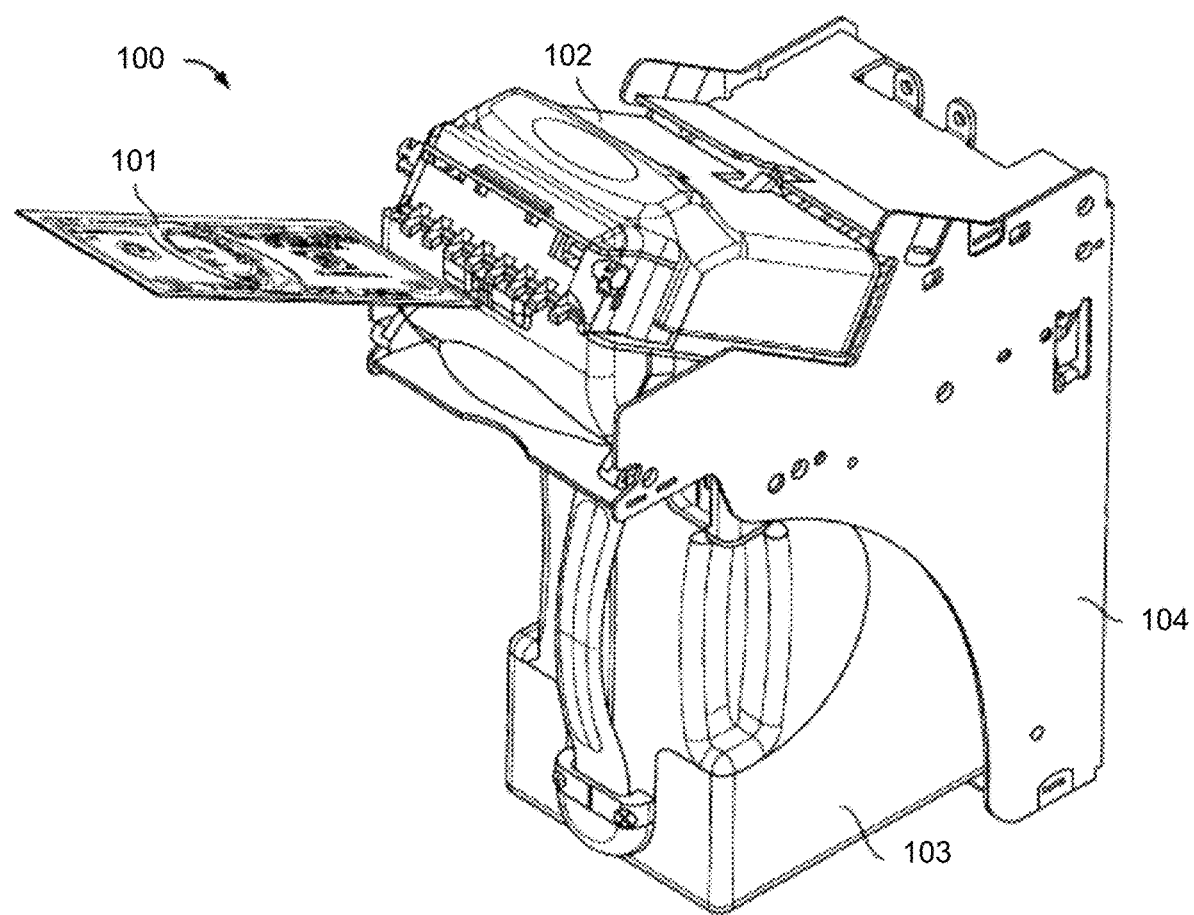
FIG. 1A illustrates an example of a currency handling apparatus according to various embodiments of the present disclosure.

Before undertaking the DETAILED DESCRIPTION below, it may be advantageous to set forth definitions of certain words and phrases used throughout this patent document. The term "couple" and its derivatives refer to any direct or indirect communication or interaction between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of non-volatile/memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

FIGS. 1A through 34, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged cashbox apparatus.

As used throughout this specification, the terms currency denomination, denomination of currency, valuable document, currency bill, bill, banknote, note, bank check, paper money, paper currency, and cash may be used interchangeably herein to refer to a type of a negotiable instrument or any other writing that evidences a right to the payment of a monetary obligation, typically issued by a central banking authority. As used throughout this specification, the terms camera, image sensor, high resolution sensor, multiple resolution sensor, fixed resolution sensor, photo sensor, photo detector, complementary metal-oxide-semiconductor sensor, CMOS sensor, charge-coupled device sensor and CCD sensor may be used interchangeably herein to refer to a type of an image sensor that can take an image, a photo, series of images or photos.

As more requirements are imposed on banknote processing systems by banks, governments, etc., such as requirements for fitness detection, serial number reading, stain detection, or other requirements, higher resolution processing systems are increasingly needed for banknote processing machines. A camera or imaging system such as that described herein can provide for higher resolution images to be captured and processed by banknote processing systems. Other systems may require multiple imaging systems to perform separate functions. Other systems may also use separate sensors that require multiple sensing elements to provide for different types of banknote characteristics detections. The imaging system disclosed herein provides a single imaging system used for multiple purposes, such as banknote recognition/validation, fitness, serial number detection, etc., foreign object detection in the banknote path, and banknote edge detection and anti-skew operations or anti-offset. Other systems may also utilize contact image sensor technology inherited from scanner technology, which requires a banknote to be relatively close to the sensor, which increases the risk of jamming. The imaging systems disclosed herein provide for increased distance between the camera or image sensor and the banknote to avoid jamming. Contact image sensors have a small depth of field, such as less than 1 mm. A camera or image sensor such as those described herein can have a depth of field of 6 mm, allowing a camera or image sensor to be placed in spine of a banknote validator or other payment apparatus. The banknote path in such apparatuses may be 4 mm, so the camera or image sensor can retain image quality even if the banknote moves within the 4 mm. Since the camera or image sensor can see a region of interest that is large enough to have overlap between frames, the frames can be stitched together to compensate for any transport issues like a change in transport speed or slippage of the banknote. With a contact image sensor, since the contact image sensor scans one line at a time, if the banknote slips or the transport speed changes, the contact image sensor may miss data, such as lines. In some embodiments, the focal distance may be in inches, such as 3 inches or less, in which a contact image sensor will not adequately operate.

The imaging system disclosed herein allows for detection of foreign objects attached to banknotes like strings or tape. Other systems may use a light source and detected light to detect foreign objects in a banknote path, these systems relying on a detection of the light being obstructed by a foreign object. The system described herein provides for foreign objects to be detected by capturing images of the foreign object using one or more cameras or image sensors.

Figure 1B:
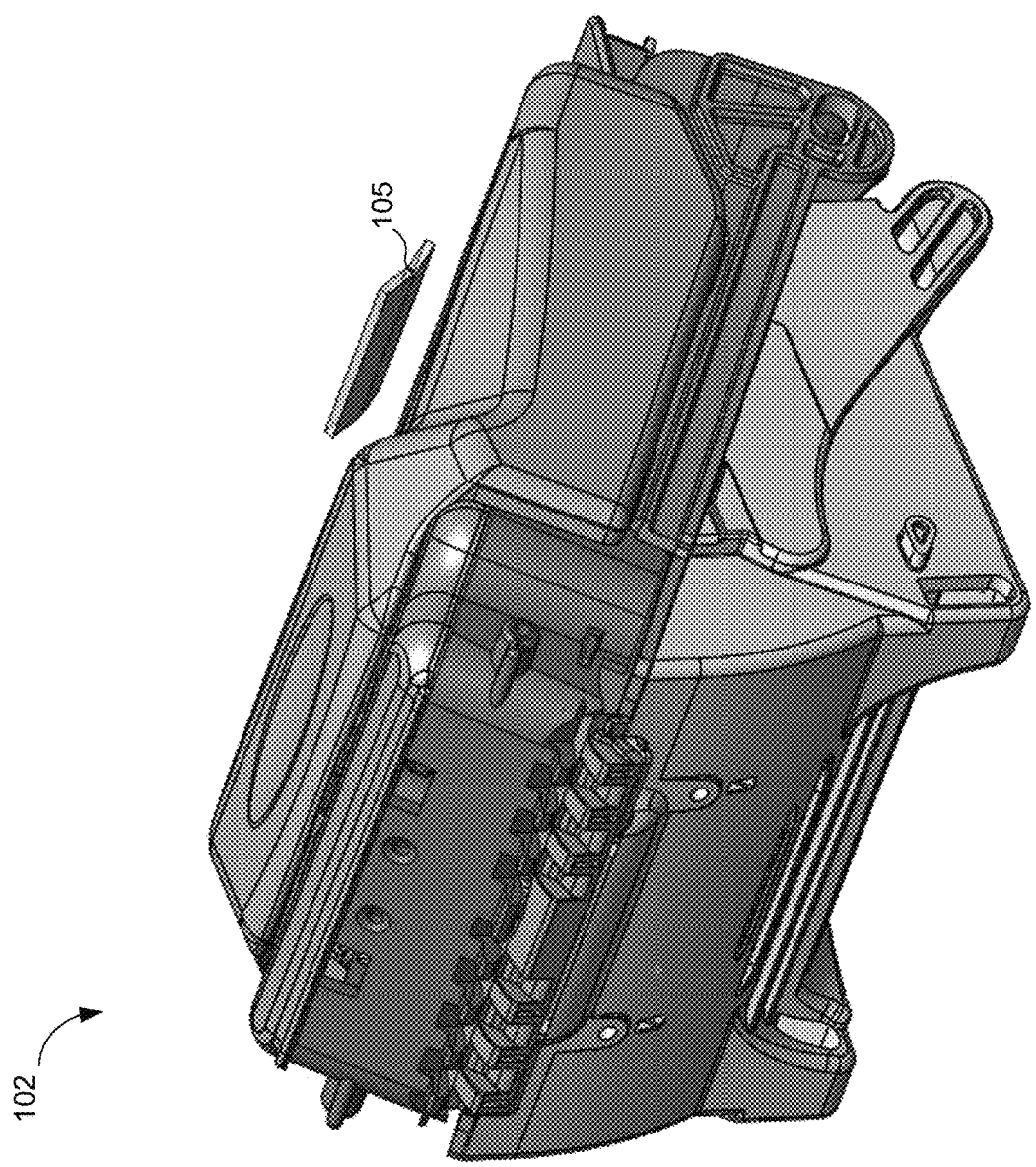
FIG. 1B illustrates an example of a note validator according to various embodiments of the present disclosure.

FIGS. 1A and 1B illustrate examples of a currency handling apparatus and note validator according to embodiments of this disclosure. Currency handling apparatuses and note validators come in a wide variety of configurations, and FIGS. 1A and 1B do not limit the scope of this disclosure to any particular implementation of a currency handling apparatus.

The currency handling apparatus 100 includes the note validator 102, a removable storage unit 103, and a chassis 104. In some implementations, note validator 102 is removably coupled to chassis 104. Note validator 102 can be configured to receive a note 101 and transport the currency item past a sensing component to determine the type and validity of note 101. In one or more embodiments, removable storage unit 103 can be a note stack recycler. In some implementations, removable storage unit 103 includes a transportation device for transporting note 101 to and/or from the removable storage unit 103. In some embodiments, the currency handling apparatus 100 may not include a stacker.

Note validator 102 includes a number of features to accommodate the systems disclosed herein. A front of the note validator 102 can have positioned thereon a bezel connector, a PCB mounted switch and LEDs, a mini USB connector which creates more space for an internal edge sensor and a multimedia interface (MMI). The note validator 102 can also include a cover with a latch positioned on a top portion of the note validator 102 to cover one or more detection surfaces 105 as disclosed herein.

Although FIGS. 1A and 1B illustrate one example of a currency handling apparatus 100 and note validator 102, various changes may be made to FIGS. 1A and 1B. For example, the currency handling apparatus 100 could be used in automatic ticket seller machines, automated payment systems, customer assist payment systems, automatic teller machines, vending machines and other kiosks. Also, there could be more than one removable storage unit 103 as well as a temporary storage unit, such as a note recycler.

Figure 2B:
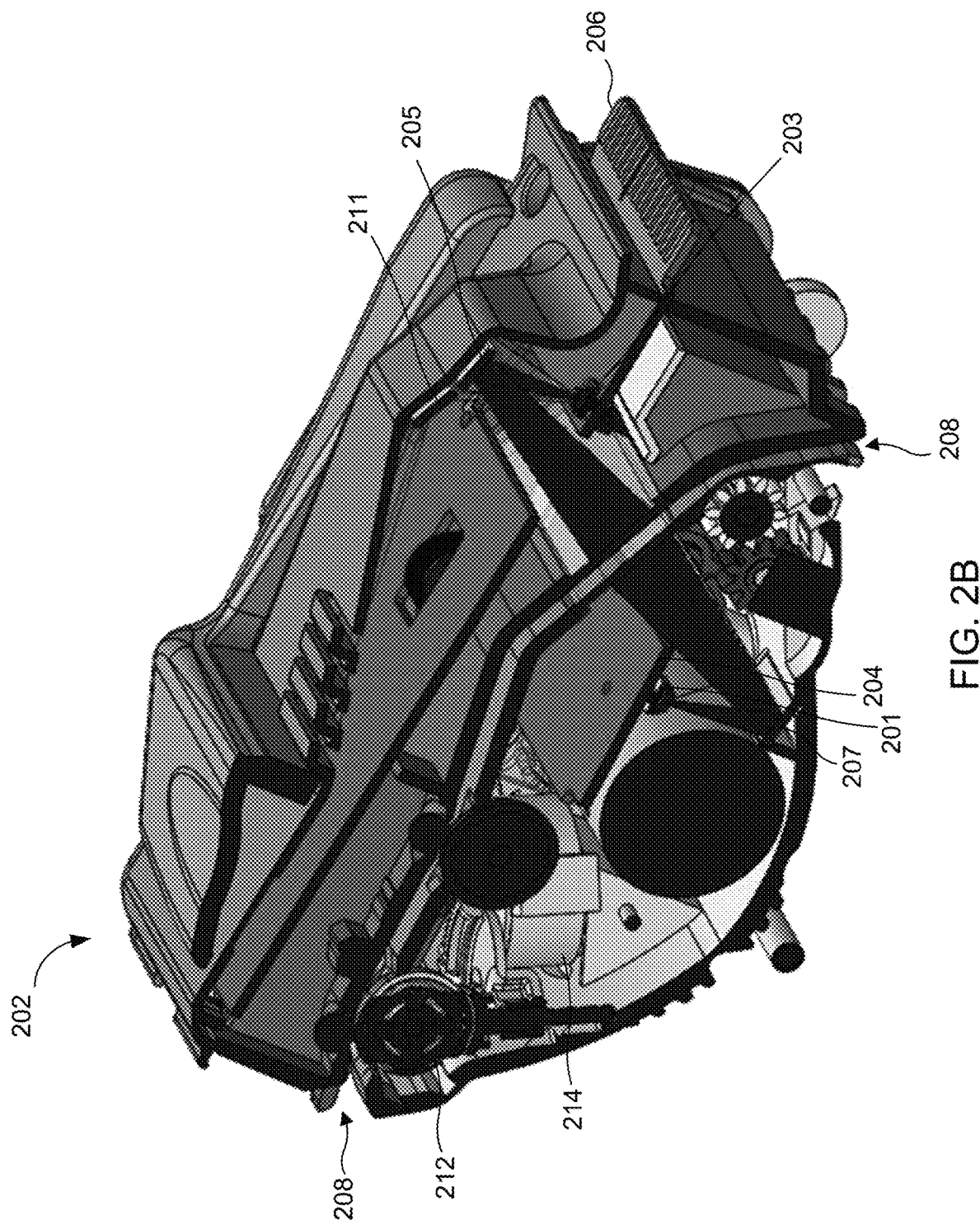
FIG. 2B illustrates a side cross-section perspective view of a banknote validator according to embodiments of the present disclosure.
Figure 2C:
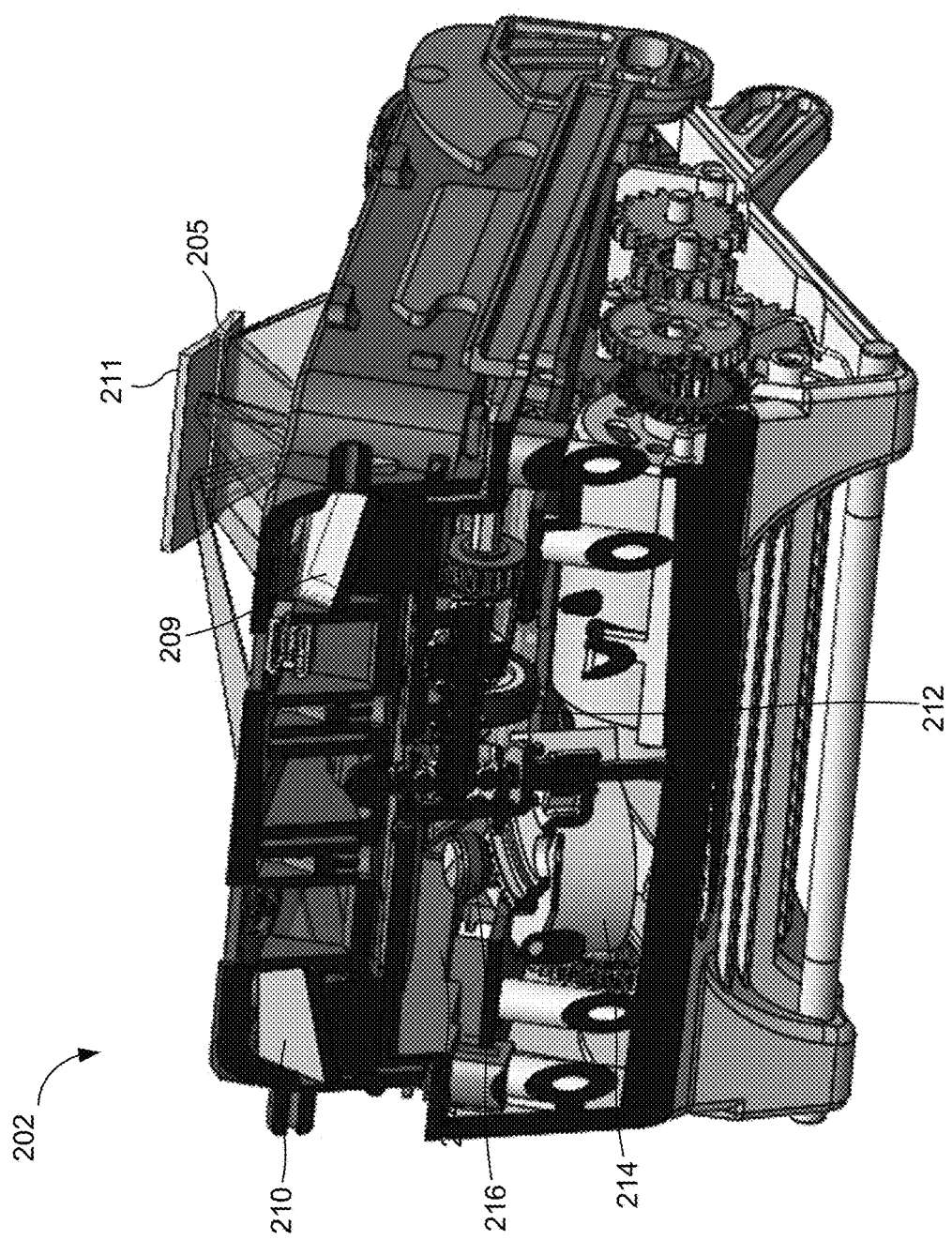
FIG. 2C illustrates a front cross-section perspective view of a banknote validator according to embodiments of the present disclosure.
Figure 2D:
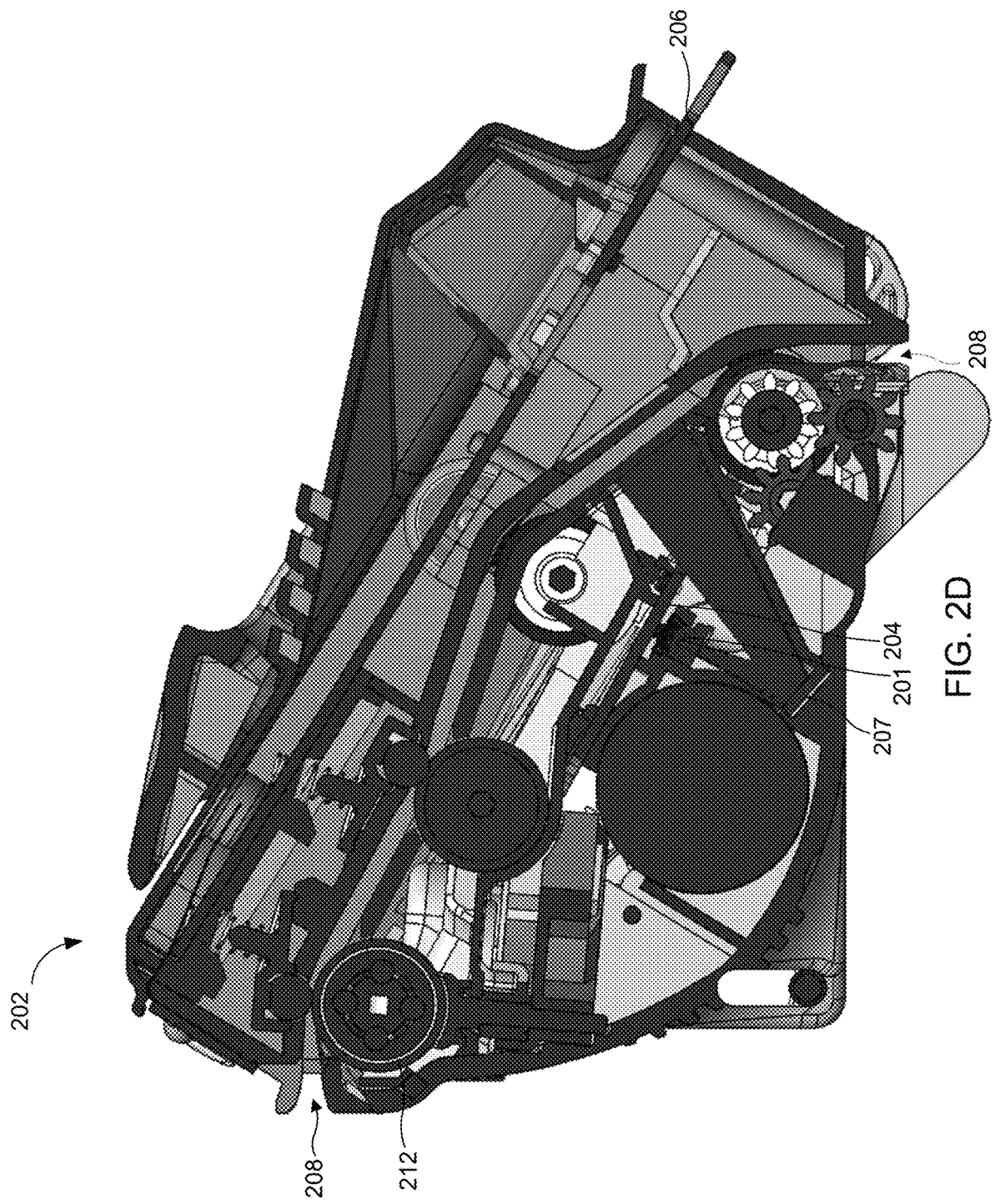
FIG. 2D illustrates a side cross-section view of a banknote validator in accordance with various embodiments of the present disclosure.
Figure 2E:
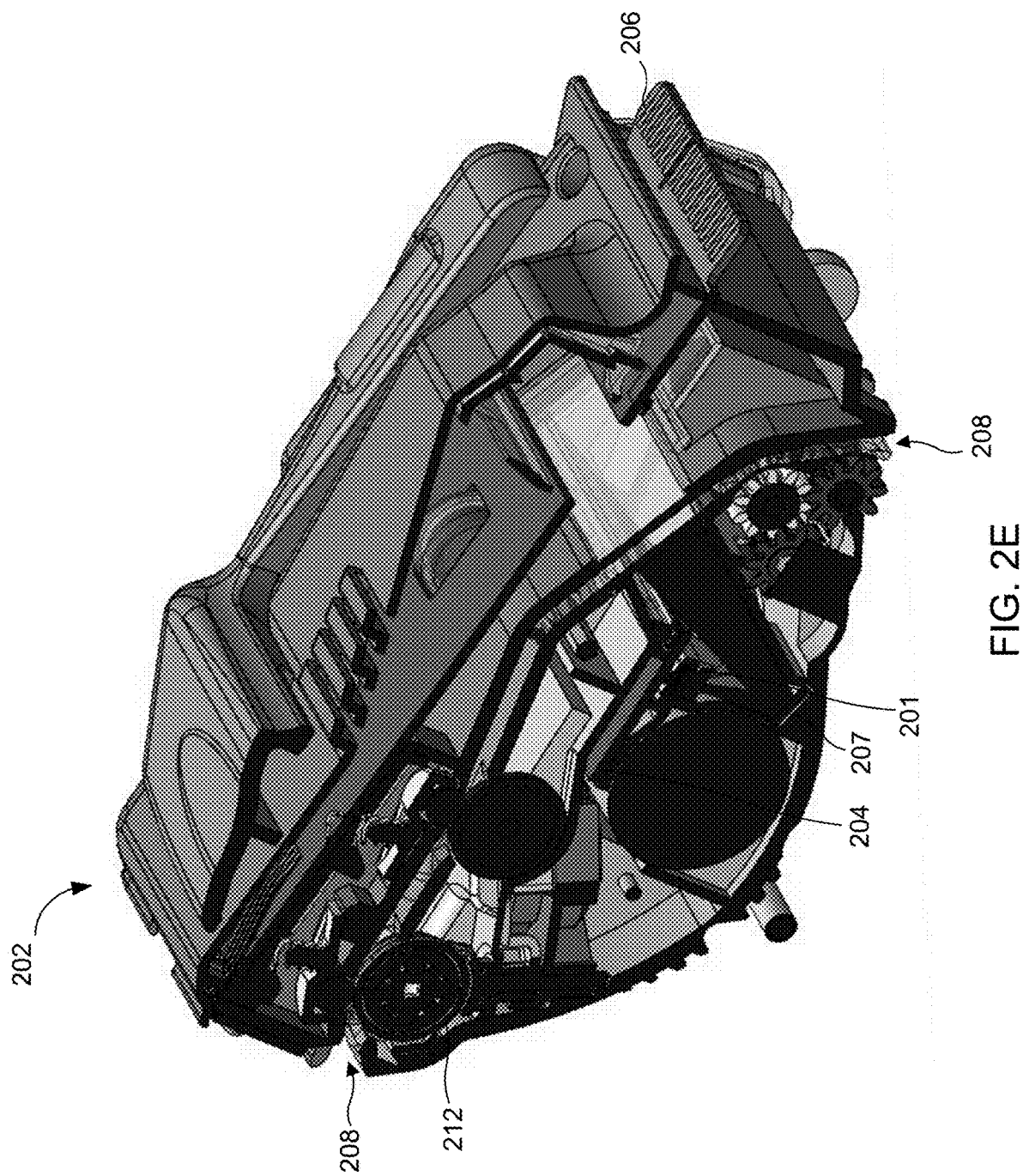
FIG. 2E illustrates a side cross-section perspective view of a banknote validator in accordance with various embodiments of the present disclosure.
Figure 2F:
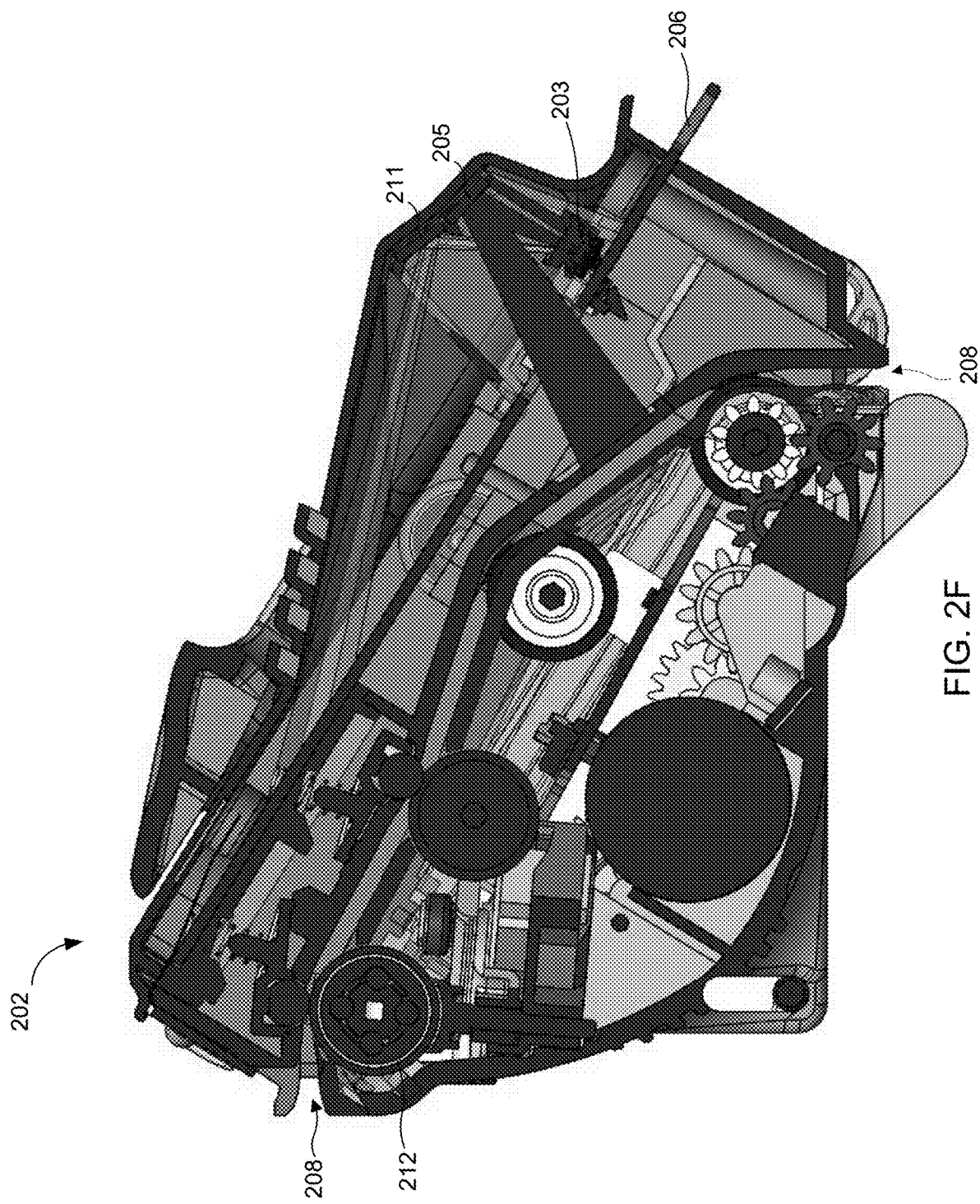
FIG. 2F illustrates a side cross-section view of a banknote validator in accordance with various embodiments of the present disclosure.
Figure 2G:
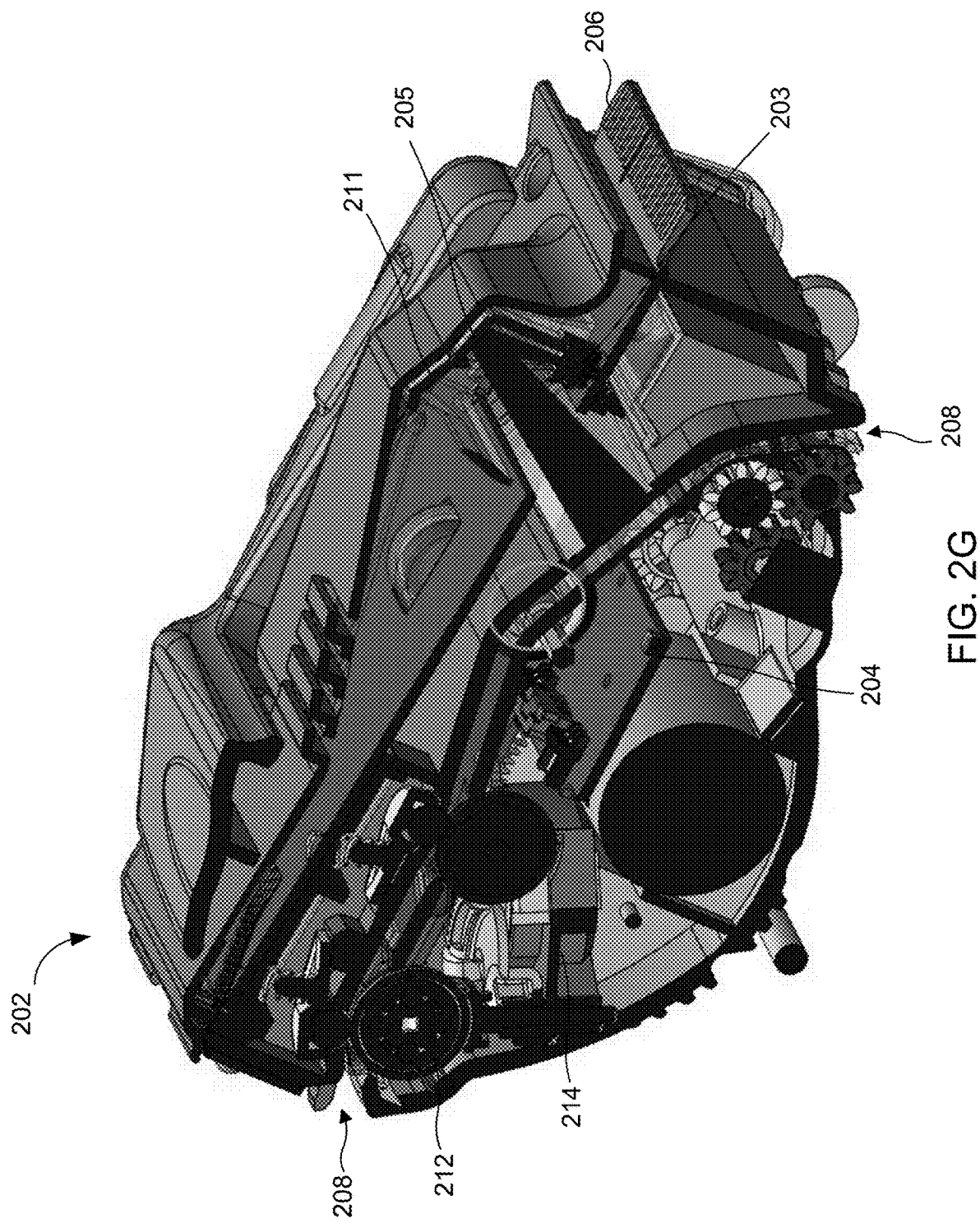
FIG. 2G illustrates a side cross-section perspective view of a banknote validator in accordance with various embodiments of the present disclosure.

Referring now to FIGS. 2A-2C, there are illustrated various views of a banknote validator 202 according to embodiments of the present disclosure. FIG. 2A illustrates a side view of the banknote validator 202 according to embodiments of the present disclosure, FIG. 2B illustrates a side perspective view of the banknote validator 202 according to embodiments of the present disclosure, FIG. 2C illustrates a rear perspective view of the banknote validator 202 according to embodiments of the present disclosure, FIG. 2D illustrates a side cross-section view of a banknote validator 202 in accordance with various embodiments of the present disclosure, FIG. 2E illustrates a side cross-section perspective view of a banknote validator 202 in accordance with various embodiments of the present disclosure, FIG. 2F illustrates a side cross-section view of a banknote validator 202 in accordance with various embodiments of the present disclosure, and FIG. 2G 202 illustrates a side cross-section perspective view of a banknote validator in accordance with various embodiments of the present disclosure. Banknote validators come in a wide variety of configurations, and FIGS. 2A and 2B do not limit the scope of this disclosure to any particular implementation of a note validator. The banknote validator 202 may be the note validator 102 and may be used in the currency handling apparatus 100.

The banknote validator 202 includes at least two cameras or image sensors 201, 203 mounted to a printed circuit board (PCBs) 204, 206. One PCB 204 is located below a banknote drive path and has installed thereon camera or image sensor 201 and the other PCB 206 is located above the banknote drive path 208 and has installed thereon camera or image sensor 203. Cameras or image sensors 201, 203 have associated therewith an imaging mirror or surface 205 and 207, respectively, such that the upper camera or image sensor 203 captures one or more images of a banknote reflected in the imaging surface 205, and the lower camera or image sensor 201 captures one or more images of a banknote reflected in the imaging surface 207. It will be understood that the cameras or image sensors 201 and 203 can also capture images of other objects in the banknote path 208, such as foreign non-currency objects. It will be understood that the cameras or image sensors 201 and 203 can also capture images of other objects in the banknote path 208, such as foreign non-currency objects. It will be understood that the cameras or image sensors 201 and 203 can capture images of banknote or other objects in banknote path 208 that are in either reflected or transmitted or both reflected and transmitted.

As the banknote proceeds through the banknote path 208, the cameras or image sensors 201, 203 capture images of the banknote reflected in the imaging surfaces 205, 207 to perform various banknote detection and validation operations such as serial number detection, dye stain detection, forgery detection, banknote fitness detection, altered and/or cut and paste notes, and/or other processes. Since the field of view of each camera or image sensor 201, 203 may not allow for capturing an image of the entire banknote due to the compact nature of the banknote validator 202, the cameras or image sensors 201, 203 can capture multiple images of the banknote as it passes through the banknote path 208. The system can then stitch together the multiple images of the banknote to form a complete image of the banknote for use in the various banknote detection and validation operations.

The banknote validator 202 further includes three additional edge detection mirrors or surfaces 209, 210, and 211, for use in detecting edges of the banknote as it enters and travels through the banknote path. Two edge detection surfaces 209 and 210 are located near the entrance of the banknote path 208, one on each side of the banknote path near where each long edge of the banknote would be as the banknote enters the banknote path. These two edge detection surfaces 209 and 210 are positioned just above the entrance to the banknote path 208 and angled down towards the banknote path so that the edges of a banknote are provided in these two edge detection surfaces 209, 210. Light for capturing the edges of banknotes can either be provided from the same side of the surfaces 209, 210 in reflective configuration or from the opposing side (i.e. banknote is between the light source and the surfaces) in transmissive configuration. A third edge detection surface 211 is positioned in front of the imaging surface 205 above the camera or image sensor 203 that is located above the banknote path. The third edge detection surface 211 is angled such that the edges of the banknote provided in the other two edge detection surfaces 209, 210 are reflected in the third surface 211 as the banknote enters the banknote path 208. The camera or image sensor 203 is configured to capture images of the edges of a banknote reflected in the edge detection surface 211 located above the camera or image sensor. The banknote validator 202 may also include edge sensors located near the banknote entry to detect initial edge positions of the banknote as it enters the banknote path.

In other embodiments, the banknote validator 202 includes at least one camera or image sensor 201 mounted to a printed circuit board (PCBs) 204. PCB 204 is located below a banknote drive path and has installed thereon camera or image sensor 201. Camera or image sensor 201 has associated therewith an imaging mirror or surface 207, such that camera or image sensor 201 captures one or more images of a banknote reflected in the imaging surface 207. It will be understood that the camera or image sensor 201 can also capture images of other objects in the banknote path 208, such as foreign non-currency objects. It will be understood that the camera or image sensor 201 can capture images of banknote or other objects in banknote path 208 that are in either reflected or transmitted or both reflected and transmitted.

In other embodiments, the banknote validator 202 includes at least one camera or image sensor 203 mounted to a printed circuit board (PCBs) 206. PCB 206 is located above the banknote drive path 208 and has installed thereon camera or image sensor 203. Camera or image sensor 203 has associated therewith an imaging mirror or surface 205, such that the camera or image sensor 203 captures one or more images of a banknote reflected in the imaging surface 205. It will be understood that the camera or image sensor 203 can also capture images of other objects in the banknote path 208, such as foreign non-currency objects. It will be understood that the camera or image sensor 203 can capture images of banknote or other objects in banknote path 208 that are in either reflected or transmitted or both reflected and transmitted.

Edge detection allows for banknote skew or banknote offset to be detected and actions to correct the skew or the offset to be performed. For example, images taken of the edges of the banknote can be analyzed to measure the skew or offset of the banknote. Steerable drive wheels 212 located in the banknote path 208 coupled to a motor 214 can then be used to rotate the banknote in a direction in order to reorient and straighten the banknote in the banknote path 208. The motor 214 includes components that allow for a drive wheel 212 to be rotated according to the skew or the offset of the banknote, as described herein. A position sensor 216 can also be included to detect the position of the drive wheel 212. Straightening the banknote in the banknote path 208 reduces the risk of jams and keeps the banknote straight for imaging purposes. The imaging cameras or image sensors 201, 203 may switch between modes to perform the various functions described herein. For example, a camera or image sensor 201 or 203 can switch to a first mode to perform edge detection, and a second mode to perform banknote imaging and foreign object detection. In some embodiments, a third mode may be used for foreign object detection. In other embodiments, the imaging camera or image sensor in a single mode may perform edge detection, banknote imaging and foreign object detection.

Figure 3A:
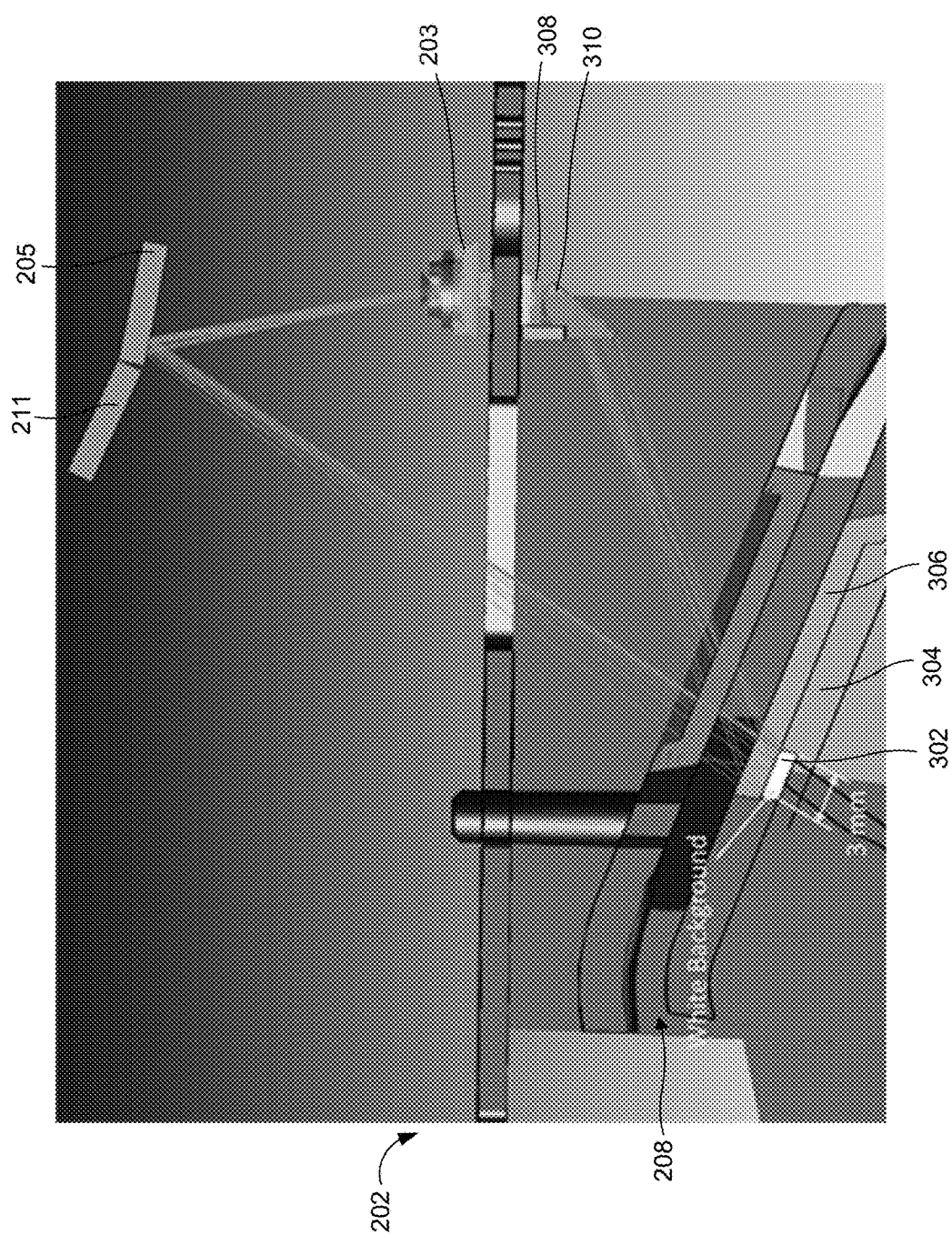
FIG. 3A illustrates a side view of a banknote validator including a reflective surface and a light-absorbing dark region or an empty dark channel in a banknote path in accordance with embodiments of the present disclosure.
Figure 3B:
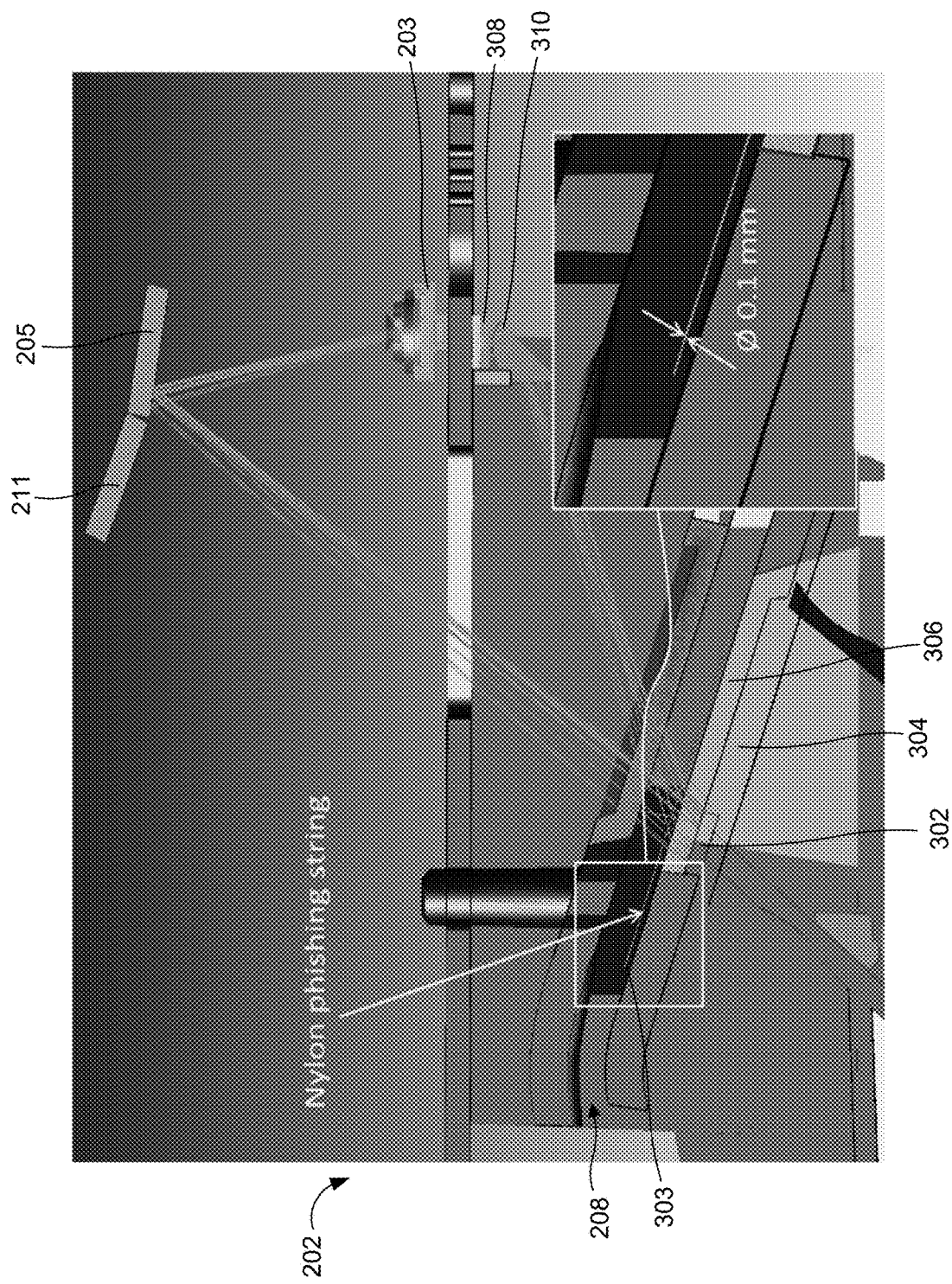
FIG. 3B illustrates another side view of a banknote validator including a reflective surface and a light-absorbing dark region or an empty dark channel in a banknote path with a foreign object in the banknote path in accordance with embodiments of the present disclosure.
Figure 4:
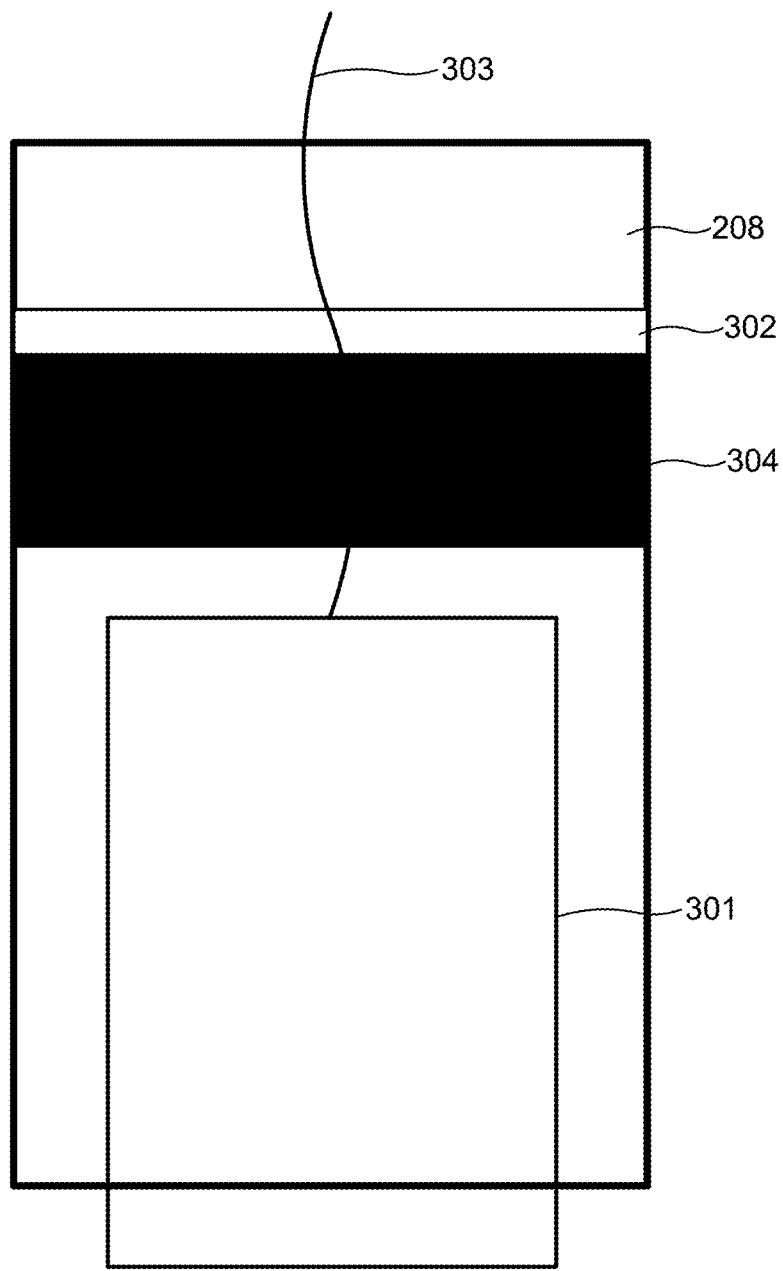
FIG. 4 illustrates a diagrammatic top view of a banknote path of a banknote validator including a reflective surface and a light-absorbing dark region or an empty dark channel in a banknote path in accordance with embodiments of the present disclosure.

FIGS. 3A, 3B and 4 illustrate views of the banknote validator 202 including a reflective surface 302 and a light-absorbing dark region or empty dark channel 304 in the banknote path 208 for foreign object detection according to various embodiments of the present disclosure. Banknote validators and banknote paths can come in a wide variety of configurations, and FIGS. 3 and 4 do not limit the scope of this disclosure to any particular implementation of a banknote validator or banknote path. The banknote validator 202 may be the note validator 102 and may be used in the currency handling apparatus 100. FIG. 3A illustrates a side view of the banknote validator 202, FIG. 3B illustrates another side view of the banknote validator 202, and FIG. 4 illustrates a diagrammatic top view of a banknote path 208 of the banknote validator 202.

A problem with respect to payment apparatuses is preventing users from tricking an apparatus by inserting a banknote 301 that has a foreign object attached, such as a string or tape 303, into the apparatus such that the user can pull the banknote 301 back out of the apparatus. The banknote validator 202 of the present disclosure includes a reflective surface 302 positioned along the banknote path 208 in a location viewable by the camera or image sensor 203 above the banknote path 208 via the imaging surface 205. The banknote validator 202 may also include a dark region or empty dark channel 304 positioned along the banknote path 208 in a location viewable by one of the cameras or image sensors. The reflective surface 302 and the dark region 304 allow for foreign objects of differing colors to be detected by the camera or image sensor 203. For example, if a white string is attached to a banknote 301 entered into the banknote validator 202, it may not be detected as it passes over the reflective surface 302, but is more easily detected when the white string passes over the dark region 304. If a foreign object is of a darker color, the foreign object may be more easily detectable as it passes over the reflective surface 302. In some embodiments, the reflective surface 302 may be placed a few millimeters away from the surface of the banknote path 208 where the string 303 would travel, such as placing the reflective surface 302 under a transparent surface 306 in the banknote path 208, as this can increase detection capability. In some embodiments, the dark region 304 can be made from a black plastic.

During operation, images of the reflective strip 302 and the dark region 304 can be captured many times while in an idle state (i.e., no banknote is present or no foreign object is present in the banknote path), and the images may be averaged or smoothed together to obtain a reference baseline for the idle condition. When a banknote 301 passes through the imaging area, multiple images of the imaging area including the strip 302 and dark region 304 are captured and compared to the reference baseline images using various image processing operations. Any foreign object in the banknote path 208 in front of the reference backgrounds 302, 304 either appears in the image as an object or, such as in the case of fishing lines, refracts the light in a way to create shadowy regions on the reference surface. Such changes in the image are detected using the reference images and image processing operations. If the foreign object is difficult to detect in the strip 302, such as a white string or line, the white string or line can be detected in the images when it is over the dark region 304. In some embodiments, light level and camera or image sensor gain can be adjusted to provide better detection criteria for detecting foreign objects. Camera or image sensor gain can also be adjusted between the different wavelength captures of banknote images, as described herein. Once an image is captured, the detection operation may be run by a processing system included in, on, or that is operatively connected to, the banknote validator 202. When a foreign object in the image is detected, the banknote validator 202 may then take appropriate steps, such as ejecting the banknote 301.

In some embodiments, the imaging using the reflective background 302 and the empty channel or dark region 304 can avoid using cross channel light-emitting diodes (LEDs) to illuminate the imaging zone in order to see foreign objects, as well as light sensors and the associated electronics to drive the light sensors and LEDs. This system also avoids using complicated banknote path shapes that can make the string more visible, which provides for more reliable banknote transport with less jamming. In other embodiments, one or more light sources 308 such as an LEDs can be positioned above the banknote path 208 to transmit light into the banknote path 308 to provide additional light for imaging of the banknote path 208 and objects within the banknote path 208. In some embodiments, a reflective surface 310 can be disposed near the light sources 308 to reflect and divert the transmitted light into the banknote path 208. In some embodiments, illumination of the light sources 308 is alternated across the width of the banknote path 208, causing a shadow of a foreign object to appear in different positions in the banknote path 208. This assists with foreign object detection by allowing the shadow of the foreign object to be detected by the image sensor at different areas of the banknote path 208.

Figure 5A:
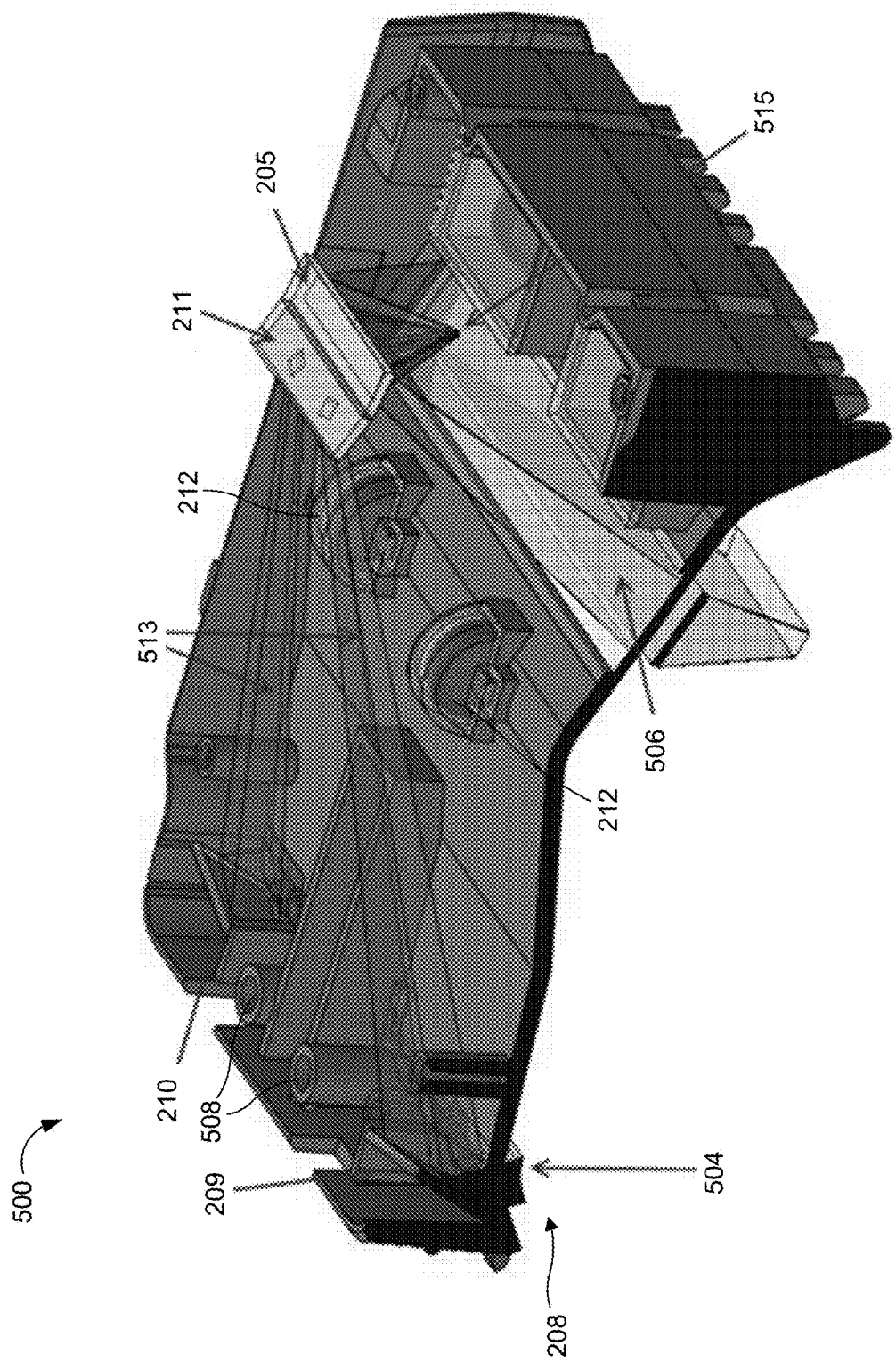
FIG. 5A illustrates a side perspective view of a banknote imaging system in accordance with embodiments of the present disclosure.
Figure 5B:
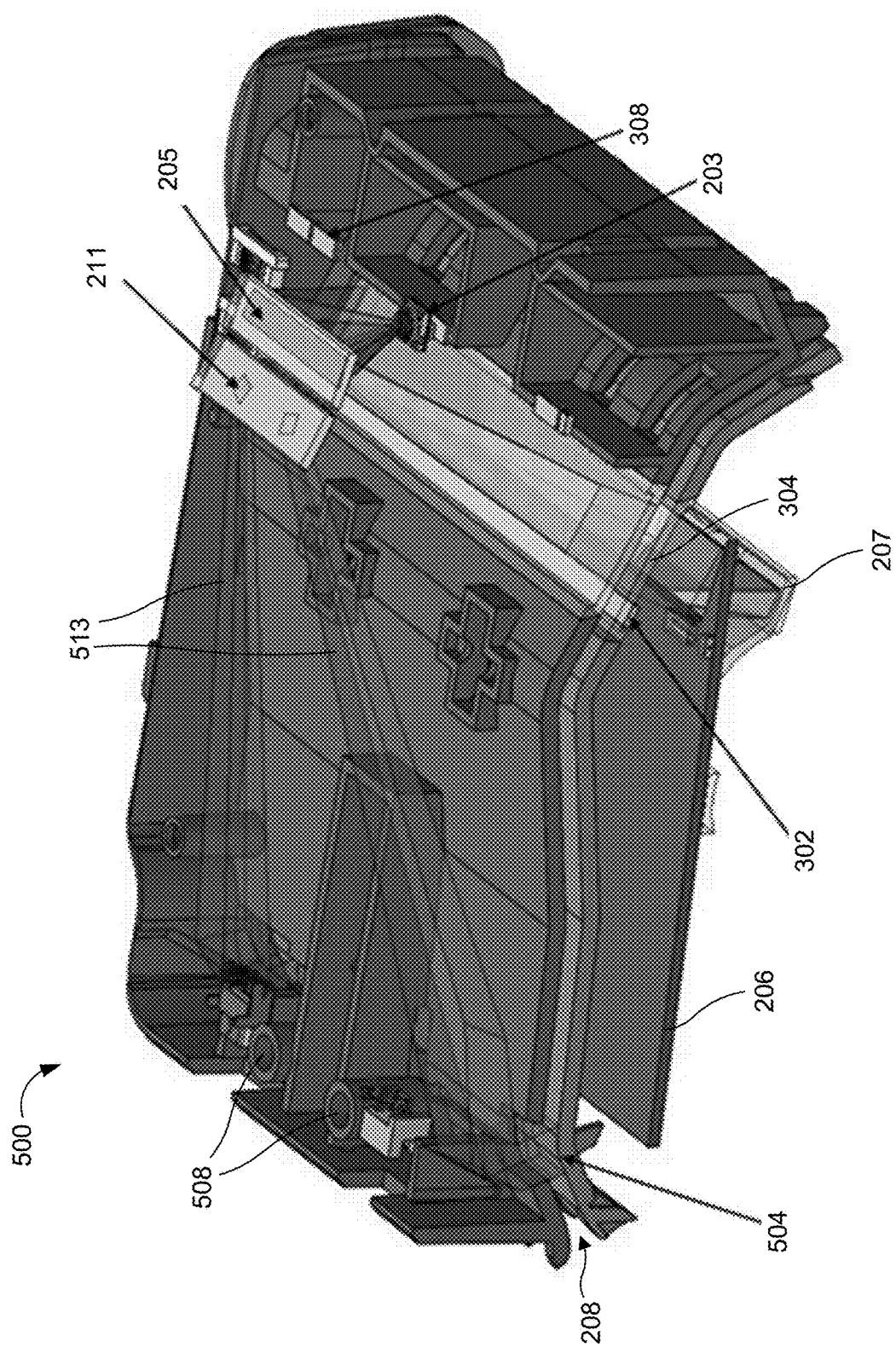
FIG. 5B illustrates a top perspective view of a banknote imaging system in accordance with embodiments of the present disclosure.
Figure 5C:
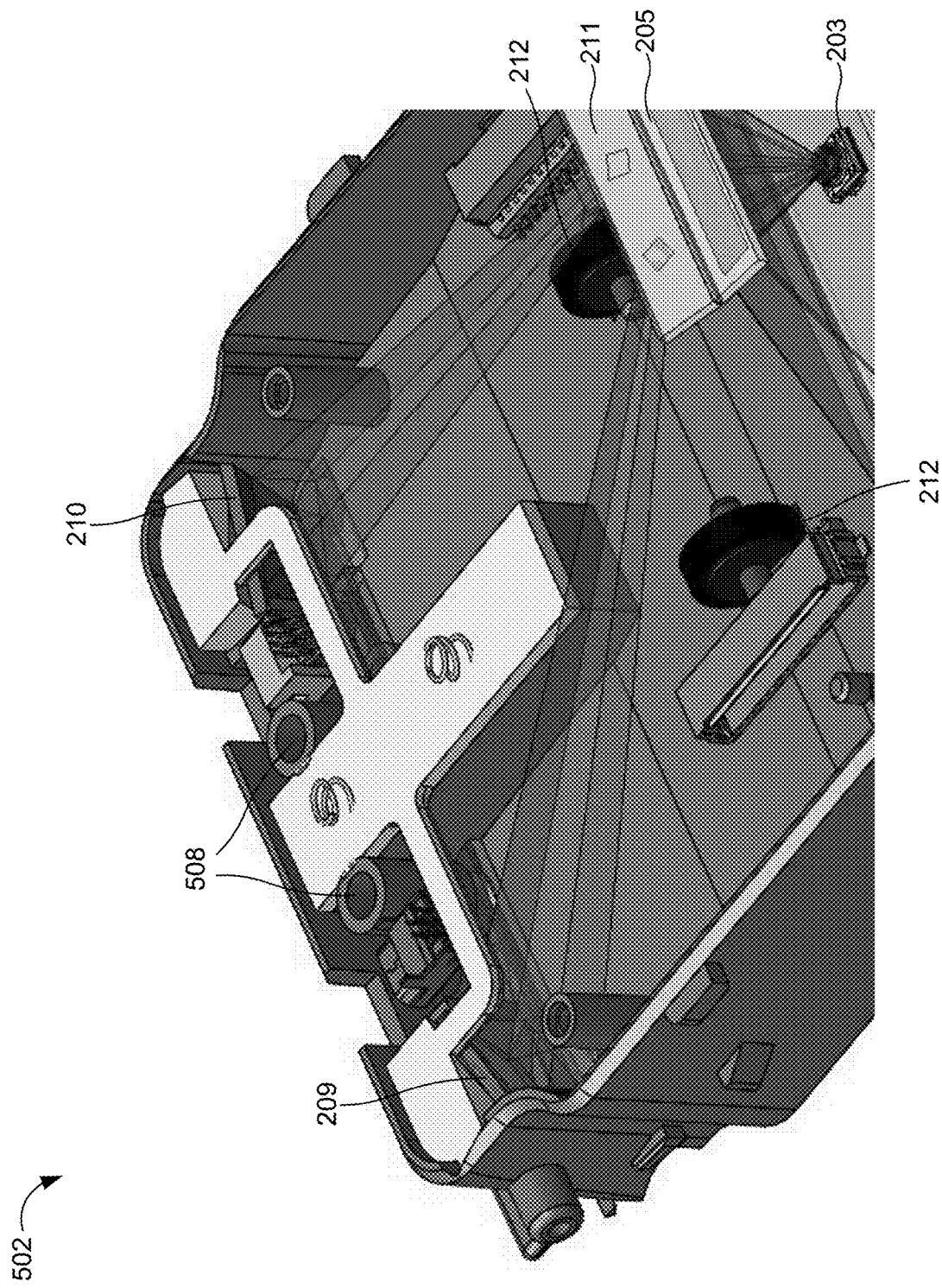
FIG. 5C illustrates an enhanced view of a banknote edge detection subsystem of a banknote imaging system in accordance with embodiments of the present disclosure.
Figure 5D:
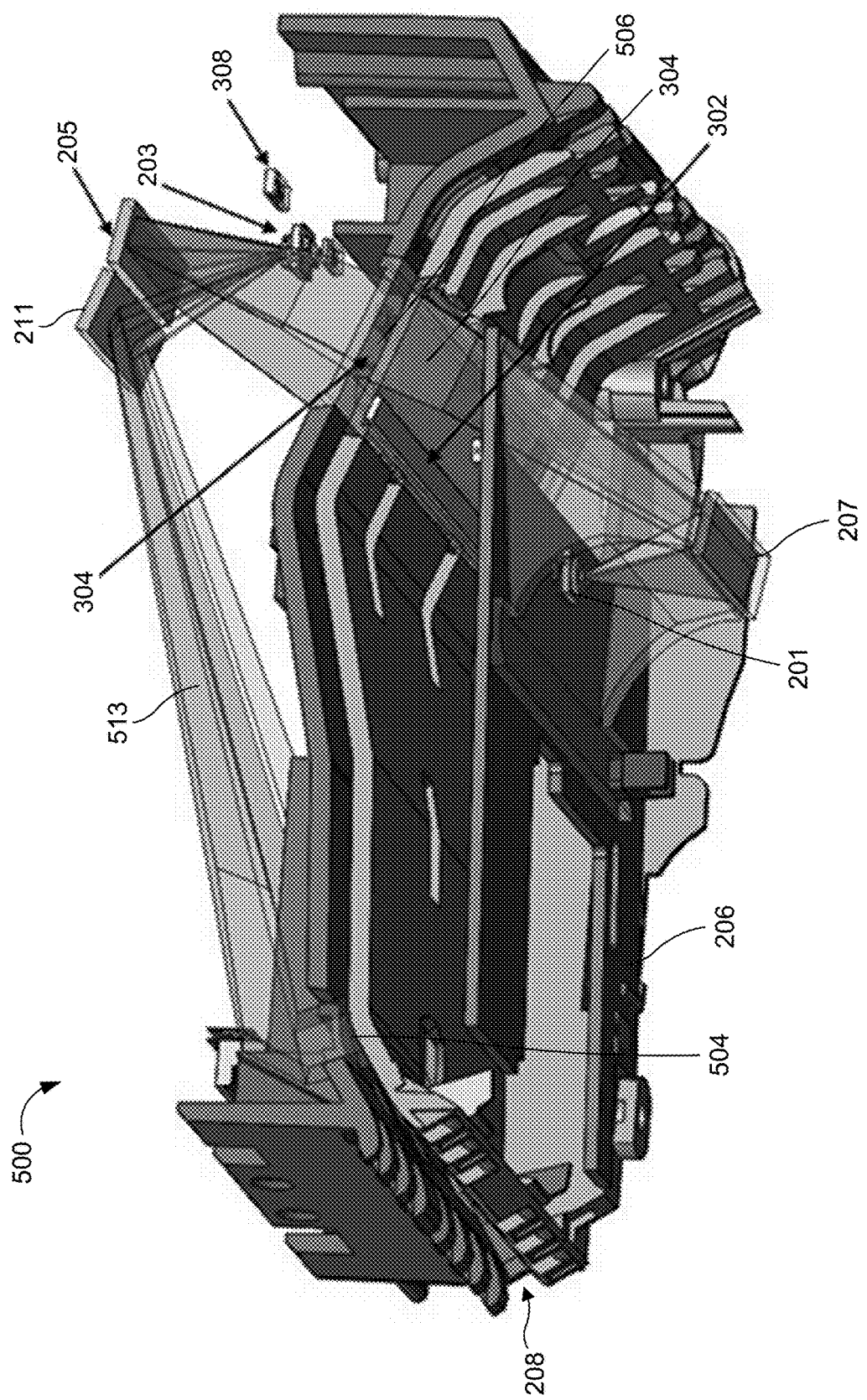
FIG. 5D illustrates a bottom perspective view of a banknote imaging system in accordance with embodiments of the present disclosure.

FIGS. 5A-5D illustrate various views of a banknote imaging system 500 according to various embodiments of the present disclosure. Banknote imaging systems can come in a wide variety of configurations, and FIGS. 5A-5D do not limit the scope of this disclosure to any particular implementation of a banknote imaging system. The banknote imaging system 500 may be used in the currency handling apparatus 100 or the note validator 102 or 202. FIG. 5A illustrates a side perspective view of the banknote imaging system 500, FIG. 5B illustrates a top perspective view of the banknote imaging system 500, FIG. 5C illustrates an enhanced view of a banknote edge detection subsystem 502 of the banknote imaging system 500, and FIG. 5D illustrates a bottom perspective view of the banknote imaging system 500.

Near a front of the banknote path 208 are a first edge detection surface 209 and a second edge detection surface 210 in an edge detection zone 504 of the banknote path 208. The surfaces 209, 210 are disposed on each side of the path with respect to where long edges of a banknote would be located as a banknote enters the banknote path 208. Light for capturing the edges of the banknotes can either be provided from the same side of the edge detection surfaces in reflective configuration or from the opposing side (i.e. the banknote is between the light source and the detection surfaces) in a transmissive configuration. The two edge detection surfaces 209, 210 are disposed at an angle downward toward the banknote path 208. The angle of the two edge detection surfaces 209, 210 enable an edge of a banknote to be effectively detected from directly overhead rather than at an angle to the camera or image sensor 203, which reduces the perspective effects that a folded or crumpled banknote would create if the banknote was simply detected at the sides of the field of view of the imaging camera or image sensor. Any image distortion due to the angle can be corrected by image processing operations after the image is captured. The distance of the edge detection surface from the camera or image sensor provides that the subtended angle of view of the edge images is narrow, further reducing errors created by banknote folds and is closer to a collimated image but without the need for lensing. The camera or image sensor mode used for edge detection can be optimized to provide a higher frame rate during banknote position analysis since the regions of interest are small. This frame rate can be changed to a different frame rate when the camera or image sensor mode switches to a mode for banknote imaging.

The edge detection surfaces 209, 210 reflect light rays 506 of at least a portion of the long edges of a banknote as the banknote enters the banknote path 208. These images are reflected to a third edge detection surface 211 located above the banknote path 208 and above a first camera or image sensor 203 at a camera or image sensor position 507, to reflect the images from the third edge detection surface 211 to the first camera or image sensor 203 for image capture. The third edge detection surface 211 can be disposed near a first imaging surface 205 that can be used, for example, to image the banknote or detect foreign objects in a banknote imaging zone 506 in the banknote path 208. The third edge detection surface 511 may be angled up and away from the banknote path 208, such that, along with the angle of the two edge detection surfaces 209, 210 near the banknote entry, images of the banknote provided in the two edge detection surfaces 209, 210 at the banknote entry are reflected in the third edge detection surface 211.

If the camera or image sensor 203 detects that a banknote is skewed or offset in a direction, one or more steerable drive wheels 212 located in the banknote path can rotate to pull either a left or right long edge of the banknote in a direction to reorient and align the banknote in the banknote path 208. Start sensors 508 may also be included near the banknote entry to determine an initial starting position of the edges of the banknote. An offset of the banknote with respect to the sides of the banknote path may also be determined. The one or more steerable drive wheels 212 can be used to both rotate the banknote to alleviate skew and offset the banknote a distance from the sidewalls of the banknote path 208 to ensure the banknote is straight and fully inside the imaging region 506.

The banknote imaging zone 506, located past the steerable drive wheels 212, is an area in the banknote path that is within view of the first imaging surface 205 disposed above the banknote imaging zone 506. The first imaging surface 205 may be disposed adjacent to the third edge detection surface 211. As the banknote comes within view of the first imaging surface 205, at least a portion of the banknote is reflected in the first imaging surface 205. The first camera or image sensor 203 is disposed below the first imaging surface 205 with a lens of the first camera or image sensor 203 facing up from the banknote path 208 towards the first imaging surface 205 such that images of the banknote in the banknote imaging zone 506 reflected in the first imaging surface 205 are captured by the first camera or image sensor 203. The first camera or image sensor may only capture a portion of the banknote at a time as it travels through the banknote imaging zone 506. A series of images of different portions of the banknote can be captured and stored. The series of images may then be processed, such as stitching the series of images together to create a full image of the banknote. A reflective strip 302 and a dark region or empty dark channel 304 in the banknote imaging zone may be included for foreign object detection as described herein.

A second camera or image sensor 201 and a second imaging surface 207 may be disposed below the banknote path 208 in a separate area of the banknote validator. A lens of the second camera or image sensor 201 faces downwardly towards a bottom of the banknote validator and away from the banknote path 208. The second surface 207 is disposed below the second camera or image sensor 201 in the field of view of the lens of the second camera or image sensor 201. An edge of the second surface 207 that is closest to a rear of the banknote validator may be angled down such that light passing through the empty dark channel 304 of the banknote imaging zone is reflected by the second surface 207. When a banknote passes through the banknote imaging zone 506, an image of the bottom of the banknote is reflected in the second surface 207 and this image can be captured by the second camera or image sensor 201. Images acquired by the first and second cameras or image sensors 201, 203 can be used in tandem to perform various banknote detection and validation operations.

Since the components in the banknote path reside within a note validator having an enclosed body, additional lighting may be necessary within the banknote path to provide adequate light to allow for reflection of the banknote in the detection surfaces and for image capture by the cameras or image sensors. One or more light sources 308 can be disposed within the banknote validator, such as near the first camera or image sensor 203 as shown in FIGS. 5B and 5D. The light sources 308 can also be disposed in other areas in the banknote path 208 or in the area below the banknote path 280 where the second camera or image sensor 201 is disposed.

Figure 6A:
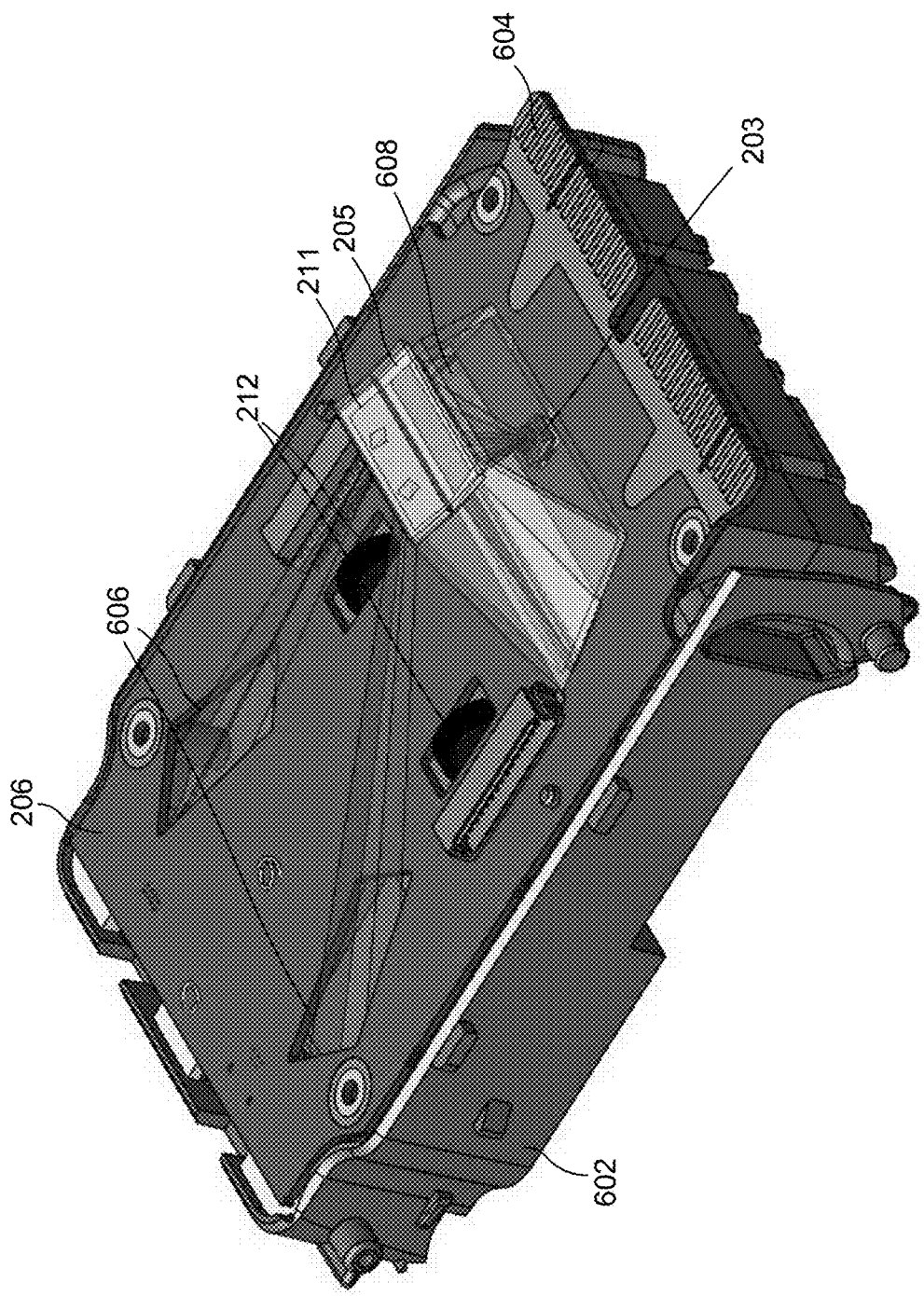
FIG. 6A illustrates a top perspective view of an imaging system printed circuit board (PCB) in accordance with embodiments of the present disclosure.
Figure 6B:
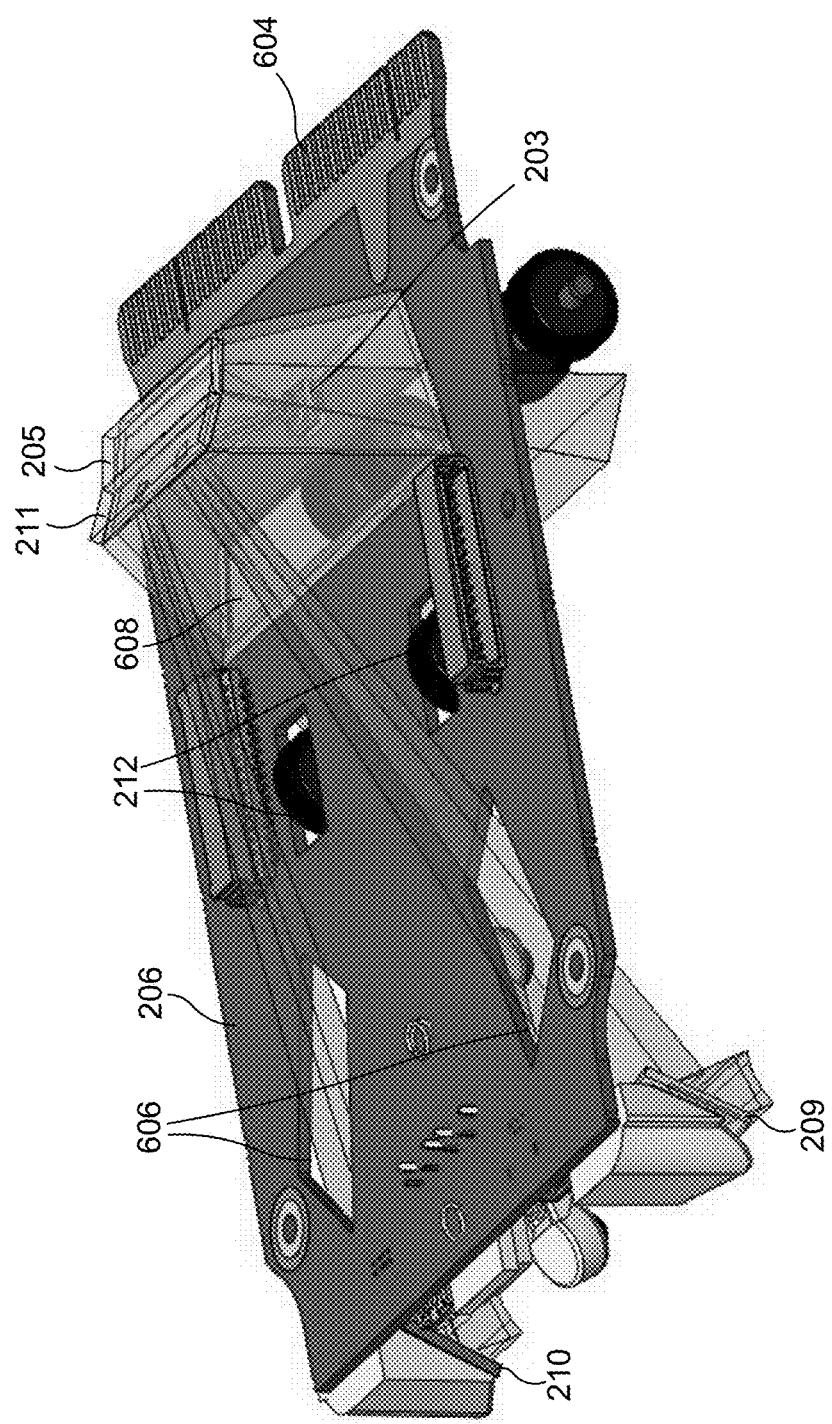
FIG. 6B illustrates a side perspective view of an imaging system PCB in accordance with embodiments of the present disclosure.
Figure 6C:
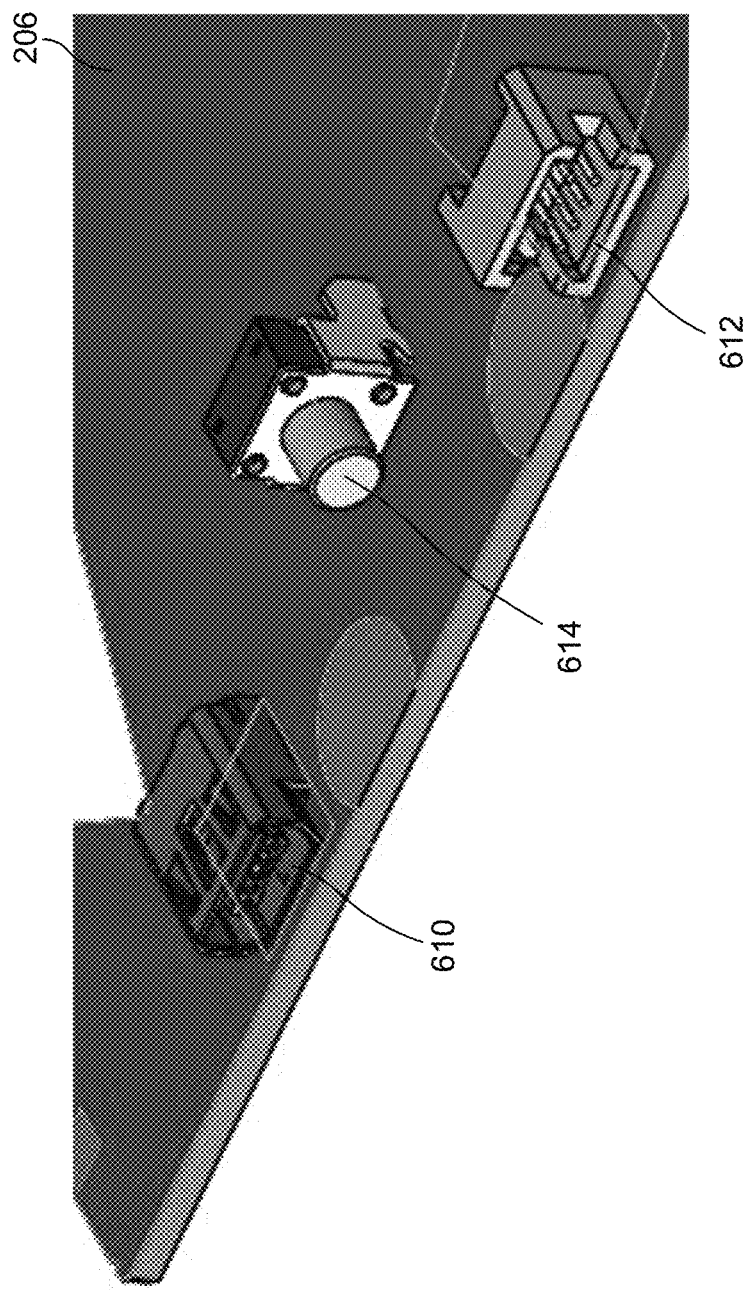
FIG. 6C illustrates a partially enlarged view of an imaging system PCB in accordance with embodiments of the present disclosure.

FIGS. 6A-6C illustrate an imaging system PCB 206 including the first camera or image sensor 203 according to various embodiments of the present disclosure. PCBs can come in a wide variety of configurations, and FIGS. 6A and 6B do not limit the scope of this disclosure to any particular implementation of a PCB. The imaging system PCB may be used in the currency handling apparatus 100 or the note validator 102. FIG. 6A illustrates a top perspective view of the imaging system PCB, FIG. 6B illustrates a side perspective view of the imaging system PCB, and FIG. 6C illustrates a partial enlarged view of the imaging system PCB 206.

The PCB 206 is coupled to a side of a body 602 that is opposite a side of the body 602 that forms the upper surface of the banknote path 208 as disclosed herein. The first camera or image sensor 203 is disposed near a side of the PCB 206 that is opposite the front of the banknote validator 202 and near an interface (IF) PCB connector 604 comprising a series of contacts. At the other end of the PCB 206 near where the front of the banknote validator would be are two apertures 606 in the PCB. These two apertures are cut out of the PCB 206 such that the first and second edge detection surfaces 209, 210 disposed underneath the PCB 206 reside below the apertures 606 so that reflections from the first and second edge detection surfaces 209, 210 can be received by the third edge detection surface 211 disposed above the PCB 206 and subsequently by the first camera or image sensor 203 disposed below the third edge detection surface 211 and mounted on the PCB 206. The first imaging surface 205 is also disposed above the first camera or image sensor 203 and may be adjacent to the third edge detection surface 211. Another aperture 608 in the PCB 206 is disposed below the third edge detection surface 211 and the first imaging surface 205 such that banknotes in the banknote imaging zone 506 are reflected in the first imaging surface 205 for image capture by the first camera or image sensor 203 adjacent to the aperture 608. A light source may be mounted on an underside of the PCB 206 to illuminate the banknote path below the PCB 206. The light source may illuminate the banknote path from above by reflecting the light off the surfaces 205 or 211 positioned above the PCB 206 and above the light source. In other embodiments, the light may be transmissive. Also mounted on an underside of the PCB 206 near the front of the banknote validator are a micro USB port 610, a small bezel connector 612, and a multimedia interface (MMI) LED switch 614.

Figure 7:
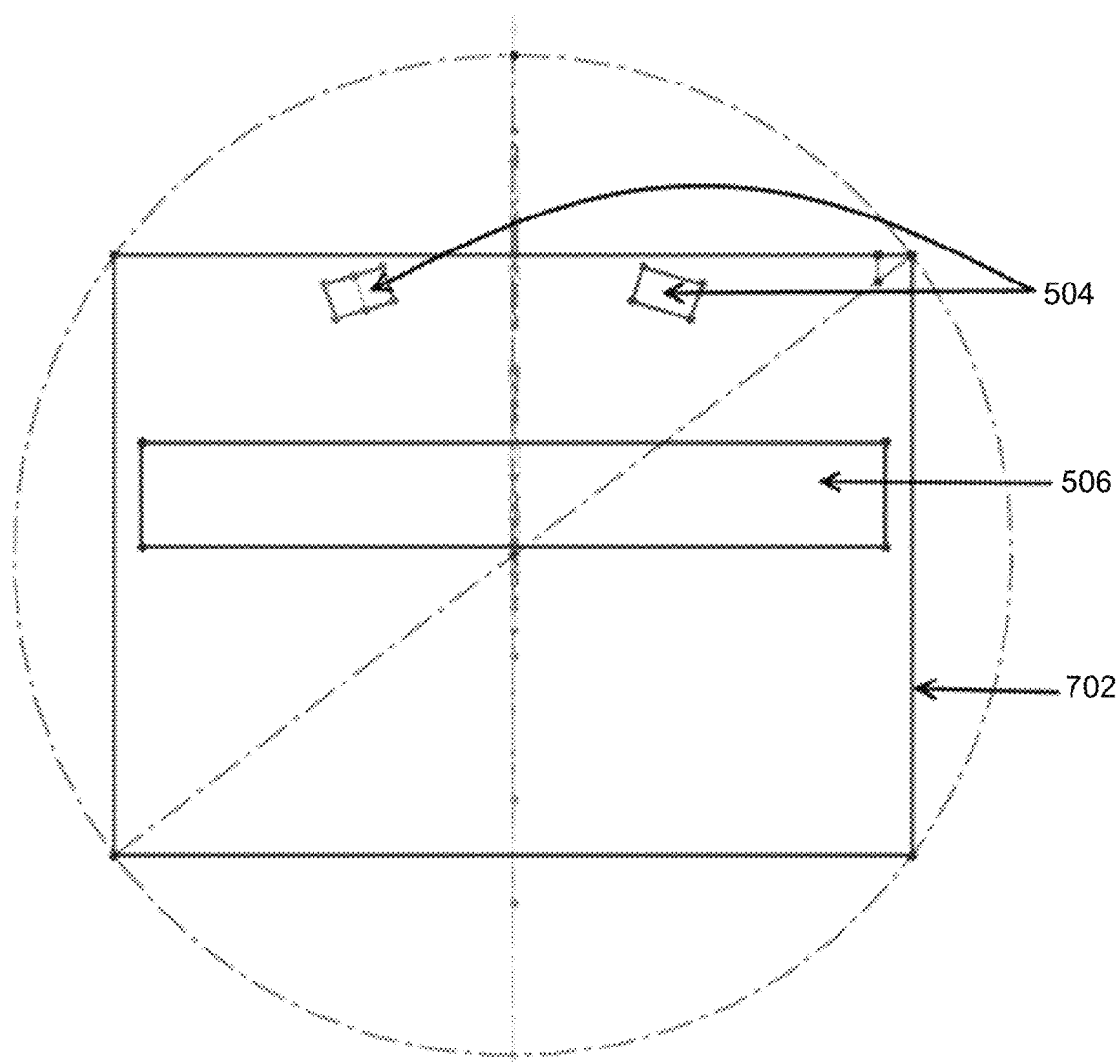
FIG. 7 illustrates a diagrammatic view of a field of view of a first camera or image sensor in accordance with various embodiments of the present disclosure.

FIG. 7 illustrates a diagrammatic view of the field of view 702 of the first camera or image sensor 203 in accordance with various embodiments of the present disclosure. From the perspective of the first camera or image sensor 203, the banknote imaging region 506 as reflected in the first imaging surface 205 and the edge detection region 504 as reflected in the third edge detection surface 211 are viewable by the first camera or image sensor 203.

In embodiments described herein the two cameras or image sensors 201, 203 on either side of the banknote provide images of both sides of the banknote. In other embodiments, the banknote validator houses only one camera or image sensor and takes pictures of only one side of the banknote. In this embodiment, the camera or image sensor may operate in reflective, transmissive or a combination of both reflective and transmissive configurations. In other embodiments, in a reflective only configuration either the top or bottom housing may house the camera or image sensor and only look at one side of the banknote surface with light source being on the same side as the camera or image sensor. In this configuration, both the edge detection surfaces and the string detection could operate in reflective configuration. In other embodiments, in transmissive only configuration, the banknote may travel between the light source and camera or image sensor. In this transmissive configuration images of the banknote can provide information from both sides of the banknote compared to only one side in reflective only configuration. In this configuration, both the edge detection surfaces and the string detection could operate in transmissive configuration. In addition to these reflective and transmissive configurations, in some embodiments an imaging module can operate in transmissive configuration; whereas, edge detection and string detection modules may operate in reflective mode. Depending upon space constraints, other permutations and combinations of different modules operating under either reflective or transmissive configuration may operate using a single camera or image sensor. These various configurations do not limit the scope of this disclosure to any particular implementation.

Figure 8A:
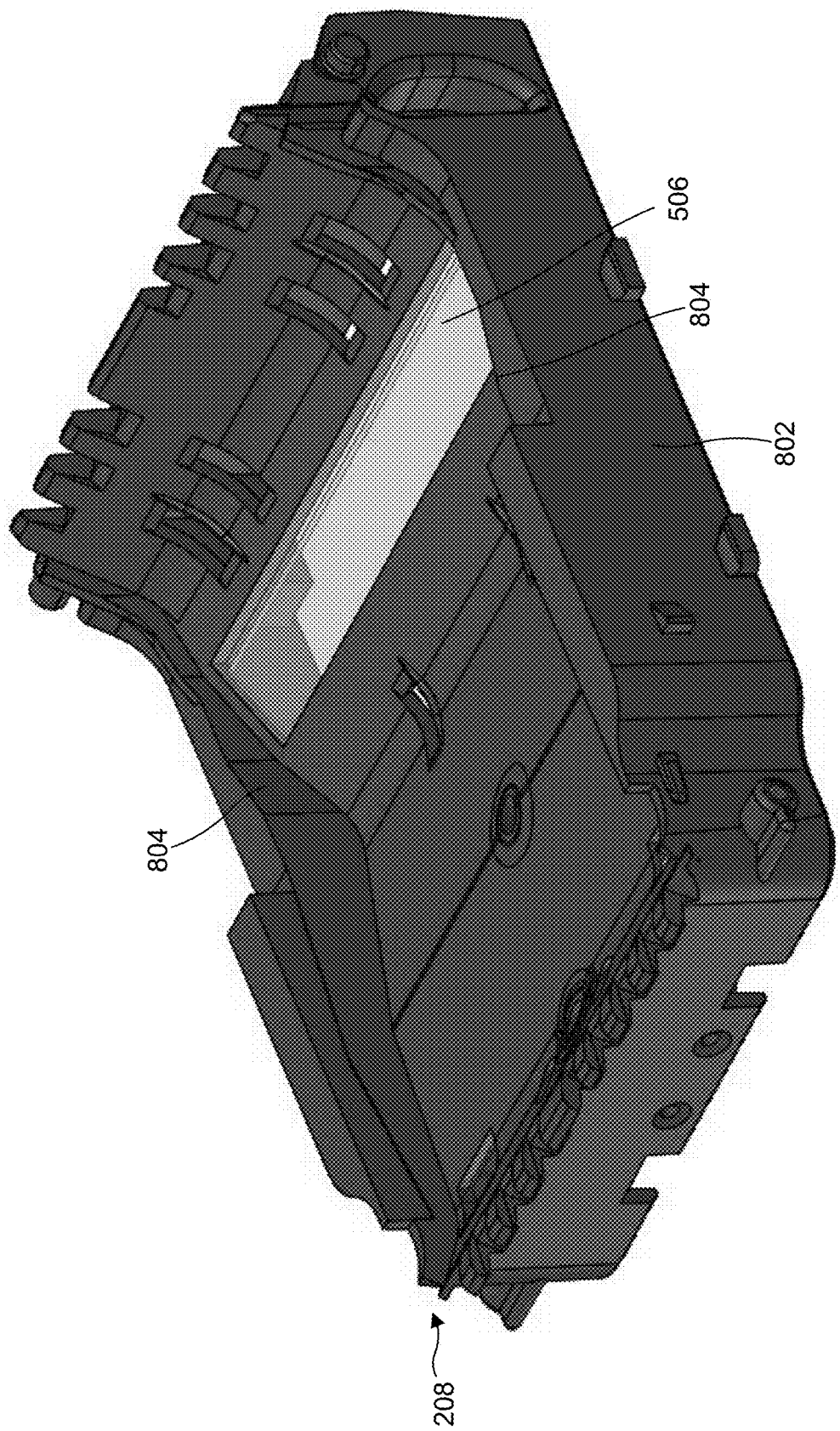
FIG. 8A illustrates a side perspective view of a banknote path in accordance with various embodiments of the present disclosure
Figure 8B:
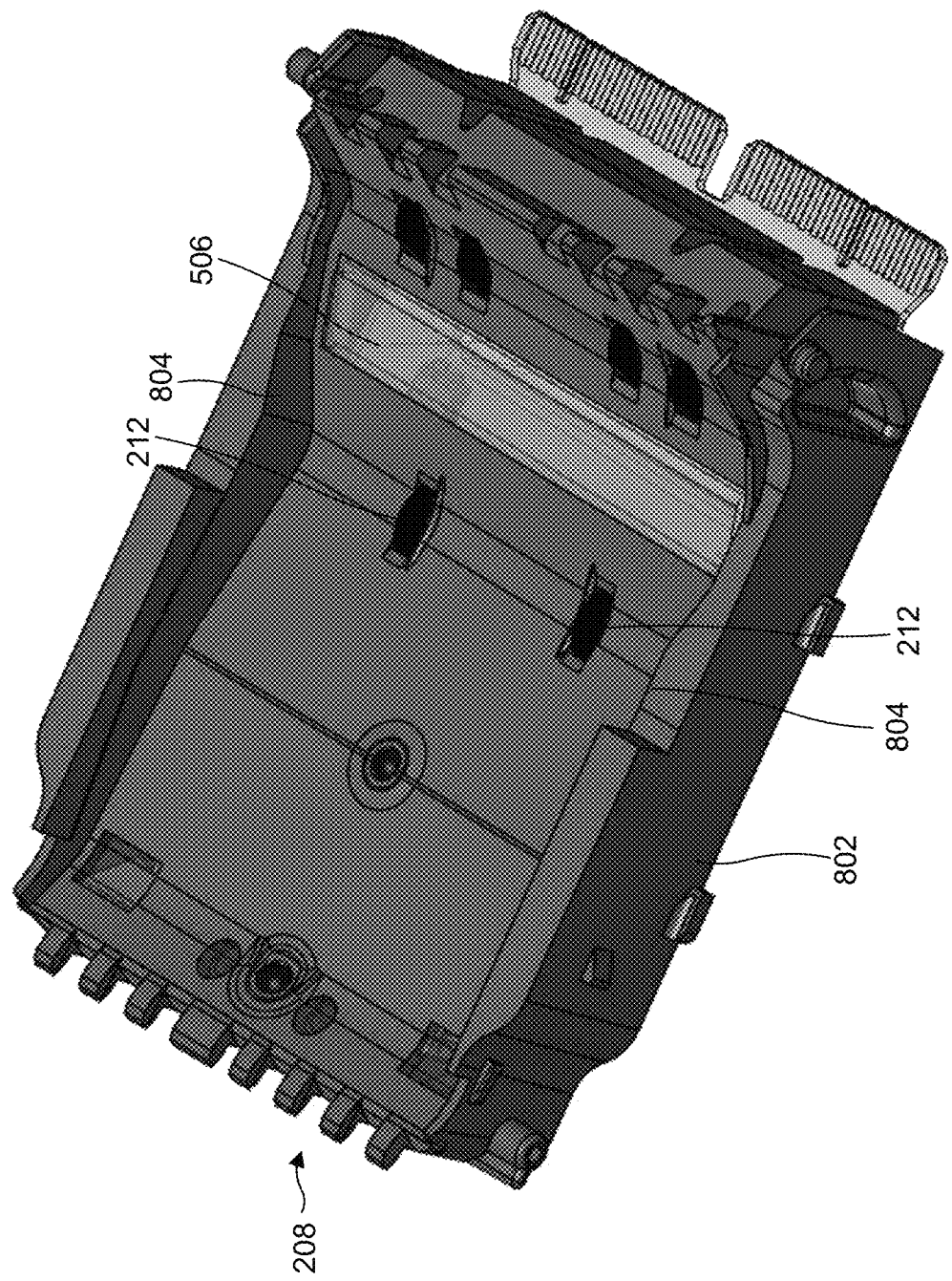
FIG. 8B illustrates a top perspective view of a banknote path in accordance with various embodiments of the present disclosure.
Figure 8C:
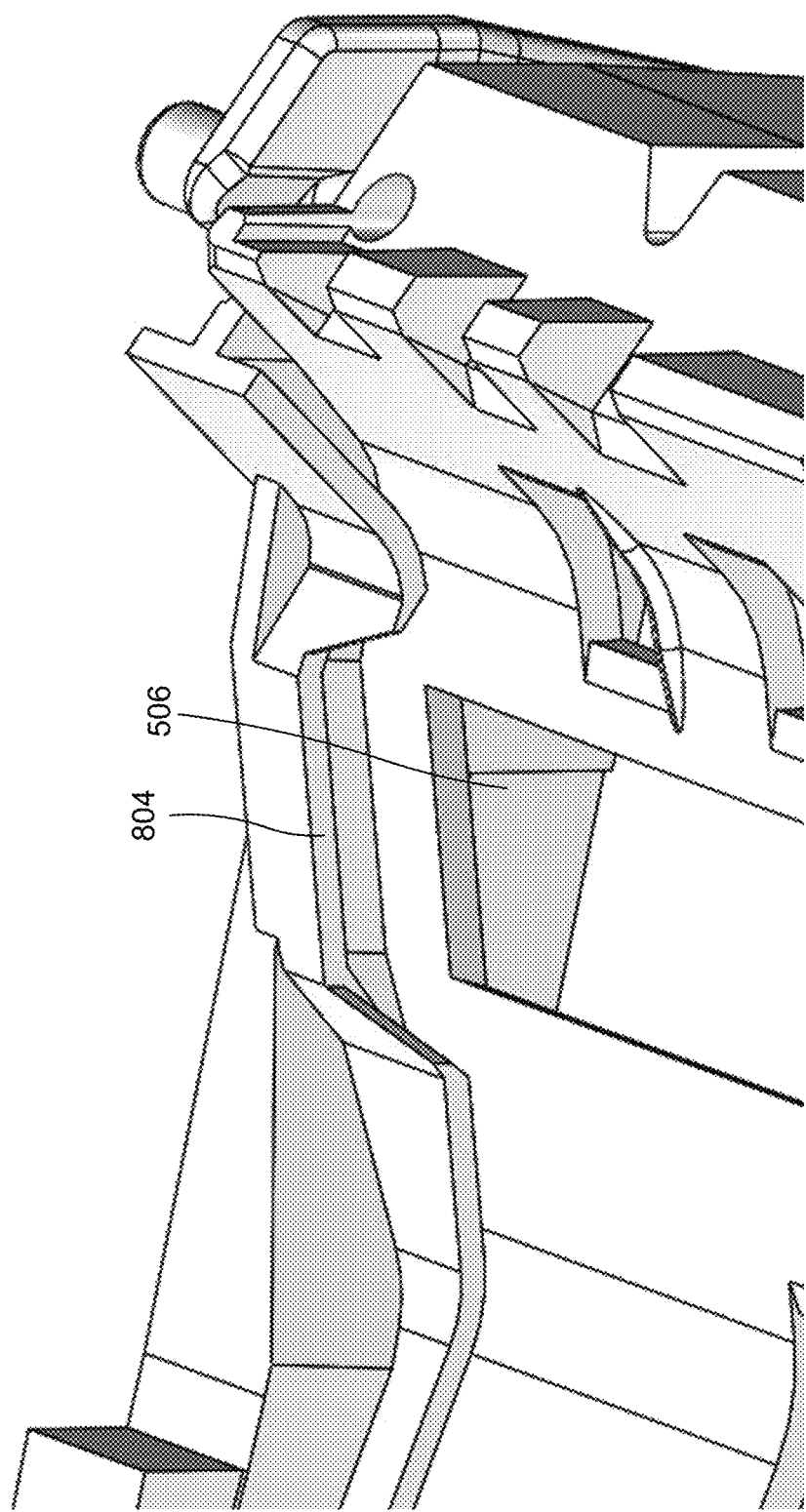
FIG. 8C illustrates an enlarged perspective view of a banknote path in accordance with various embodiments of the present disclosure.
Figure 8D:
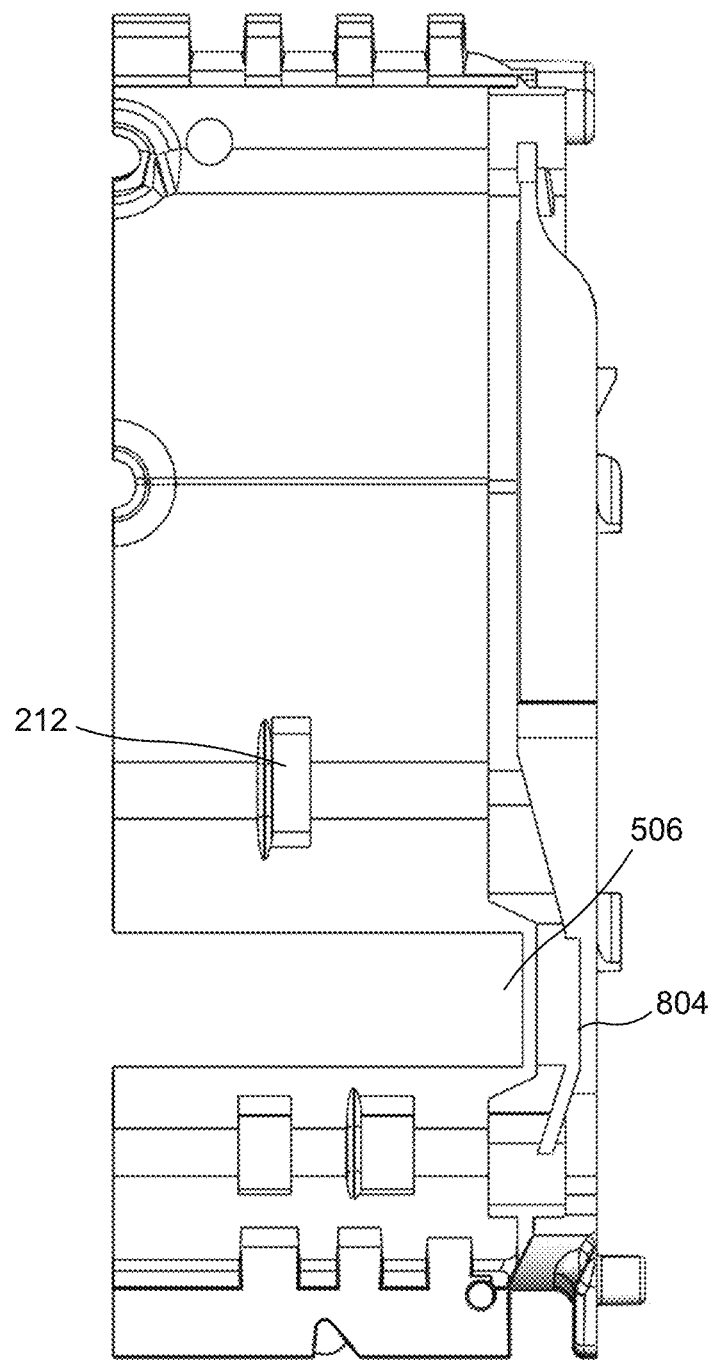
FIG. 8D illustrates a partial top view of a banknote path in accordance with various embodiments of the present disclosure.

FIGS. 8A-8D illustrate various views of the banknote path 208 in accordance with various embodiments of the present disclosure. FIG. 8A illustrates a side perspective view of the banknote path 208, FIG. 8B illustrates a top perspective view of the banknote path 208, FIG. 8C illustrates an enlarged perspective view of the banknote path 208, and FIG. 8D illustrates a partial top view of the banknote path 208. Banknote paths can come in a wide variety of configurations, and FIGS. 8A-8D do not limit the scope of this disclosure to any particular implementation of a banknote path. The banknote path 208 may be used in the currency handling apparatus 100 or the note validator 102 or 202.

As illustrated in FIGS. 8A-8D, the banknote path 208 includes a lower body 802 that includes no path overhangs, such that the entire banknote resides within the banknote path 208. Sides 804 of the body 802, along which the long edges of banknotes travel, widen in the banknote imaging zone 506 of the banknote path 208, and then narrow again once past the banknote imaging zone 506. This ensures that the banknote is flat in the banknote imaging zone 506 in the event that the more narrowed portions of the sides 804 of the banknote path 208 cause the banknote to bend. The steerable drive wheel or wheels 212 are disposed in front of the banknote imaging zone 506 so that banknotes are aligned before entering the banknote imaging zone 506. While FIG. 8A-8C illustrate two steerable drive wheels 212, additional wheels or a stop bar may be used to effectively straighten the banknote.

Figure 9:
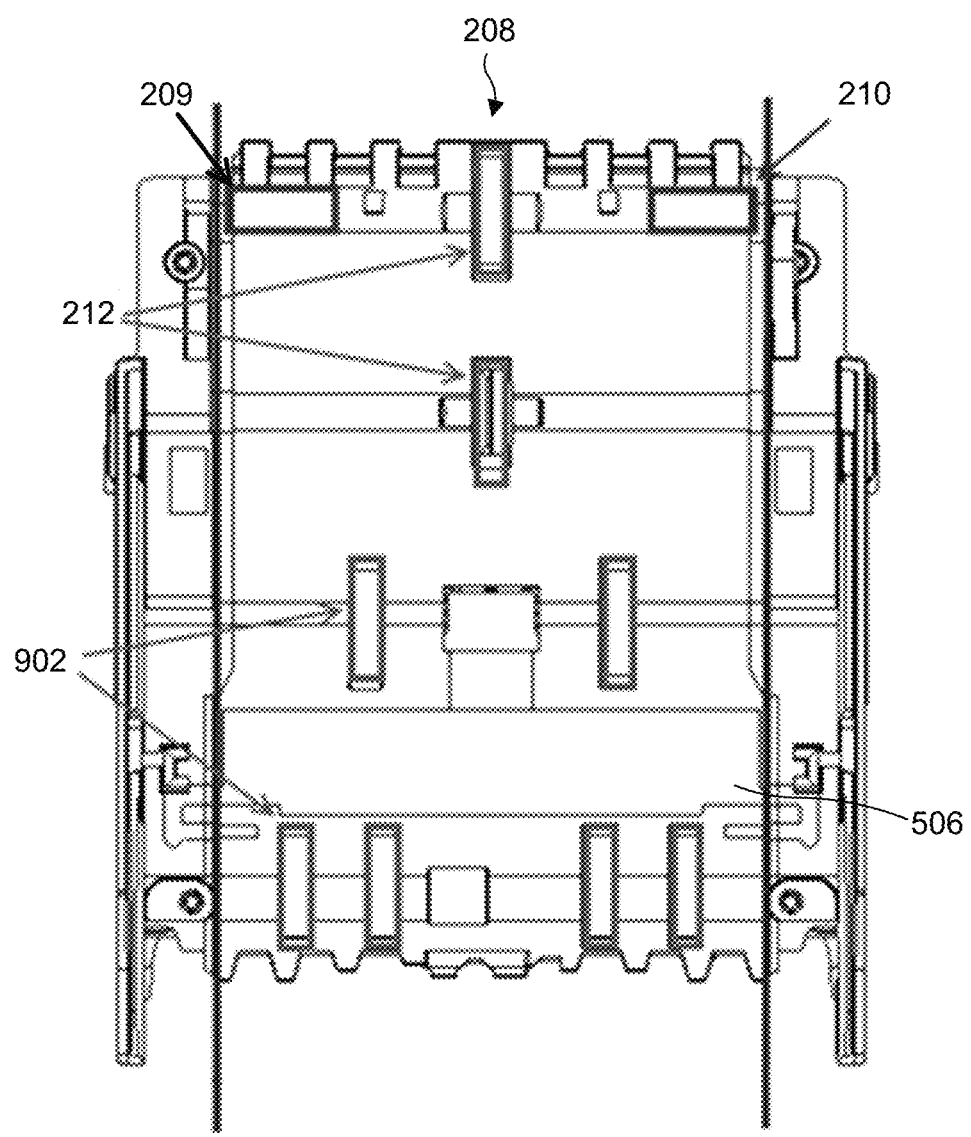
FIG. 9 illustrates a diagrammatic top view of a banknote path in accordance with various embodiments of the present disclosure.

FIG. 9 illustrates a diagrammatic top view of the banknote path 208 in accordance with various embodiments of the present disclosure. Banknote paths can come in a wide variety of configurations, and FIG. 9 does not limit the scope of this disclosure to any particular implementation of a banknote path. The banknote path 208 may be used in the currency handling apparatus 100 or the note validator 102 or 202. The banknote path 208 includes two edge detection surfaces 209, 210 located near the front of the banknote path 208 that would be near the front of a banknote validator. Each edge detection surface 209, 210 is disposed on an opposite side of the banknote path 208 such that each detection surface 209, 210 is capable of detecting a long edge of a banknote. One or more steerable drive wheels 212 may be disposed along the banknote path. For example, as illustrated in FIG. 9, a steerable drive wheel 212 is present in a center of the banknote path centered between the edge detection surfaces. FIG. 9 illustrates a second steerable drive wheel 212 centered further down the banknote path. In the embodiment illustrated in FIG. 9, past the second steerable drive wheel 212 and before the banknote imaging zone 506 in the banknote path 208 are one or more fixed drive wheels 902 configured to pull the banknote further into the banknote path 208 and into the banknote imaging zone 506. On the opposite side of the banknote imaging zone 506 are additional fixed drive wheels 902 to further pull the banknote into the banknote path 208.

The imaging system described herein thus allows for edges of the banknote to be detected and skew and banknote offset to be measured so that the system can determine how far to twist or rotate and offset the banknote to ensure the banknote is fully inside the imaging region 506.

Figure 10:
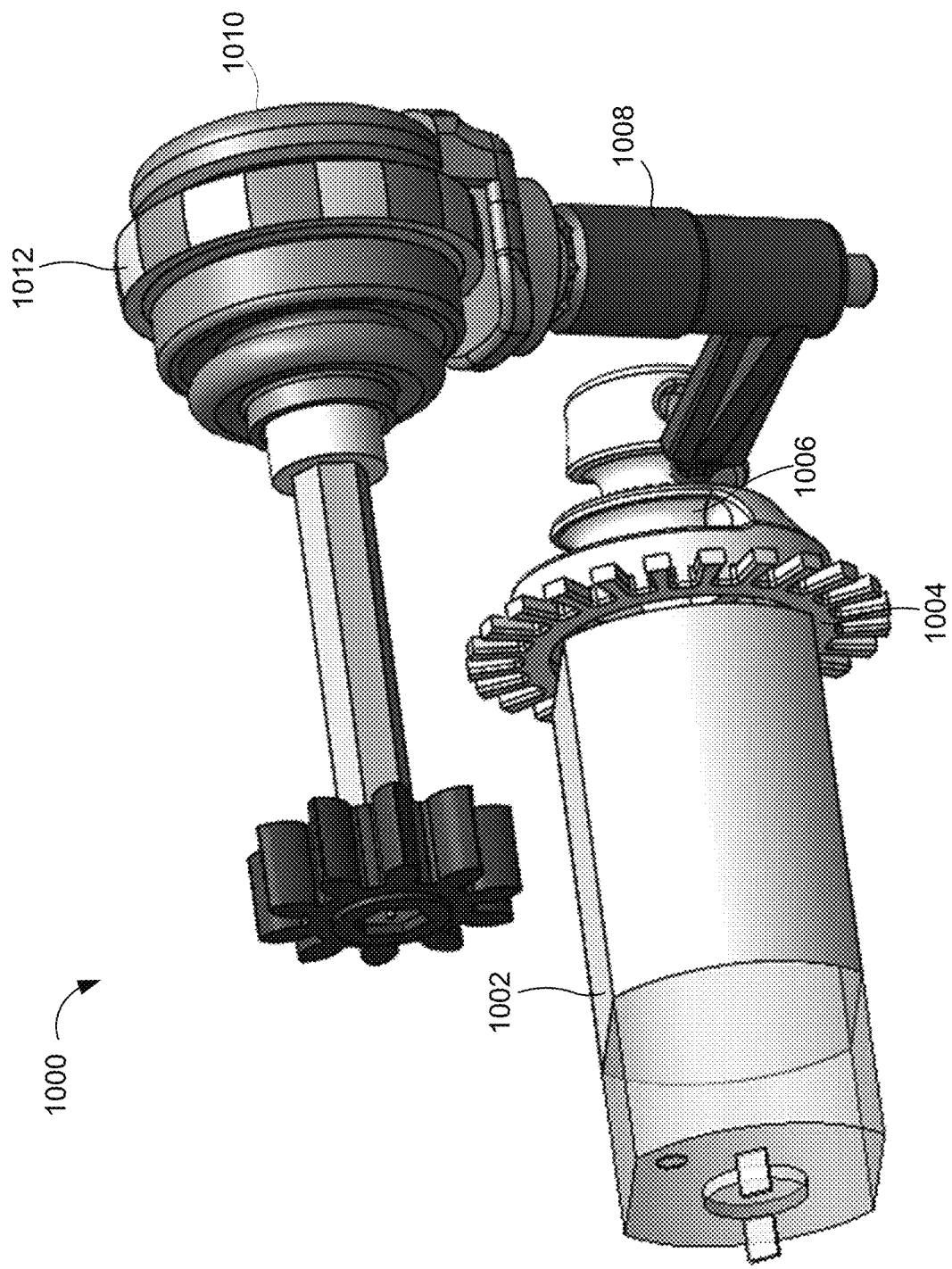
FIG. 10 illustrates a helical cam assembly for steering a drive wheel in accordance with various embodiments of the present disclosure.

FIG. 10 illustrates a helical cam assembly 1000 for steering a drive wheel in accordance with various embodiments of the present disclosure. Helical cam assemblies can come in a wide variety of configurations, and FIG. 10 does not limit the scope of this disclosure to any particular implementation of a helical cam assembly. The helical cam assembly may be used in the currency handling apparatus 100 or the note validator 102. The helical cam assembly includes a steering motor 1002 coupled to a tachometer disc 1004. A helical cam 1006 is coupled between the tachometer disk 1004 and a steering arm 1008, which the steering arm 1008 is in turn coupled to a bottom of a steering plate 1010 that is couples to a drive wheel 1012. The helical cam 1006 rotates on a motor shaft. Two rotations of the motor 1002 move a spherical tip of the steering arm 1008 from +θ degrees to −θ degree. A central position of the drive wheel 1012 is achieved by controlling the motor 1002 using feedback from a tachometer sensor and calibration can be achieved by driving the arm 1008 to one side and back by a known number of tachs. The helical cam 1006 assembly follows a curved arc of the steering arm 1008 and is designed to slow the rate of rotation at three key positions of left, right, and center.

Figure 11:
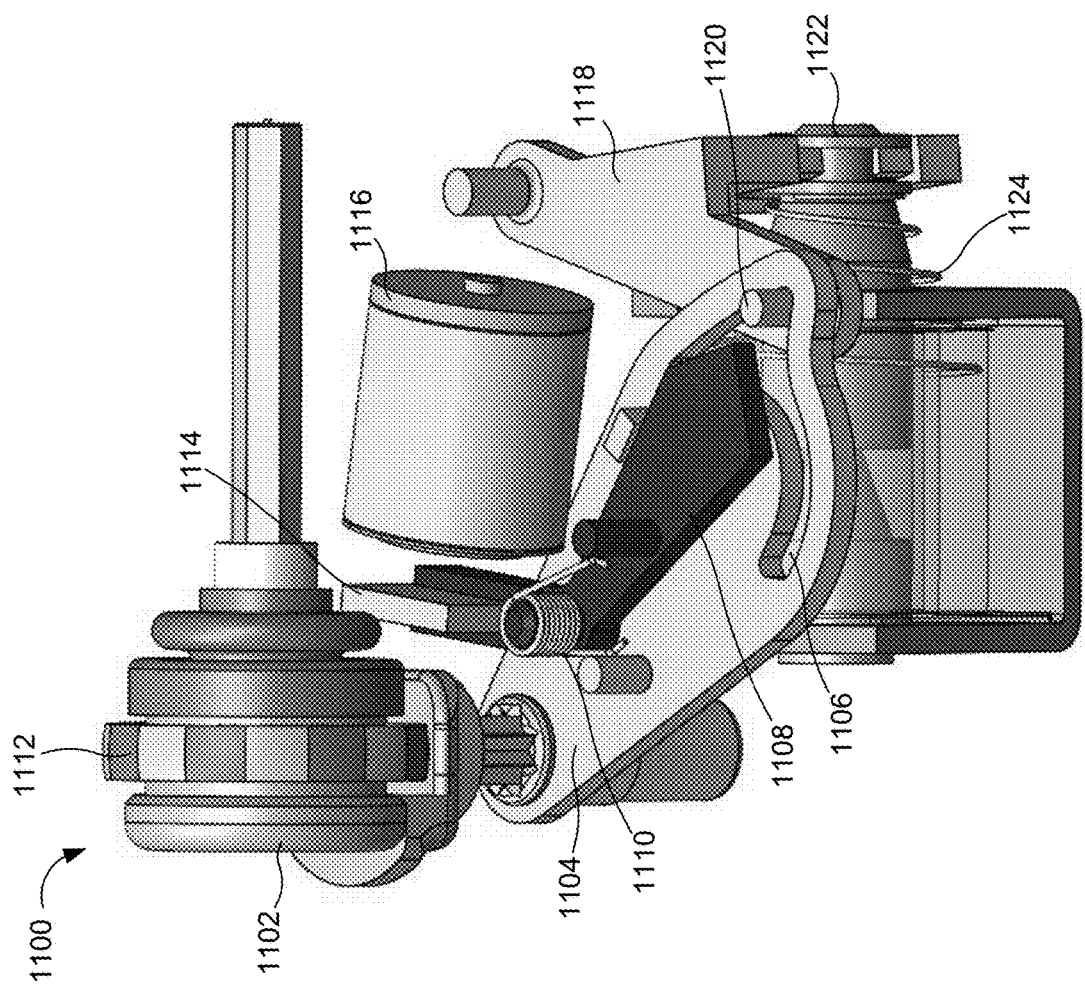
FIG. 11 illustrates a front perspective view of a solenoid or electromagnetic actuator assembly in accordance with various embodiments of the present disclosure.

FIG. 11 illustrates a front perspective view of a solenoid or electromagnetic actuator assembly 1100 for steering a drive wheel 1112 in accordance with various embodiments of the present disclosure. Solenoids and electromagnetic actuator assemblies can come in a wide variety of configurations, and FIG. 11 does not limit the scope of this disclosure to any particular implementation of a solenoid or electromagnetic actuator assembly. The solenoid or electromagnetic actuator assembly 1100 may be used in the currency handling apparatus 100 or the note validator 102 or 202.

The solenoid or electromagnetic actuator assembly 1100 includes a drive wheel 1112 connected on a steering plate 1102, the steering plate 1102 connected above a steering arm 1104. The steering arm 1104 includes a slot or groove 1106 within which a peg of an actuator arm 1108 is slotted. The actuator arm 1108 includes an actuator arm spring 1110 coupled thereon and also includes an actuator metal plate 1114 coupled to a low power actuator 1116. A solenoid arm 1118 having a peg 1120 is also slotted through the groove 1106 of the steering arm 1104 and is connected to an electromagnetic actuator or a higher power solenoid 1122. The solenoid or electromagnetic actuator assembly 1100 has a positive location at a central position to allow for banknotes to travel through the banknote path 208 without being turned. When there is no power, the solenoid arm 1118 is pushed onto a tapered feature by a solenoid return spring 1124. The electromagnetic actuator or solenoid 1122 provides the turning force for the steering by driving the peg 1120 through one of two positions in the slot 1106 to a final position in the end of the steering arm 1104. An electromagnet pulls the actuator arm 1104 at the start of the motion to determine which of the two paths the solenoid arm peg 1120 follows. If the actuator 1116 is powered the electromagnetic actuator or the solenoid 1122 drives the link in a clockwise direction. If the electromagnetic actuator or the solenoid 1122 is not powered, the link will turn in the default, anti-clockwise, direction. The solenoid or electromagnetic actuator assembly 1100 thus has three positive location positions. The actuator 1116 can act as a decision maker in the motion and may use a low amount of power, as the actuator 1116 only has to overcome the force of the actuator arm spring 1110. The end positions for the solenoid arm 1118 provide slop free positions for the steering arm 1104 and so reduce the mechanical tolerances of the system.

Figure 12A:
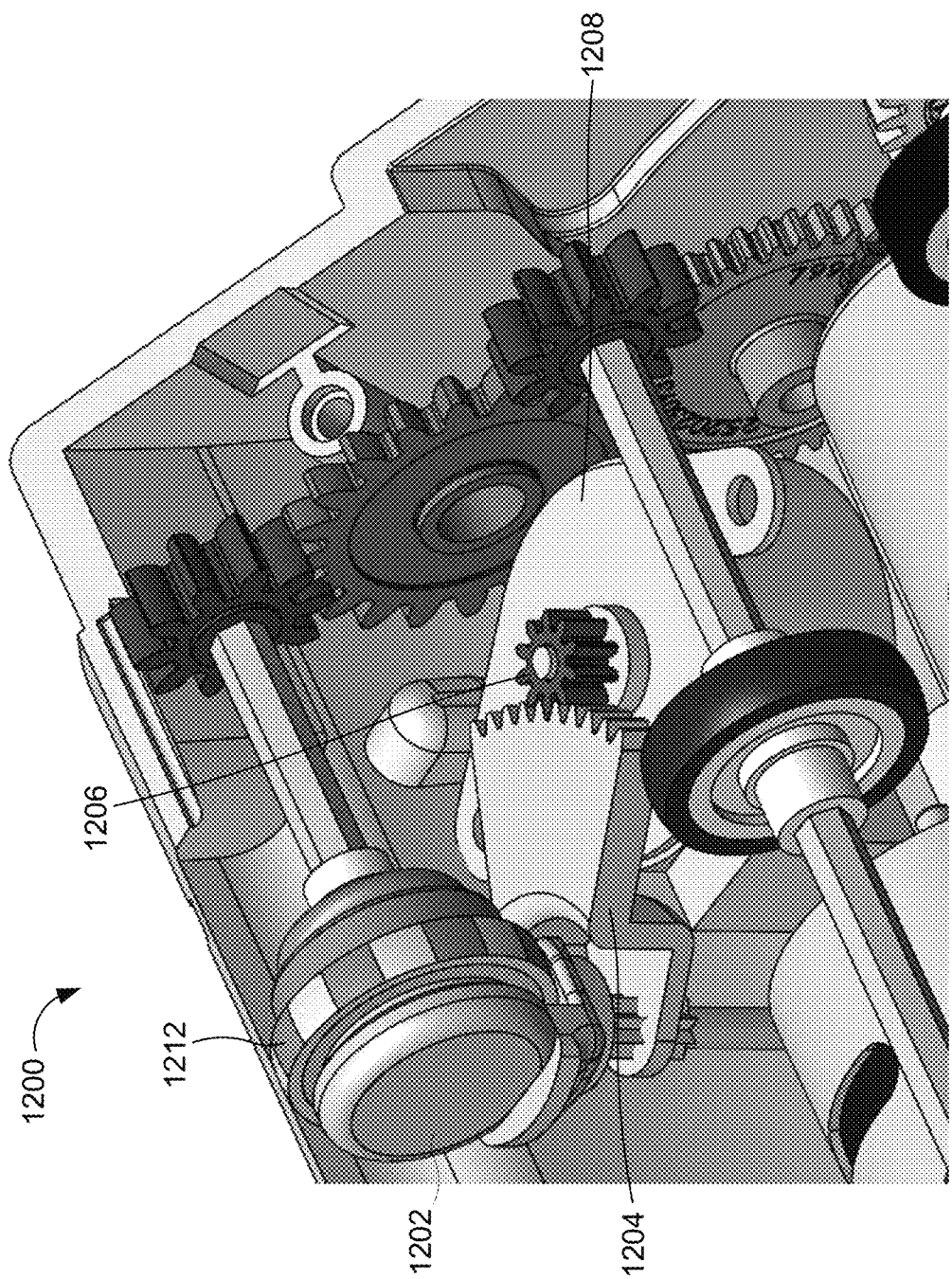
FIG. 12A illustrates a top perspective view of a motor assembly in accordance with various embodiments of the present disclosure.
Figure 12B:
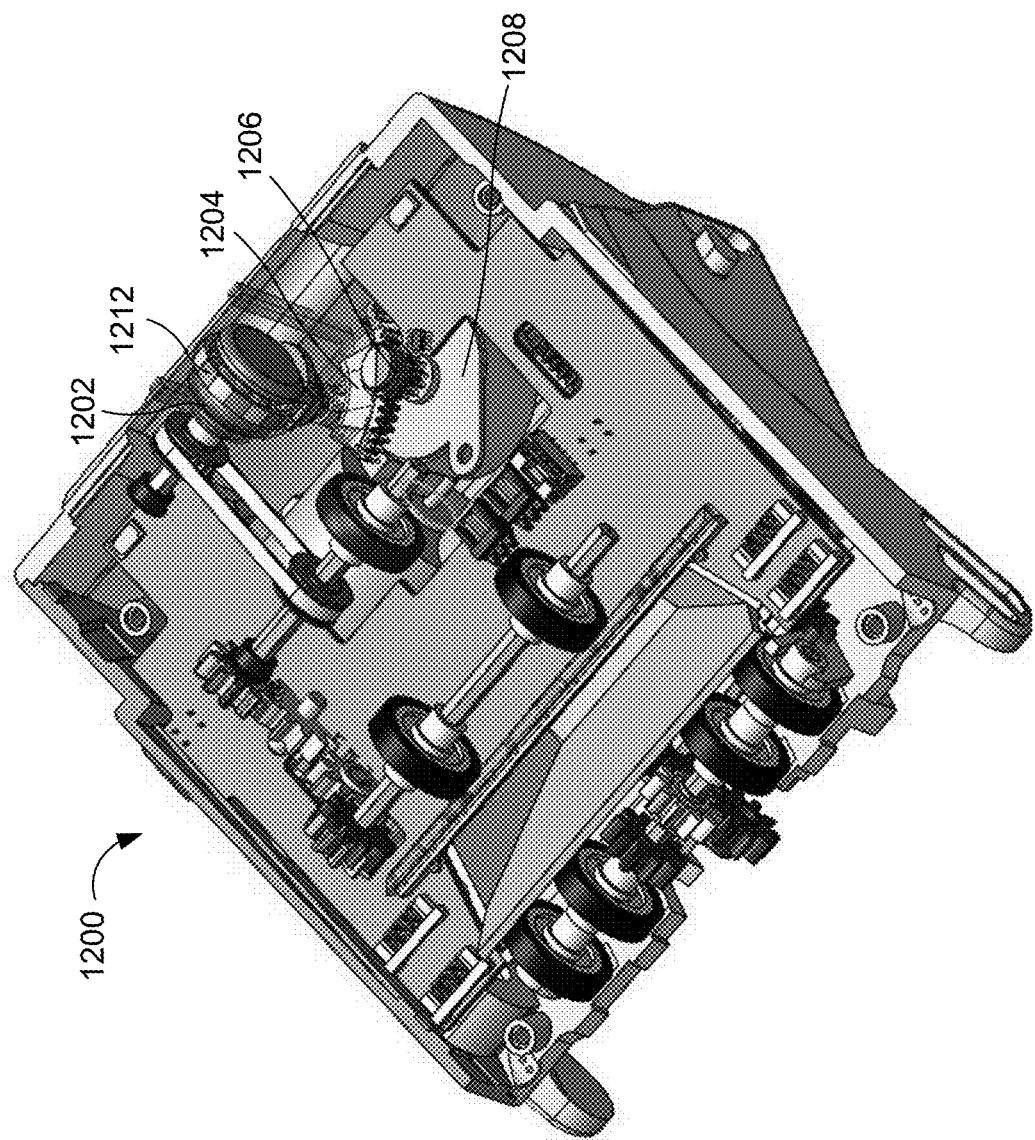
FIG. 12B illustrates a top view of a motor assembly in accordance with various embodiments of the present disclosure.

FIGS. 12A and 12B illustrate various views of a motor assembly 1200 in accordance with various embodiments of the present disclosure. FIG. 12A illustrates a top perspective view of a motor assembly 1200 according to various embodiments of the present disclosure and FIG. 12B illustrates a top view of a motor assembly 1200 in accordance with various embodiments of the present disclosure. Motor assemblies can come in a wide variety of configurations, and FIGS. 12A and 12B do not limit the scope of this disclosure to any particular implementation of a motor assembly. The motor assembly 1200 may be used in the currency handling apparatus 100 or the note validator 102 or 202.

The motor assembly 1200 includes a drive wheel 1212 coupled on a steering plate 1202. Coupled below the steering plate 1202 is a drive arm 1204 that includes a plurality of teeth that mesh with a drive gear 1206. A motor rotates the drive gear 1206 to subsequently rotate the drive arm 1204 and the drive wheel 1212. The motor assembly 1200 enables fast positioning of the steering and small angles. The combination of edge detection surfaces and steerable drive wheels enable banknote straightening to be achieved in a small space, and in a single motion of the banknote rather than requiring several movements of the banknote. A motor 1208 to steer banknote could be AC motor, DC motor, AC-DC motor, linear motor, servo motor, stepper motor or any other suitable drivers that are electrically/magnetically powered. In some embodiments, steering the drive wheel 1212 may also be performed by an electromagnetic actuator or solenoid/rotary solenoid instead of an electric motor. The position sensors could be inductive position sensors, magnetic position sensors, optical sensor (for example a wheel with slits connected to steering wheel position and photo interrupter), a potentiometer, tachs or quadrature tach on the motor etc. In some embodiments, instead of using a position of the motor, an angle of the drive wheel 1212 can also be measured.

Figure 13:
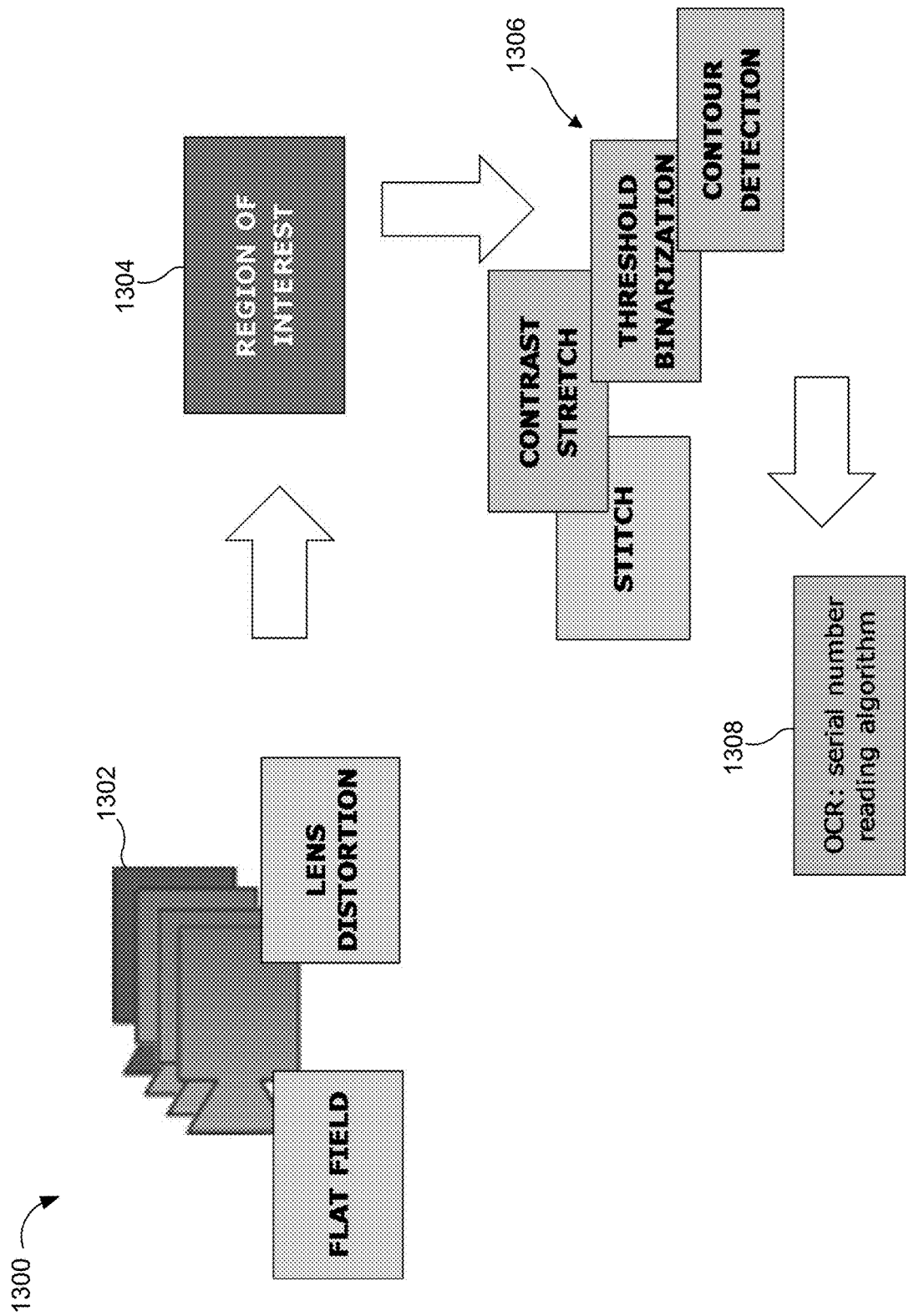
FIG. 13 illustrates a flowchart of a banknote imaging processing process in accordance with various embodiments of the present disclosure.

FIG. 13 illustrates a flowchart of a banknote imaging processing process 1300 in accordance with various embodiments of the present disclosure. Banknote imaging processes can come in a wide variety of configurations, and FIG. 13 does not limit the scope of this disclosure to any particular implementation of a banknote imaging process. The banknote imaging process 1300 may be used in association with the currency handling apparatus 100, the note validator 102 or 292, and/or the banknote imaging systems described herein.

The process includes receiving an image of a banknote received by a banknote validator as described herein at step 1302. The image may be enhanced via flat-field correction to remove artifacts from the image or altered to reduce lens distortion. At step 1304, a region of interest in the image can be selected to perform various additional processing functions at step 1306, such as contrast stretching, threshold binarization, contour detection, and/or image stitching. At step 1308, the image can then be analyzed, such as performing optical character recognition (OCR) on the image to read a serial number from the image of the banknote, or perform other banknote validation processes.

Figure 14A:
FIG. 14A illustrates an example of image stitching in accordance with various embodiments of the present disclosure.
Figure 14B:
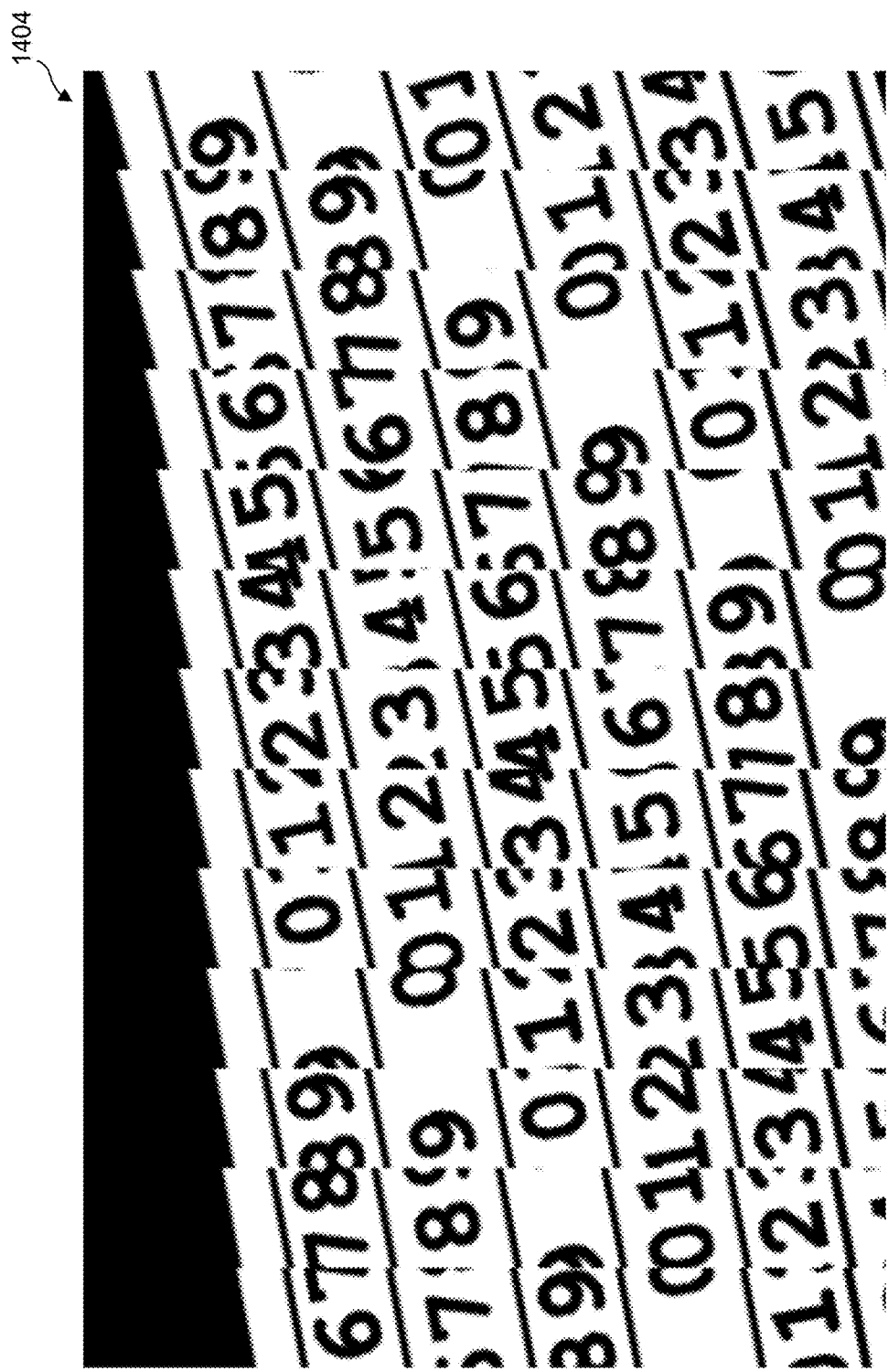
FIG. 14B illustrates an example of horizontal image stitching in accordance with various embodiments of the present disclosure.
Figure 14C:
FIG. 14C illustrates an example of a result of horizontal image stitching in accordance with various embodiments of the present disclosure.
Figure 14D:
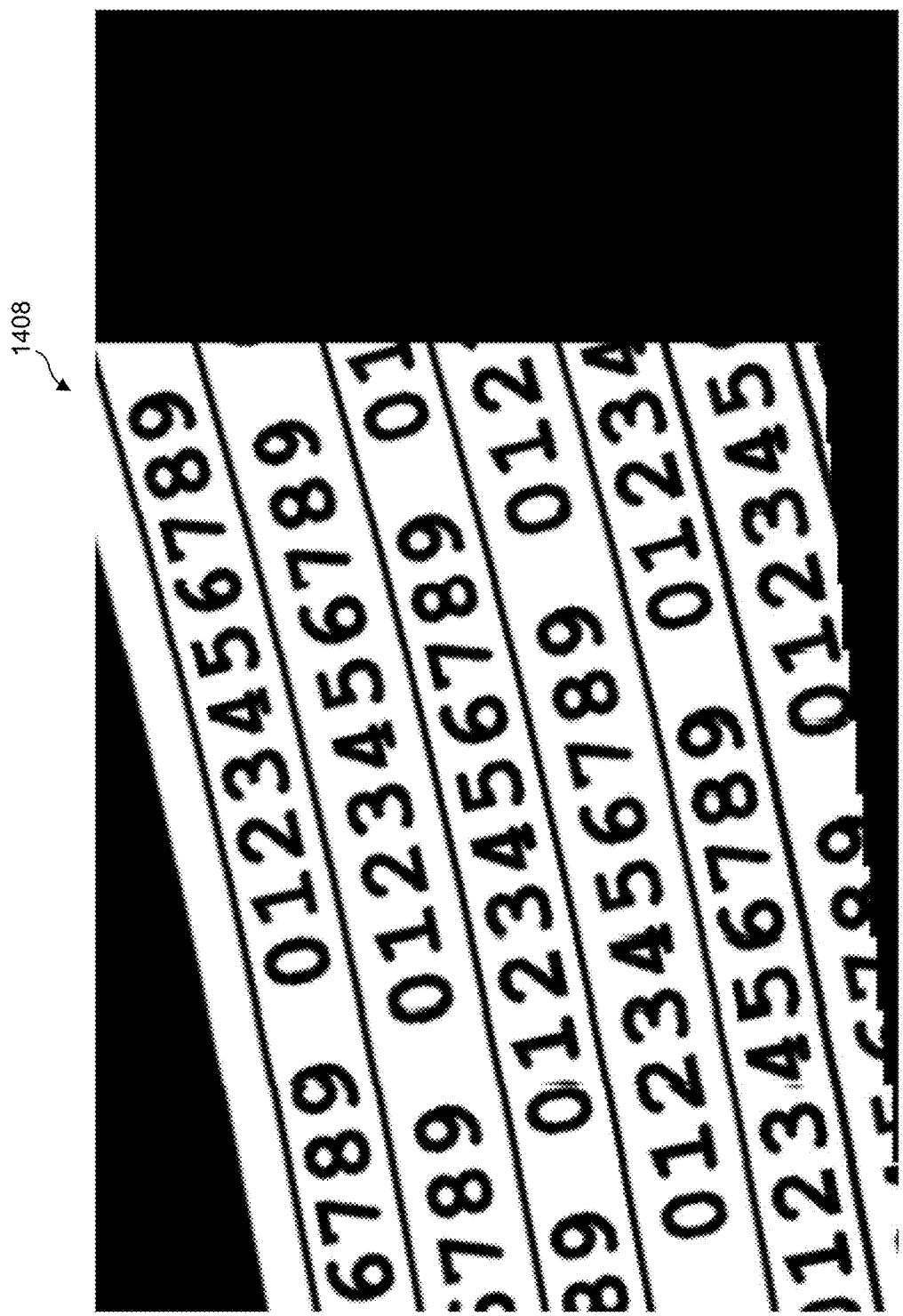
FIG. 14D illustrates an example of vertical image stitching in accordance with various embodiments of the present disclosure.

FIGS. 14A-14D illustrate an example of an image stitching process in accordance with various embodiments of the present disclosure. Image stitching processes can come in a wide variety of configurations, and FIGS. 14A-14D do not limit the scope of this disclosure to any particular implementation of an image stitching process. The image stitching process may be used in association with the currency handling apparatus 100, the note validator 102, and/or the banknote imaging systems disclosed herein. FIG. 14A illustrates an example of segments 1402 of a banknote captured by a camera or image sensor, FIG. 14B illustrates an example of horizontal image stitching 1404, FIG. 14C illustrates an example of a result of horizontal image stitching 1406, and FIG. 14D illustrates an example of vertical image stitching 1408.

As a banknote travels across the banknote imaging zone of the banknote validator, the camera or image sensors may take multiple images of the banknote. Since the field of view of the camera or image sensor may allow for a segment 1402 of the banknote to be captured in each image, each image including a portion of the banknote can be stitched together to form a larger image of the banknote, or an image of the full banknote. The cameras or image sensors can thus take multiple images that overlap slightly with respect to the area of the banknote that is captured, to ensure that there are no portions of the banknote left uncaptured. Once the images of the banknote are captured, segments can be matched and stitched together.

FIGS. 14B and 14C illustrate an example of horizontal stitching that includes matching segments of the image horizontally to similar features in other images. Once the segments are placed adjacent to each other as shown in FIG. 14B, the overlapping regions can be removed horizontally such as shown in FIG. 14C. Vertical stitching may then be performed as shown in FIG. 14D to align the segments vertically such that a complete image is created.

Figure 15:
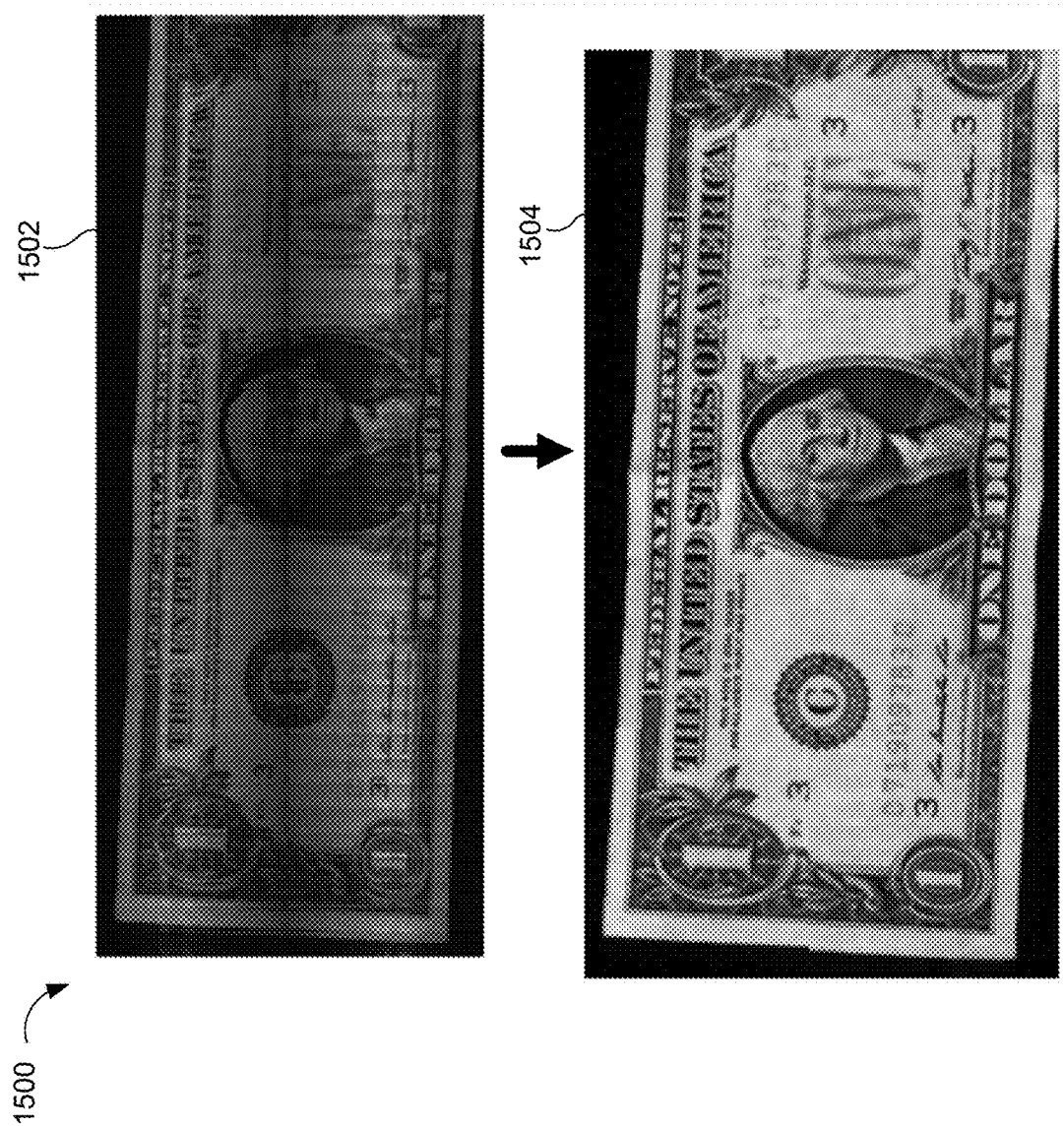
FIG. 15 illustrates an example of a banknote vertical and horizontal stitching process in accordance with various embodiments of the present disclosure.

FIG. 15 illustrates an example of a banknote vertical and horizontal stitching process 1500 in accordance with various embodiments of the present disclosure. During capture of the images of the banknote, a vertical offset may be applied such that areas surrounding the banknote are included in the images to ensure that the full banknote is captured, and to allow for banknotes of different sizes. Raw image data 1502 including each section of the banknote captured may have all sections of the banknote placed adjacent to each other, both vertically and horizontally, with overlapping regions placed together. As shown, in FIG. 15, the overlapping regions may be removed to create a full image of the banknote. As described with respect to FIG. 13, the image of the banknote captured by the cameras or image sensors may also be enhanced by image processing steps to create a higher quality image. The raw image data captured when an image of the banknote is first captured may be manipulated using processes such as flat field calibration and dark frame calibration, and the full processed image 1504 then assembled using image stitching.

Figure 16:
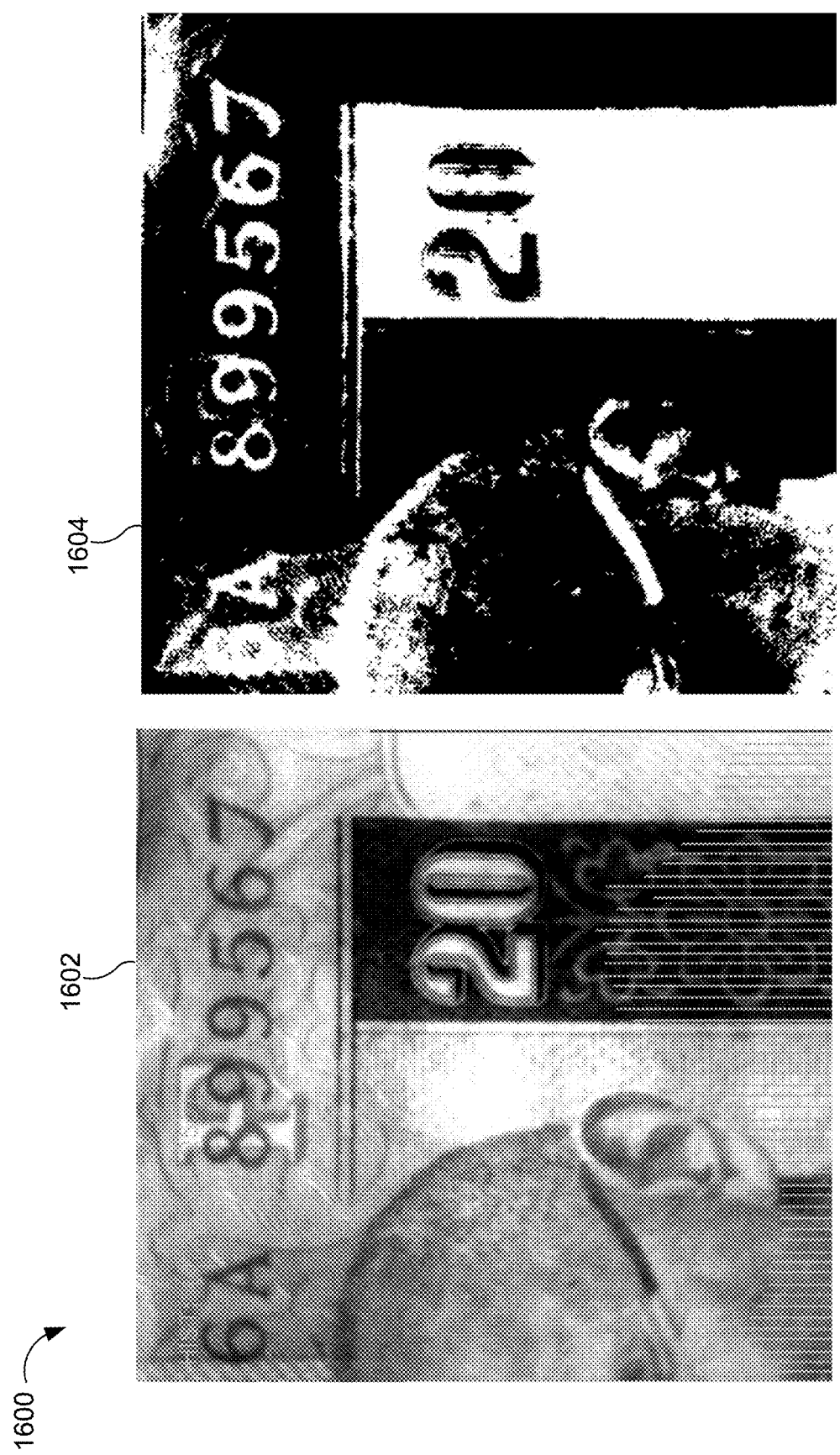
FIG. 16 illustrates an example of a contrast stretching process of an image of a banknote in accordance with various embodiments of the present disclosure.

FIG. 16 illustrates an example of a contrast stretching process 1600 of an image of a banknote in accordance with various embodiments of the present disclosure. Contrast stretching processes can come in a wide variety of configurations, and FIG. 16 does not limit the scope of this disclosure to any particular implementation of a contrast stretching process. The contrast stretching process 1600 may be used in association with the currency handling apparatus 100, the note validator 102 or 202, and/or the banknote imaging systems disclosed herein.

Contrast stretching, or normalization, can be used as an image enhancement technique to improve the contrast in the image of the banknote by stretching the range of intensity values the image contains to span a desired range of values, such as the full range of pixel values that the image type concerned allows. Performing contrast stretching can assist with OCR text recognition of text on the banknote and can assist with other image recognition processes. As illustrated in FIG. 16, a first image 1602 is captured by a camera or image sensor. A contrast stretched image 1604 is then produced by the contrast stretching process 1600, the contrast stretched image 1604 displaying emphasized elements of the image.

Figure 17:
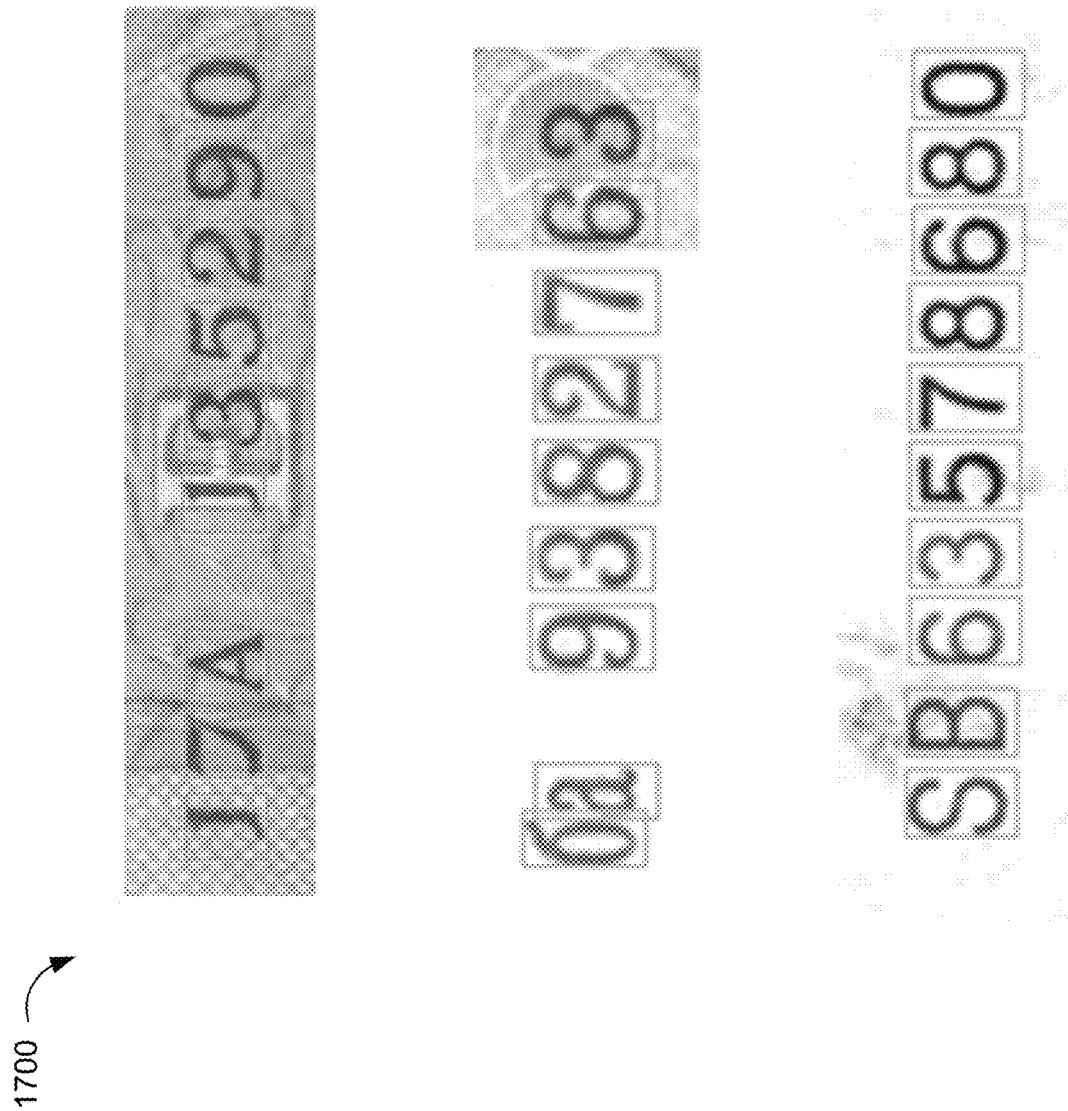
FIG. 17 illustrates an example of a serial number matching process in accordance with various embodiments of the present disclosure.

FIG. 17 illustrates an example of a serial number matching process 1700 in accordance with various embodiments of the present disclosure. Serial number matching processes can come in a wide variety of configurations, and FIG. 17 does not limit the scope of this disclosure to any particular implementation of a serial number matching process. The serial number matching process 1700 may be used in association with the currency handling apparatus 100, the note validator 102 or 202, and/or the banknote imaging systems disclosed herein.

The serial number matching process 1700 may be used in association with the currency handling apparatus 100, the note validator 102 or 202, and/or the banknote imaging systems disclosed herein. The process includes scanning one or more banknotes at a particular DPI to build a database of letters and numbers for a series of banknote sets. Banknote sets may be defined by country to keep a count of the number of banknotes are specific to that country. Once the database is populated with the letters and numbers scanned from the banknotes, a template matching process may be performed to recognize new banknotes received by the banknote validator. As illustrated in FIG. 17, alphanumeric characters on OCRed banknotes can be recognized by the system to determine in order to match the serial number of banknotes.

Figure 18:
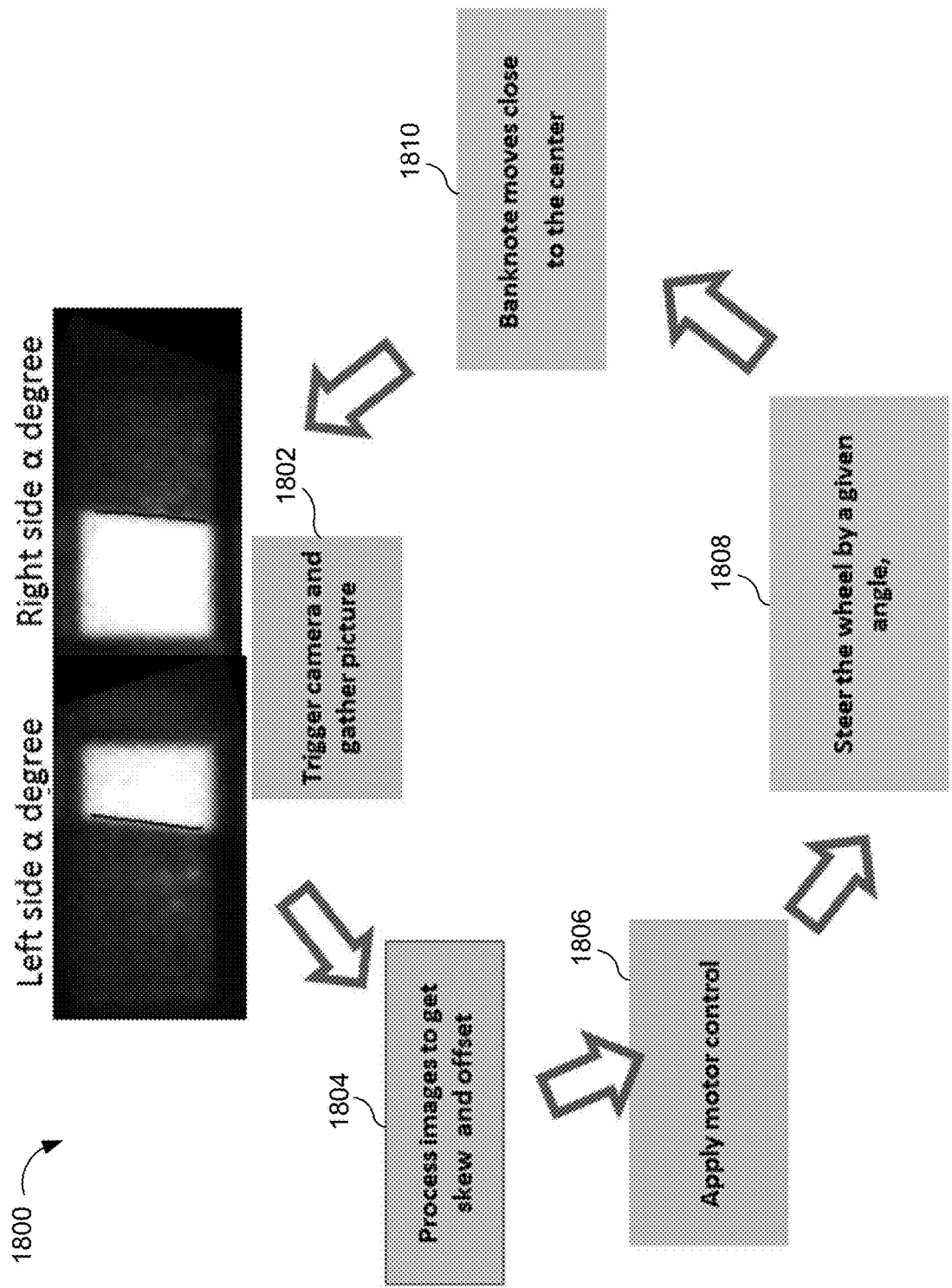
FIG. 18 illustrates an example of a banknote alignment process in accordance with various embodiments of the present disclosure.

FIG. 18 illustrates an example of a banknote alignment process 1800 in accordance with various embodiments of the present disclosure. Banknote alignment processes can come in a wide variety of configurations, and FIG. 18 does not limit the scope of this disclosure to any particular implementation of a banknote alignment process. The banknote alignment process 1800 may be used in association with the currency handling apparatus 100, the note validator 102 or 202, and/or the banknote imaging systems disclosed herein.

The process 1800 starts at step 1802 when the camera or image sensor is triggered when a banknote enters the banknote validator, the camera or image sensor capturing one or more images of the banknote edges. The one or more images of the banknote are processed at step 1804 to determine a skew and offset of the banknote. Based on the skew and offset, motor control is applied at step 1806 and a steerable drive wheel is turned at a given angle at step 1808, causing the banknote to be turned closer to the center of the banknote path at step 1810. The process may loop, again capturing one or more images of the edges of the banknote at step 1802, and processing the one or more images at step 1804 to determine if a skew or offset still exists. If so, the process of turning the banknote using the steerable drive wheel at steps 1806-1810 may repeat. The process may be repeated as the banknote travels within the banknote imaging areas of the banknote path to continuously align the banknote in the banknote path.

Figure 19:
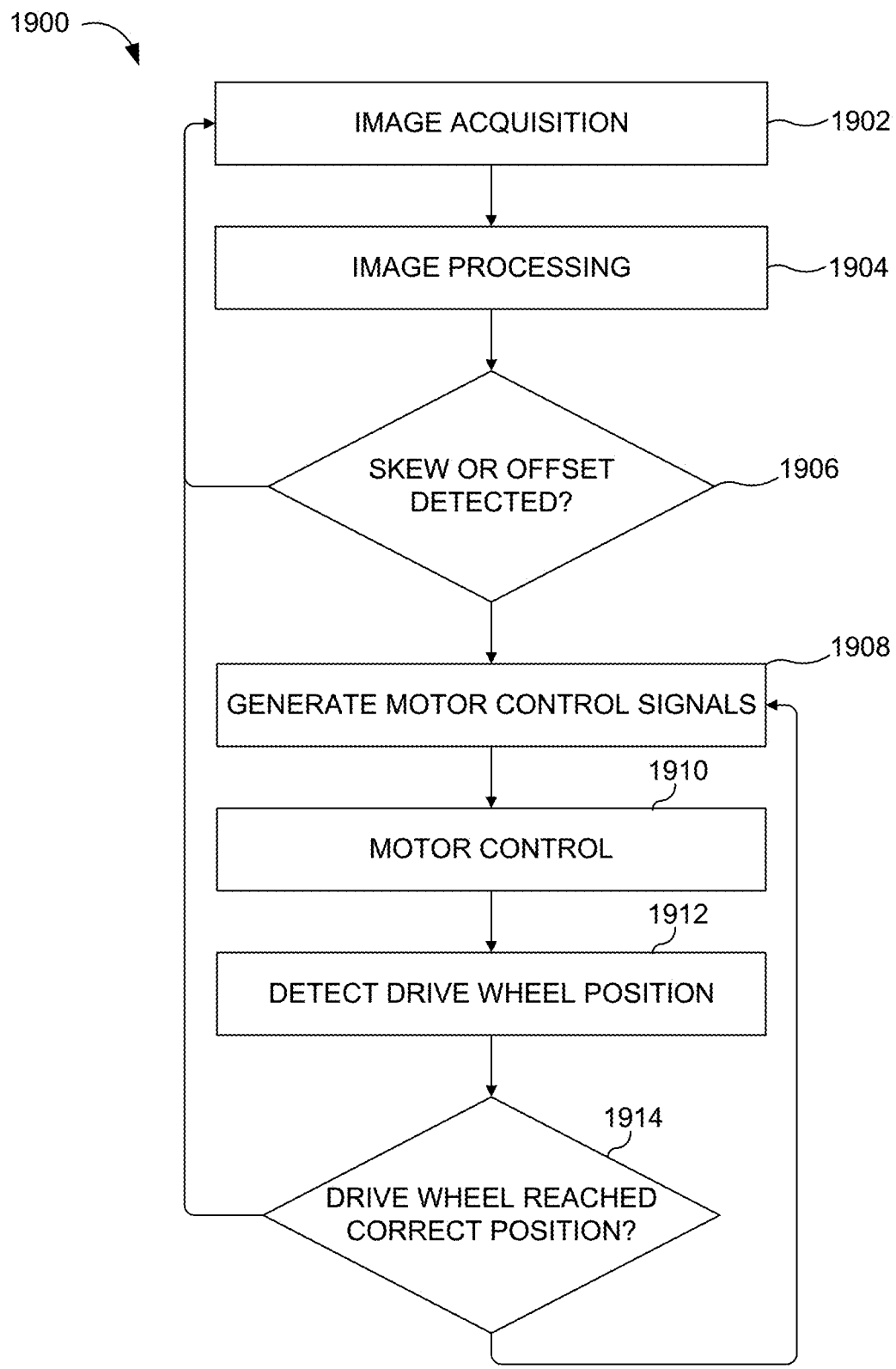
FIG. 19 illustrates another example of a banknote alignment process in accordance with various embodiments of the present disclosure.

FIG. 19 illustrates another example of a banknote alignment process 1900 in accordance with various embodiments of the present disclosure. Banknote alignment processes can come in a wide variety of configurations, and FIG. 19 does not limit the scope of this disclosure to any particular implementation of a banknote alignment process. The banknote alignment process 1900 may be used in association with the currency handling apparatus 100, the note validator 102 or 202, and/or the banknote imaging systems disclosed herein.

The process 1900 begins at step 1902 when one or more images are acquired of edges of a banknote by one or more cameras or image sensors in the capturing images of the banknote path. The one or more images are processed at step 1904 to determine if a skew or offset of the banknote exists. The system can apply the perspective transform T with the bilinear interpolation to the detected field of view. The system can scan from one side to another along parallel horizontal lines until either the intensity threshold or a derivative criterion is matched and the edge point position is saved. A linear (averaging) or nonlinear (median) smoothing filter could be applied during this process to improve performance of the edge detection algorithm. The system then fits the least squares line to calculate the skew angle and the offset. If at decision block 1906 a skew or offset is not detected, the process 1900 moves back to step 1902 to capture one or more images of the banknote path to further capture images of the banknote, another banknote, foreign objects, or other objects in the banknote path.

Upon detection of a skew or offset at decision block 1906, motor control signals are generated at step 1908 and a motor at step 1910 turns a steerable drive wheel to move the banknote closer to the center of the banknote path. At step 1912, a position sensor, or one or more other devices for detecting a position of the drive wheel, can be used to detect and provide feedback regarding whether the motor reached the correct position. If at decision block 1914 the sensor detects that the drive wheel did not reach the correct position, the process 1900 moves back to step 1908, where the system or the position sensor generates additional signals or commands to move the drive wheel to the correct position. Similarly, if the motor over executes the commanded movement then feedback from the sensor notifies a controller and a proper remedy can be executed to move the banknote to the center of the path. If at decision block 1914 the drive wheel reached the correct position, the process 1900 may be repeated as the banknote travels through the banknote imaging areas of the banknote path.

Figures 20A, 20B:
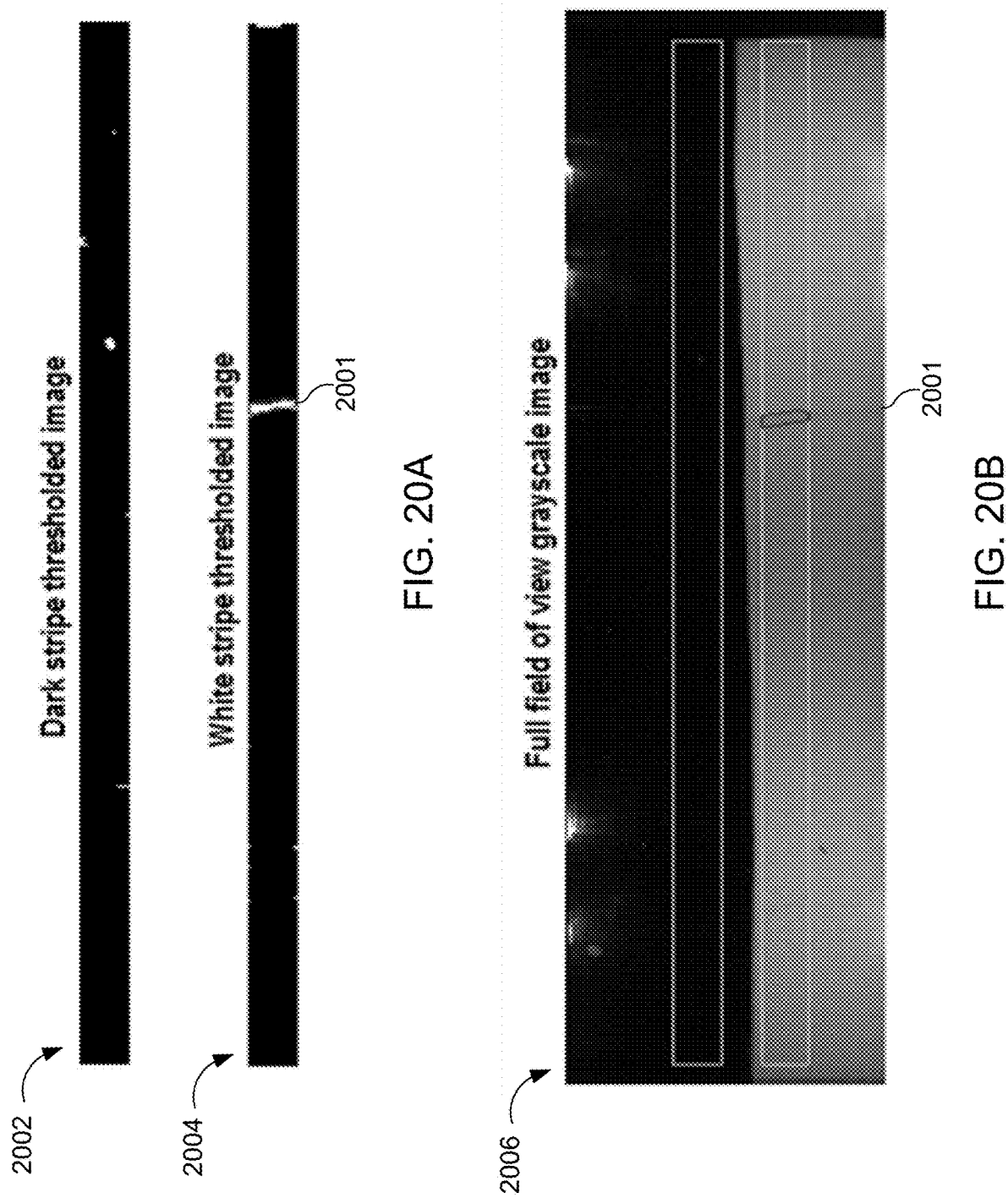
FIG. 20A illustrates example thresholded images of both a dark region and a reflective region when a foreign transparent object is in a banknote path in accordance with various embodiments of the present disclosure.
FIG. 20B illustrates a full field view of a banknote path when a foreign transparent object is present in a banknote path in accordance with various embodiments of the present disclosure.

FIGS. 20A and 20B illustrate example captured images of a foreign transparent object 2001 in the banknote path in accordance with various embodiments of the present disclosure. FIG. 20A illustrates an example thresholded image 2002 of the dark region and an example thresholded image 2004 of the reflective region when the foreign transparent object 2001 is in the banknote path in accordance with various embodiments of the present disclosure. FIG. 20B illustrates a full field view image 2006 of the banknote path when the foreign transparent object 2001 is present in the banknote path in accordance with various embodiments of the present disclosure. As shown in FIGS. 20A and 20B, a transparent foreign object 2001, such as a string or wire, is reflected off the reflective surface, captured in image 2004 and 2006, such that the presence of the foreign object 2001 is detected in images 2004 and 2006 captured of the reflective surface in the banknote path. As shown in the example images 2002 and 2006 of FIGS. 20A and 20B, the transparent foreign object 2001 is less detectable over the dark region.

Figure 21A:
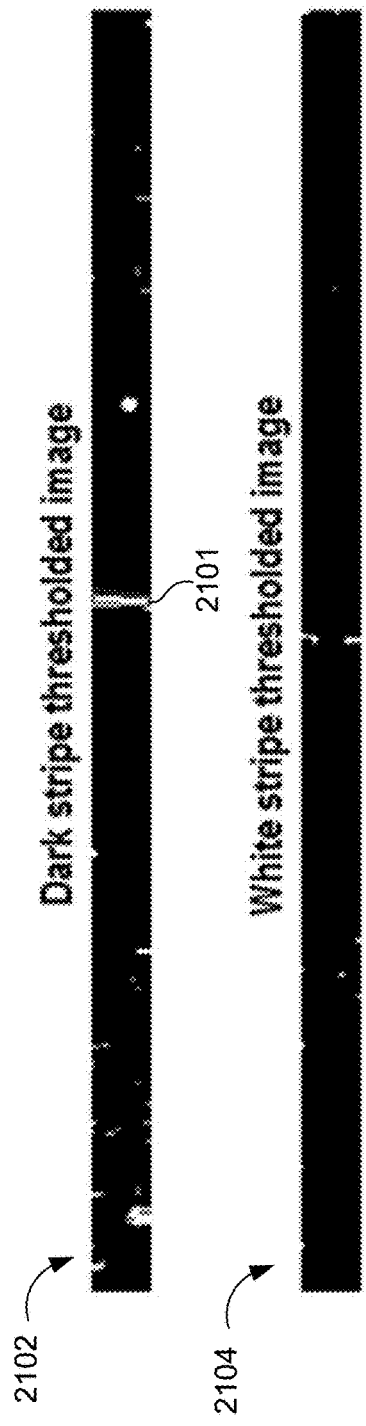
FIG. 21A illustrates example thresholded images of both a dark region and a reflective region when a foreign white object is in a banknote path in accordance with various embodiments of the present disclosure.
Figure 21B:
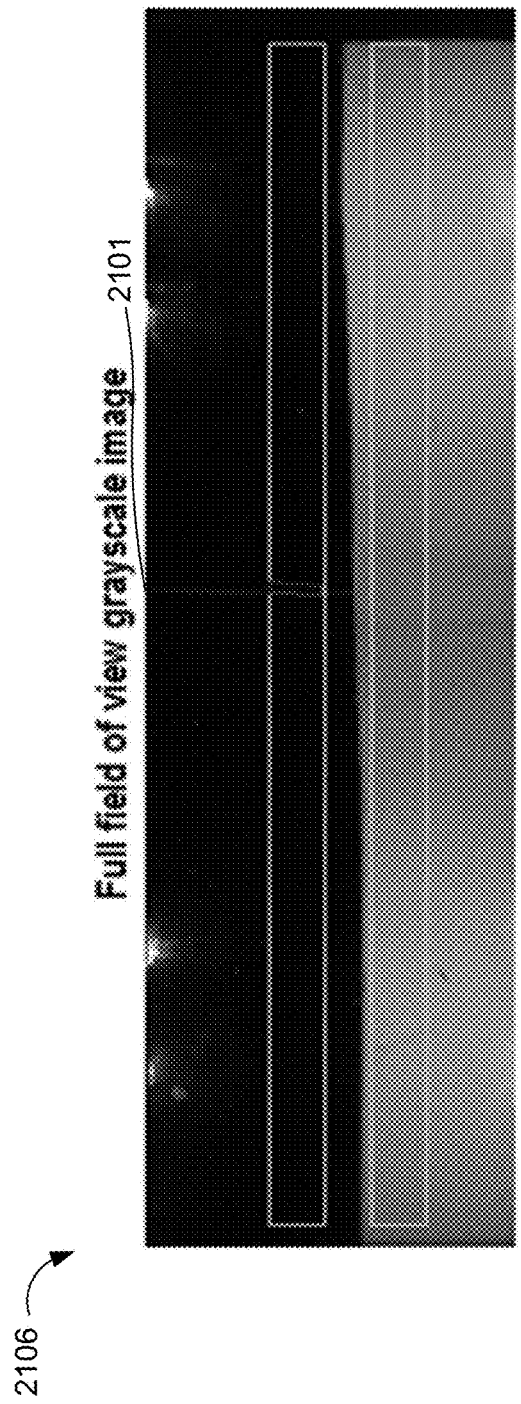
FIG. 21B illustrates a full field view of a banknote path when a foreign white object is present in a banknote path in accordance with various embodiments of the present disclosure.

FIGS. 21A and 21B illustrate example captured images of a foreign white or other bright-colored object 2101 in the banknote path in accordance with various embodiments of the present disclosure. FIG. 21A illustrates an example thresholded image 2102 of the dark region and an example thresholded image 2104 of the reflective region when the foreign white object 2101 is in the banknote path in accordance with various embodiments of the present disclosure. FIG. 21B illustrates a full field view image 2106 of the banknote path when the foreign white object 2101 is present in the banknote path in accordance with various embodiments of the present disclosure. As shown in FIGS. 21A and 21B, the white or otherwise bright-colored foreign object 2101, such as a string or wire, is contrasted against the dark region such that the presence of the foreign object is detected in the images 2102 and 2106 captured of the dark region in the banknote path. As shown in the example images 2104 and 2106 of FIGS. 21A and 21B, the white or other otherwise bright-colored foreign object 2101 may be less detectable over the reflective surface.

Figure 22A:
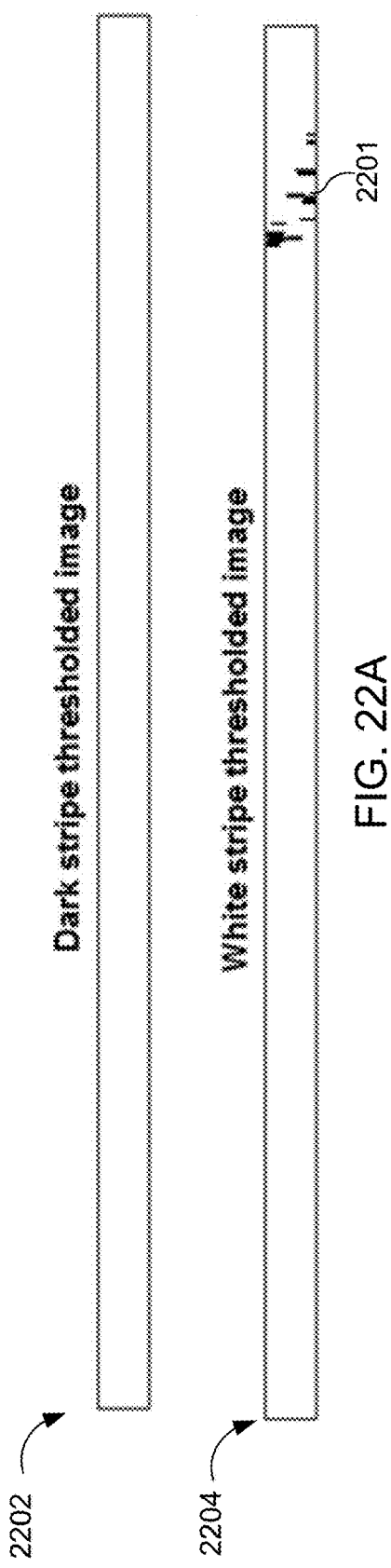
FIG. 22A illustrates example thresholded images of both a dark region and a reflective region when a foreign transparent object is in a banknote path in accordance with various embodiments of the present disclosure.
Figure 22B:
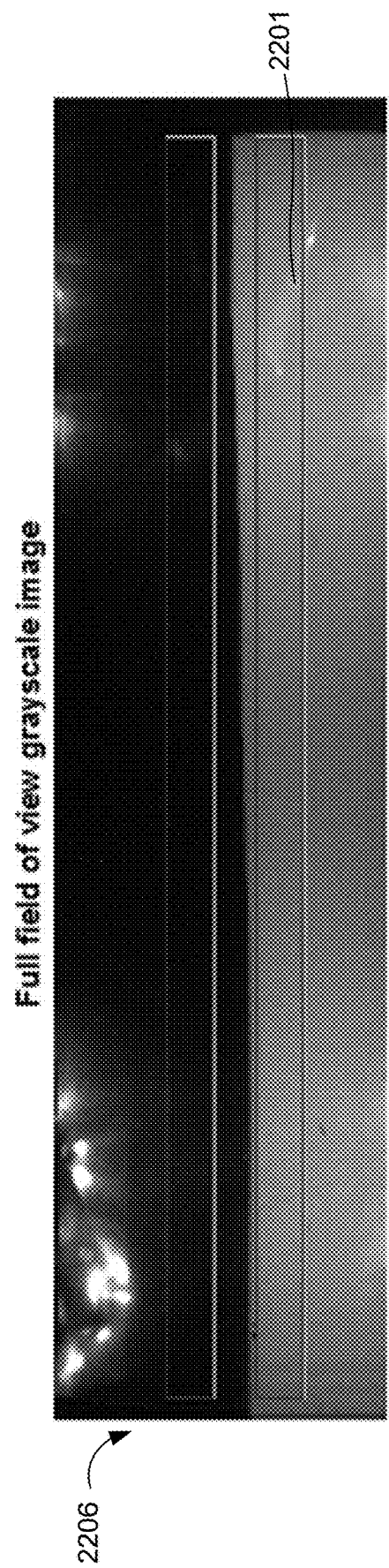
FIG. 22B illustrates a full field view of a banknote path when a foreign transparent object is present in a banknote path in accordance with various embodiments of the present disclosure.

FIGS. 22A and 22B illustrate example captured images of a foreign transparent object 2201 in the banknote path, where the foreign transparent object 2201 has a width similar to the width of a banknote in accordance with various embodiments of the present disclosure. FIG. 22A illustrates an example thresholded image 2202 of the dark region and an example thresholded image 2204 of the reflective region when the foreign transparent object 2201 is in the banknote path in accordance with various embodiments of the present disclosure. FIG. 22B illustrates a full field view image 2206 of the banknote path when the foreign transparent object 2201 is present in the banknote path in accordance with various embodiments of the present disclosure. As shown in FIGS. 22A and 22B, a transparent foreign object 2201 that has a similar width as that of the banknote may reflect off the reflective surface such that the presence of the foreign object 2201 is detected at least over a portion of the reflective surface in the image 2204 and 2206 captured of the reflective surface in the banknote path. For example, in images 2204 and 2206 the transparent foreign object 2201 produces a reflection over the reflective surface at one end of the reflective surface, which is captured in the images 2204 and 2206 of the reflective surface. As shown in the example images 2202 and 2206 of FIGS. 20A and 20B, a transparent foreign object may be less detectable over the dark region.

Figure 23:
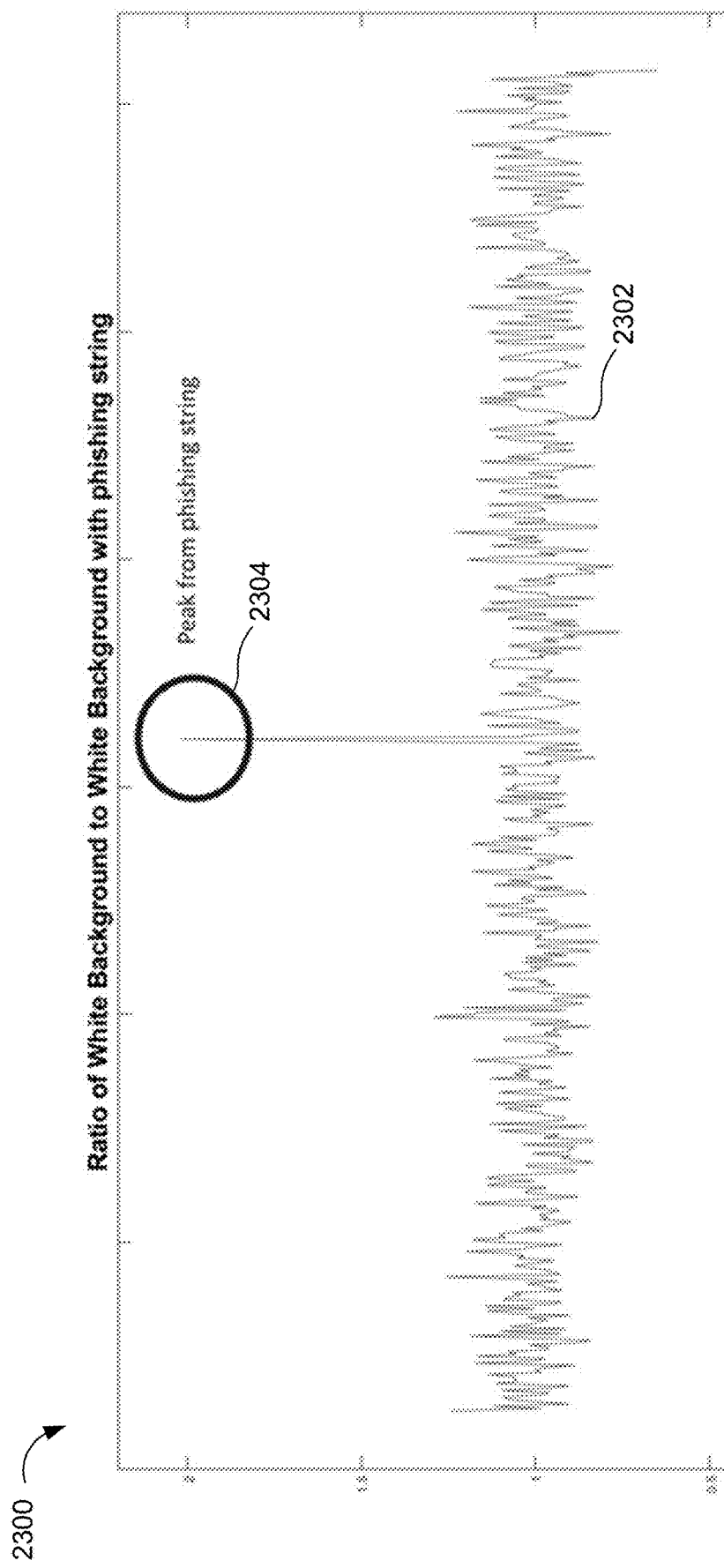
FIG. 23 illustrates a signal ratio of a reflective surface to a reflective surface with a foreign object present in accordance with various embodiments of the present disclosure.

FIG. 23 illustrates a signal ratio 2300 of the reflective surface to the reflective surface with a foreign object present in accordance with various embodiments of the present disclosure. As shown in FIG. 23, a signal 2302 remains relatively constant while a foreign object is not over the reflective surface. When a foreign object crosses over the reflective surface, the signal 2302 spikes to a high peak 2304 and then returns to normal after the foreign object moves out of the area over the reflective surface.

Figure 24:
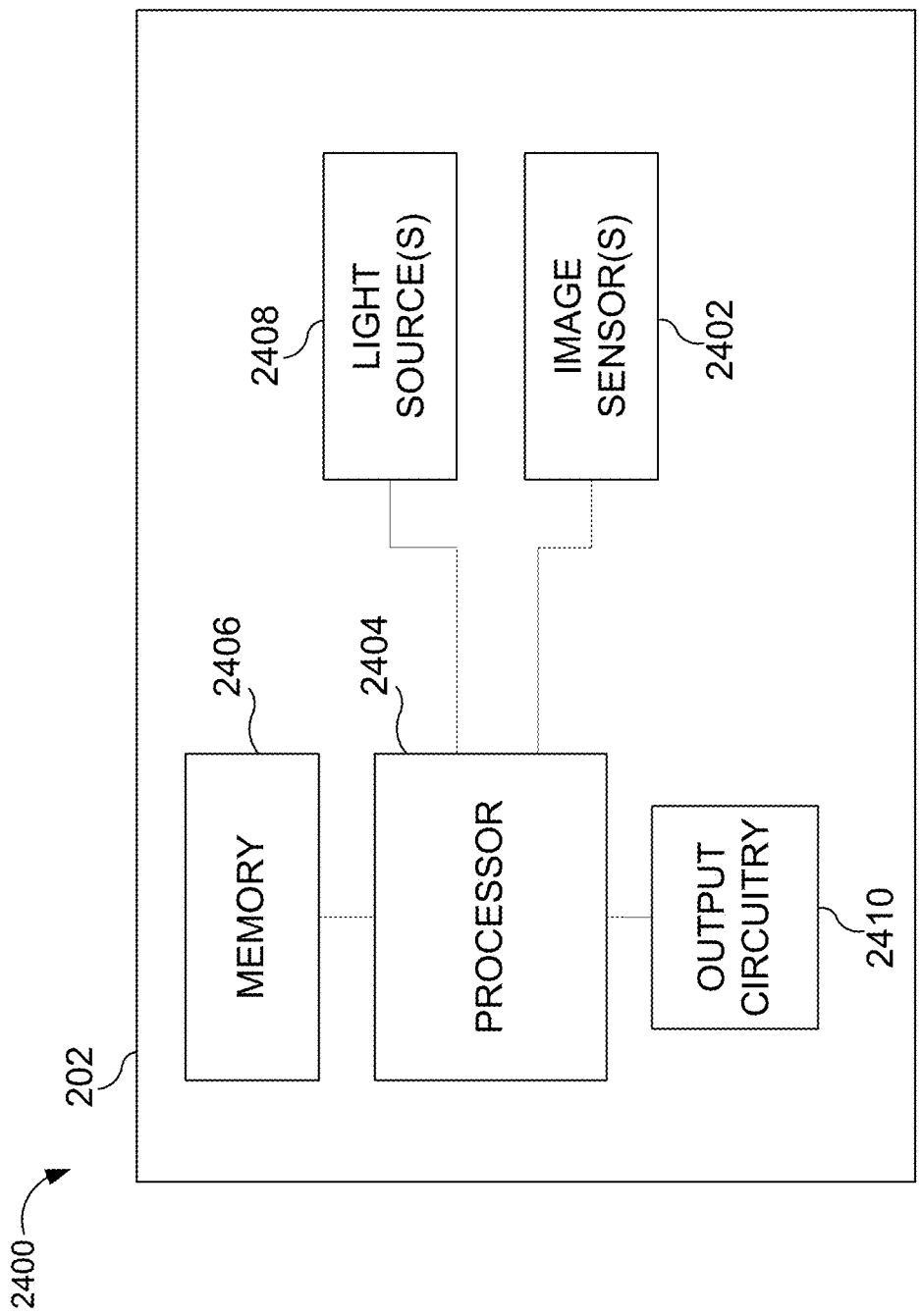
FIG. 24 illustrates a block diagram of the note validator image processing system in accordance with various embodiments of the present disclosure.

FIG. 24 illustrates a block diagram of the note validator image processing system 2400 in accordance with various embodiments of the present disclosure. Image processing systems can come in a wide variety of configurations, and FIG. 24 does not limit the scope of this disclosure to any particular implementation of an image processing system. The image processing system 2400 illustrated in FIG. 24 can be used in the currency handling apparatus 100, the note validator 102 or 202, and/or the banknote imaging systems disclosed herein.

The system 2400 includes one or more image sensors 2402. In some embodiments the image sensors 2402 can comprise the first and second cameras or image sensors 201, 203 disclosed herein. The image sensors 2402 are communicatively coupled with a processor 2404. The processor 2404 can signal to the image sensors 2402 when to capture images of the banknote path. The processor 2404 can also process images captured by the image sensors 2402 in accordance with the image processing processes disclosed herein. Captured and/or processed images can be stored in a memory 2406 accessible by the processor 2404 to retrieve and store images. The processor 2404 can also be communicatively coupled to one or more light sources 2408, such as light source 308, to transmit signals to the one or more light sources 2408 to command the one or more light sources 2408 to emit into the banknote path. The one or more light sources 2408 can be a LED that may emit light in UV, visible or infrared wavelengths. Output circuitry 2410 operatively coupled to the processor 2410 can allow for signals and information to be transmitted, such as presenting images or information to a user on a display or other output device.

Figure 25:
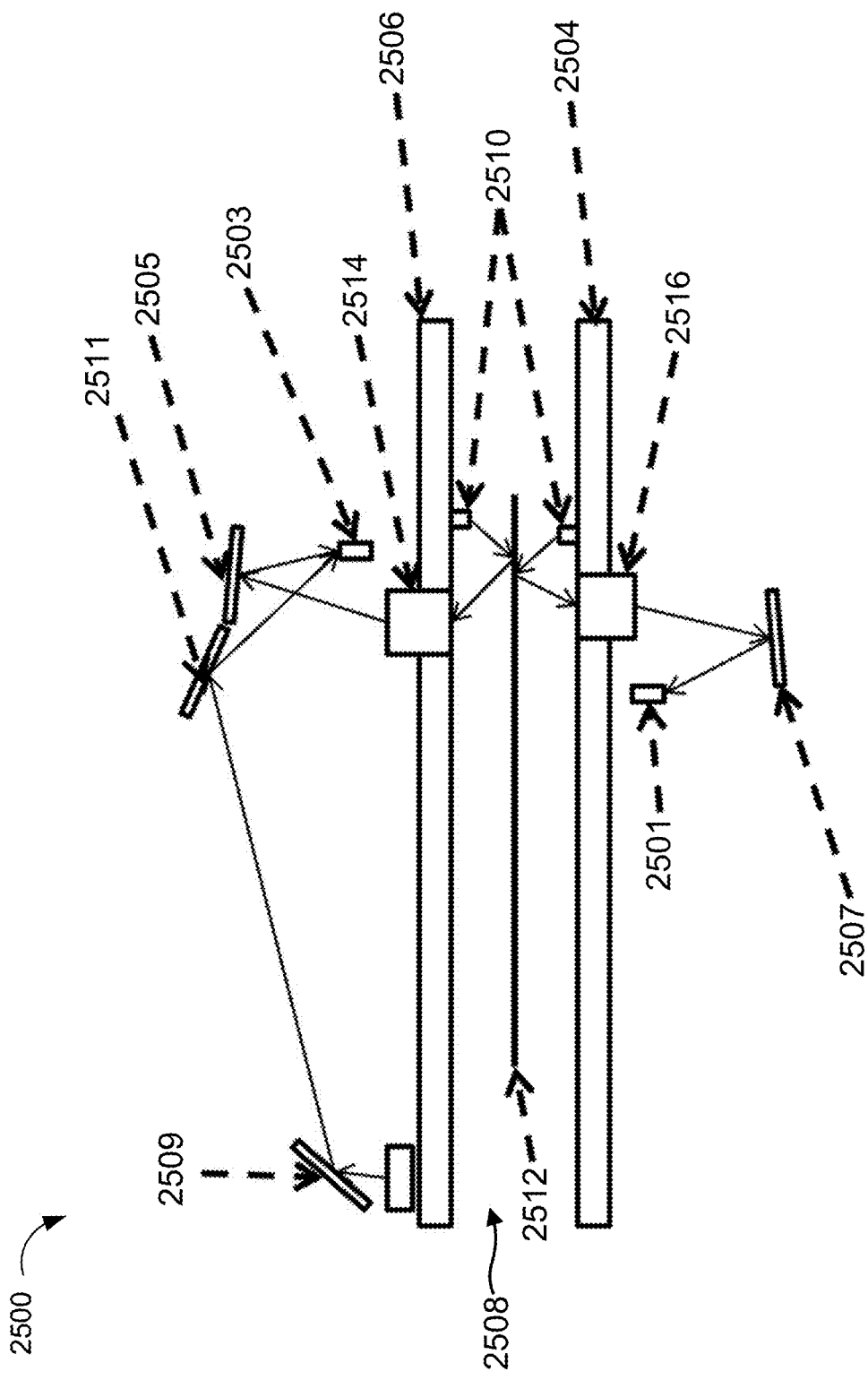
FIG. 25 illustrates a diagrammatic view of a banknote detection system in accordance with various embodiments of the present disclosure.

FIG. 25 illustrates a diagrammatic view of a banknote detection system 2500 in accordance with various embodiments of the present disclosure. Banknote detection systems can come in a wide variety of configurations, and FIG. 25 does not limit the scope of this disclosure to any particular implementation of a banknote detection system. The banknote detection system 2500 includes a banknote path 2508 that can be formed within a banknote validator to transport a banknote 2512 through an interior of the banknote validator. Light sources 2510 emit light to illuminate the banknote 2512 in the banknote path 2508 for imaging. A first banknote detection surface 2509 is disposed above the banknote path 2508 near a front of the banknote path 2508 where the banknote 2512 enters the banknote path 2508. Images of the banknote are provided by the first banknote detection surface 2509 to a second banknote detection surface 2511 disposed above and further down the banknote path 2508, the second banknote detection surface 2511 providing an image of the banknote 2512 to a first camera or image sensor 2503 disposed below the second banknote detection surface 2511, as described herein.

A third banknote detection surface 2505 positioned above the first camera or image sensor 2503 and above the banknote path 2508 to also provide images of the banknote 2512 to the first camera or image sensor 2503. A first lens 2514 is disposed through a first PCB 2506 in a top portion of the banknote path 2508. The first lens 2514 is disposed below the third banknote detection surface 2505 such that images of the banknote 2512 viewed by the first camera or image sensor 2503 are first passed through the first lens 2514. A similar configuration is provided for a second camera or image sensor 2501. The second camera or image sensor 2501 has a fourth banknote detection surface 2507 disposed below the banknote path 2508. A second lens 2516 is disposed through a second PCB 2504 in a bottom portion of the banknote path 2508. Images of the banknote 2512 viewed by the second camera or image sensor 2501 are first passed through the second lens 2516.

Banknotes can be about 100-150 microns in thickness, while the height of the banknote path can be more than 2 millimeters. As the banknote 2512 moves along the banknote path 2508, the banknote 2512 may move up or down during transportation or due to folds in the banknote 2512. Images of the banknote at or near the center accommodate this variation as the first or second cameras or image sensors 2503, 2501 can have a depth of field that is larger than the height of the banknote path 2508. Near or at the edges of the banknote 2512, images of the banknote 2512 moving up or down results in images moving in and out of pixels. The lenses 2514, 2516 serve to straighten the images and negates this edge effect. The improved images at the edges of the banknote 2512 also assists with the stitching processes as described herein, since the lenses 2514, 2516 provide improved images. Pixels at the edge are more uniform compared to images taken without a lens, resulting in better stitching, OCR, or other processing.

Figure 26:
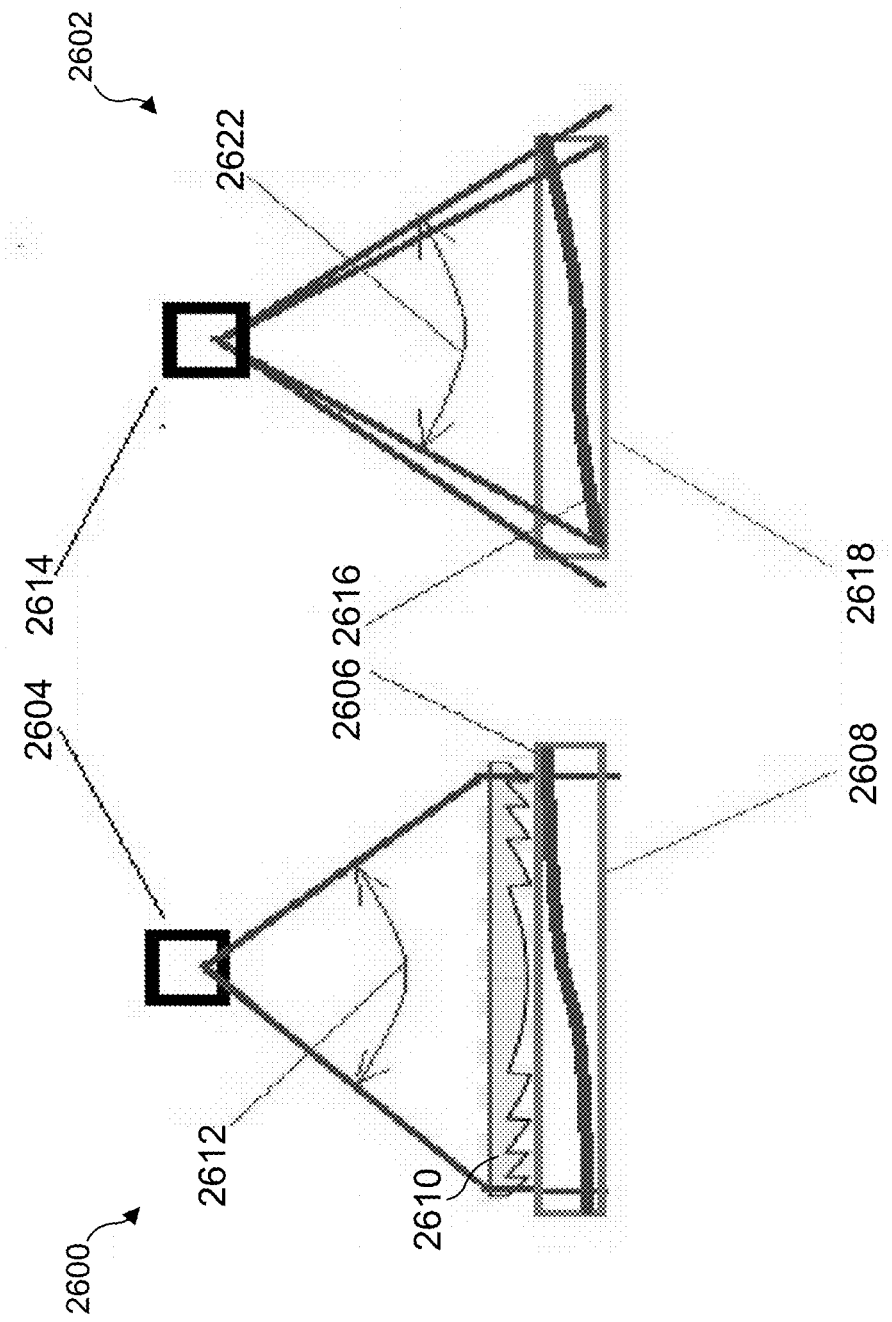
FIG. 26 illustrates an example of a camera or image sensor and lens system with a comparable camera or image sensor system without a lens, in accordance with various embodiments of the present disclosure.

FIG. 26 illustrates an example of a camera or image sensor and lens system 2600 with a comparable camera or image sensor system 2602 without a lens, in accordance with various embodiments of the present disclosure. Camera or image sensor and lens systems can come in a wide variety of configurations, and FIG. 25 does not limit the scope of this disclosure to any particular implementation of a camera or image sensor and lens system. The camera or image sensor and lens system 2600 includes a camera or image sensor 2604 disposed above a banknote path 2608. The camera or image sensor 2604 captures images of a banknote 2606 through a lens 2610. The lens 2610 is disposed between the camera or image sensor 2602 and the banknote path 2608. The lens 2610 causes a camera or image sensor view 2612 of the camera or image sensor 2604 to be unchanged by the height of the banknote 2606, even when edges of the banknote 2606 moves up or down as the banknote 2606 travels through the banknote path 2608.

The camera or image sensor system 2602 is illustrated for comparison. The camera or image sensor system 2602 includes a camera or image sensor 2614 disposed above a banknote path 2618. The camera or image sensor 2614 is configured to capture images of a banknote 2616 in the banknote path 2618. As illustrated in FIG. 26, a camera or image sensor view 2622 of the camera or image sensor 2614 changes at the edges of the banknote 2616 depending on the height of the banknote 2616. If the edges of the banknote 2616 move up or down as the banknote 2616 travels through the banknote path 2618 images of the banknote 2616 can move in and out of the in and out of the pixels, reducing accuracy of stitching, OCR, or other processes performed on the images.

Figure 27:
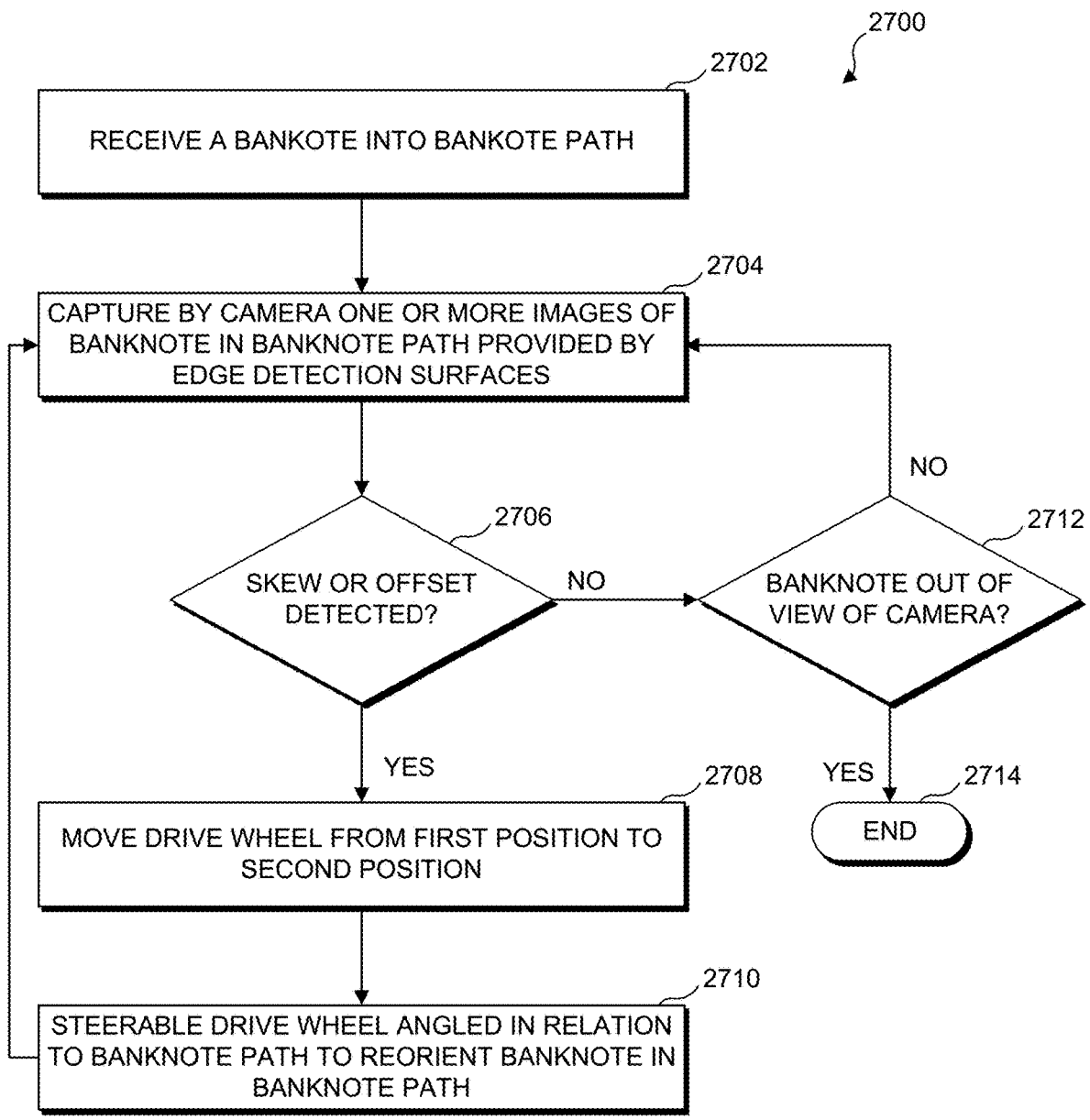
FIG. 27 illustrates a flow diagram of a banknote detection and steering process in accordance with various embodiments of the present disclosure.

FIG. 27 illustrates a flow diagram of a banknote detection and steering process 2700 in accordance with various embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 27 can be performed by a currency handling apparatus and/or a note validator, such as the currency handling apparatus 100 and/or the note validator 102 in FIGS. 1A and 1B, and can be performed as part of any embodiments of the banknote imaging and steering systems disclosed herein. The process can also be controlled or executed by a processor, such as the processor 2404.

At block 2702, a banknote is received into a banknote path, the banknote to be transported through a currency handling apparatus and/or a banknote validator, or another device. At block 2704, a camera or image sensor captures one or more images of the banknote in the banknote path, the images being provided by edge detection surfaces such as edge detection surfaces 209, 210 disclosed herein. At decision block 2706, the camera or image sensor or the processor determines if a skew or offset of the banknote is detected in relation to the banknote path based on the captured images of the edges of the banknote. If a skew or offset is detected, at block 2708, a steerable drive wheel as disclosed herein is moved from a first position to a second position. In some embodiments, the steerable drive wheel can be moved without a steering arm, such as be directly steering the wheel or using magnetic levitation to guide the steering wheel to a specific orientation. At block 2710, as a result of moving the steering arm to the second position, the steerable drive wheel is angled in relation to the banknote path. Angling the steerable drive wheel in relation to the banknote path reorients the banknote in the banknote path to correct the skew or offset of the banknote.

The process 2700 then flows back to block 2704, the camera or image sensor capturing one or more images of the banknote. The process can then be repeated to attempt to continuously correct the skew or offset of the banknote while the banknote is in view of the camera or image sensor and in contact with the steerable drive wheel. If at decision block 2706 the camera or image sensor or the processor determines that no skew or offset is detected, the process 2700 flows to decision block 2712. At decision block 2712, the camera or image sensor or the processor determines if the banknote is out of view of the camera or image sensor. If the banknote is not out of view of the camera or image sensor, the process 2700 flows back to block 2704 to capture more images of the banknote. While the banknote remains in view of the camera or image sensor and in contact with the steerable drive wheel, the process 2700 can repeat to continuously reorient the banknote in the banknote path. If at decision block 2712 the camera or image sensor or the processor determines that the banknote is out of view of the camera or image sensor, the process 2700 ends at block 2714, since the banknote has now traveled beyond the steerable drive wheel. It will be understood that process 2700 can be performed repeatedly as banknotes are received into the banknote path at block 2702, the receipt of the banknote into the banknote path at block 2704 triggering the remainder of the process 2700.

Figure 28:
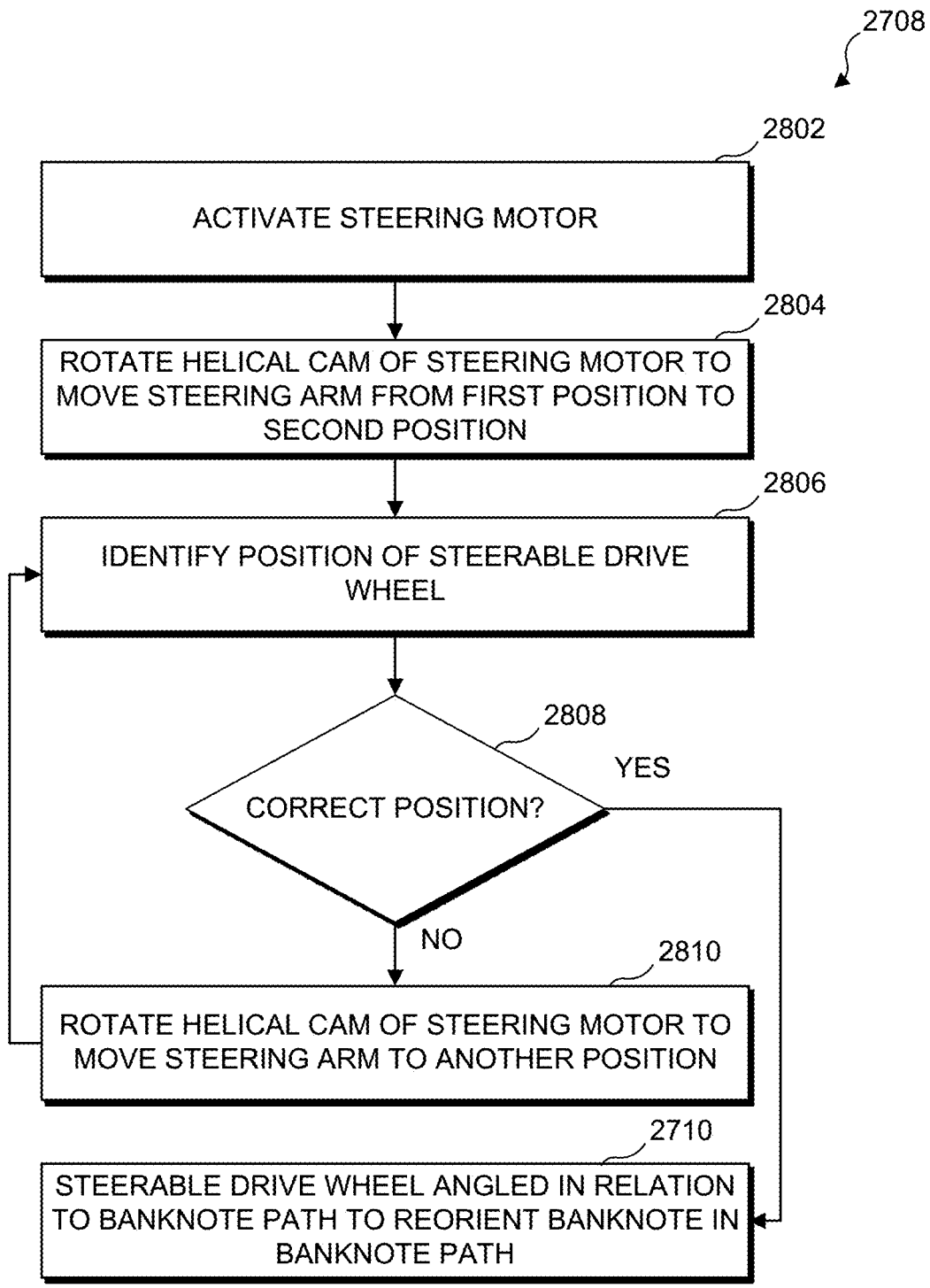
FIG. 28 illustrates a flow diagram of one embodiment of a steering process in accordance with various embodiments of the present disclosure.

FIG. 28 illustrates a flow diagram of one embodiment of a steering process 2708 in accordance with various embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 28 can be performed by a currency handling apparatus and/or a note validator, such as the currency handling apparatus 100 and/or the note validator 102 in FIGS. 1A and 1B, and can be performed as part of any embodiments of the banknote imaging and steering systems disclosed herein. The process can also be controlled or executed by a processor, such as the processor 2404.

The process 2708 is performed as part of block 2708 in FIG. 27 to move the steering arm from the first position and the second position. In the embodiment illustrated in FIG. 28, the process 2708 is performed by a steering motor such as that disclosed in FIG. 10 herein. At block 2802, the steering motor is activated in response to a detection of a skew or offset of a banknote in the banknote path. At block 2804, a helical cam of the steering motor coupled to the steering arm rotates to move the steering arm from the first position to the second position, which in turn moves the steerable drive wheel in the banknote path. At block 2806 a position sensor identifies the position of the steerable drive wheel. At decision block 2808, the position sensor or the processor determines if the steerable drive wheel is in the correct position to properly reorient the banknote in the banknote path.

If the steerable drive wheel is not in the correct position, at block 2810 the helical cam of the steering motor is rotated to move the steering arm to another position. The process 2708 then flows back to block 2806 to identify the position new position of the steerable drive wheel, and to determine if the new position is correct at decision block 2808. If at decision block 2808 the position sensor or the processor determines that the position of the steerable drive wheel is correct, the process 2708 flows to block 2710. At block 2710, as a result of moving the steering arm to the second position, the steerable drive wheel is angled in relation to the banknote path. Angling the steerable drive wheel in relation to the banknote path reorients the banknote in the banknote path to correct the skew or offset of the banknote.

Figure 29:
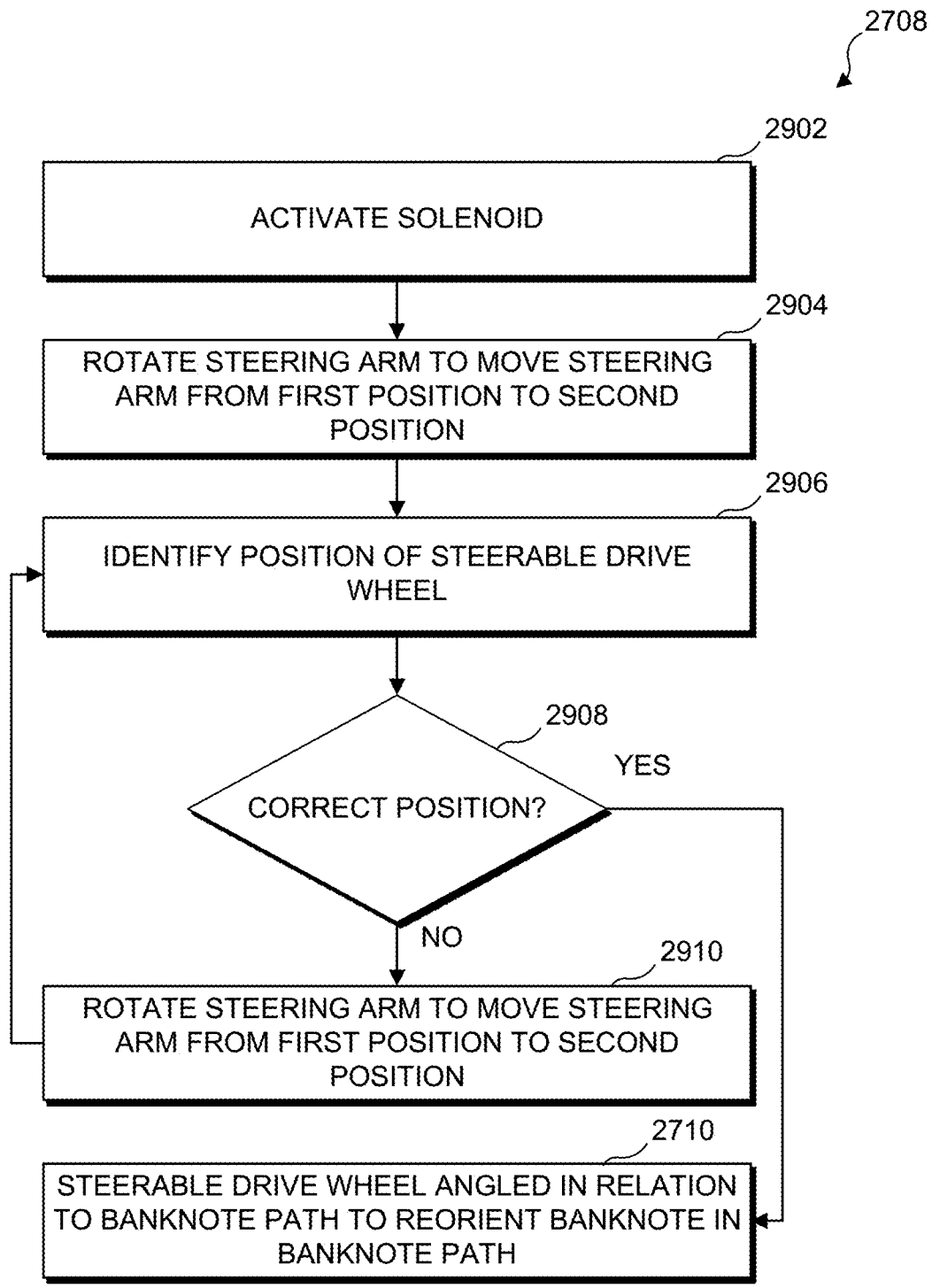
FIG. 29 illustrates a flow diagram of one embodiment of a steering process in accordance with various embodiments of the present disclosure.

FIG. 29 illustrates a flow diagram of one embodiment of a steering process 2708 in accordance with various embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 29 can be performed by a currency handling apparatus and/or a note validator, such as the currency handling apparatus 100 and/or the note validator 102 in FIGS. 1A and 1B, and can be performed as part of any embodiments of the banknote imaging and steering systems disclosed herein. The process can also be controlled or executed by a processor, such as the processor 2404.

The process 2708 is performed as part of block 2708 in FIG. 27 to move the steering arm from the first position and the second position. In the embodiment illustrated in FIG. 29, the process 2708 is performed by the solenoid or the electromagnetic actuator assembly such as that disclosed in FIG. 11 herein. At block 2902, an electromagnetic actuator or a solenoid is activated in response to a detection of a skew or offset of a banknote in the banknote path. At block 2904, activation of the electromagnetic actuator or solenoid rotates the steering arm from the first position to the second position, which in turn moves the steerable drive wheel in the banknote path. The steering arm can be rotated for example by the electromagnetic actuator or solenoid, moving a solenoid arm coupled between the electromagnetic actuator or solenoid and the steering arm, as described herein. At block 2906 a position sensor identifies the position of the steerable drive wheel. At decision block 2908, the position sensor or the processor determines if the steerable drive wheel is in the correct position to properly reorient the banknote in the banknote path.

If the steerable drive wheel is not in the correct position, at block 2910 the steering arm is moved to another position. The process 2708 then flows back to block 2906 to identify the position new position of the steerable drive wheel, and to determine if the new position is correct at decision block 2908. If at decision block 2908 the position sensor or the processor determines that the position of the steerable drive wheel is correct, the process 2708 flows to block 2710. At block 2710, as a result of moving the steering arm to the second position, the steerable drive wheel is angled in relation to the banknote path. Angling the steerable drive wheel in relation to the banknote path reorients the banknote in the banknote path to correct the skew or offset of the banknote.

Figure 30:
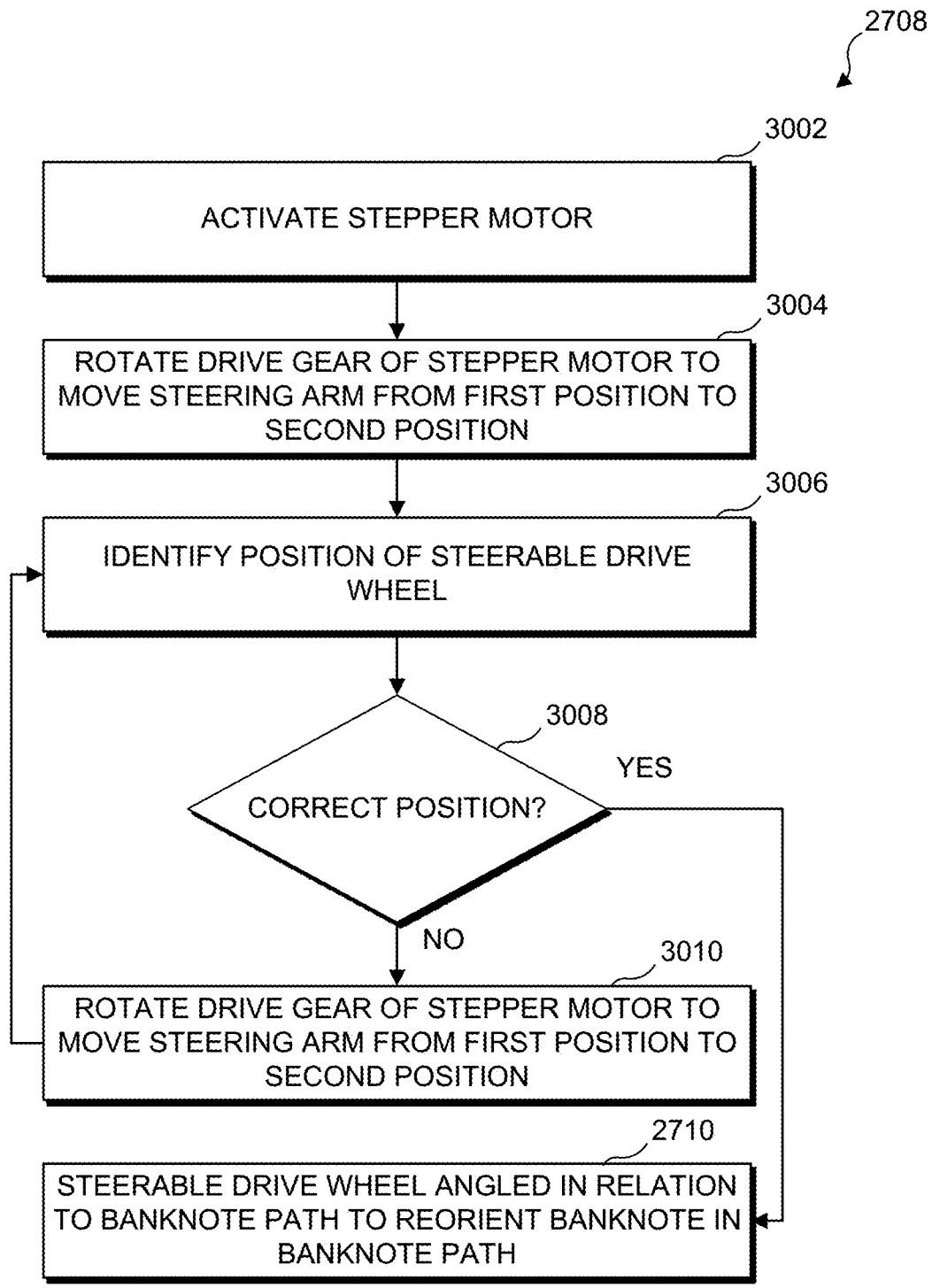
FIG. 30 illustrates a flow diagram of one embodiment of a steering process in accordance with various embodiments of the present disclosure.

FIG. 30 illustrates a flow diagram of one embodiment of a steering process 2708 in accordance with various embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 30 can be performed by a currency handling apparatus and/or a note validator, such as the currency handling apparatus 100 and/or the note validator 102 in FIGS. 1A and 1B, and can be performed as part of any embodiments of the banknote imaging and steering systems disclosed herein. The process can also be controlled or executed by a processor, such as the processor 2404.

The process 2708 is performed as part of block 2708 in FIG. 27 to move the steering arm from the first position and the second position. In the embodiment illustrated in FIG. 30, the process 2708 is performed by a stepper motor such as that disclosed in FIG. 10 herein. At block 3002, the stepper motor is activated in response to a detection of a skew or offset of a banknote in the banknote path. At block 3004, a drive gear of the stepper motor meshed with the steering arm rotates to move the steering arm from the first position to the second position, which in turn moves the steerable drive wheel in the banknote path. At block 3006 a position sensor identifies the position of the steerable drive wheel. At decision block 3008, the position sensor or the processor determines if the steerable drive wheel is in the correct position to properly reorient the banknote in the banknote path.

If the steerable drive wheel is not in the correct position, at block 3010 the drive gear of the stepper motor is rotated to move the steering arm to another position. The process 2708 then flows back to block 3006 to identify the position new position of the steerable drive wheel, and to determine if the new position is correct at decision block 3008. If at decision block 3008 the position sensor or the processor determines that the position of the steerable drive wheel is correct, the process 2708 flows to block 2710. At block 2710, as a result of moving the steering arm to the second position, the steerable drive wheel is angled in relation to the banknote path. Angling the steerable drive wheel in relation to the banknote path reorients the banknote in the banknote path to correct the skew or offset of the banknote.

Figure 31:
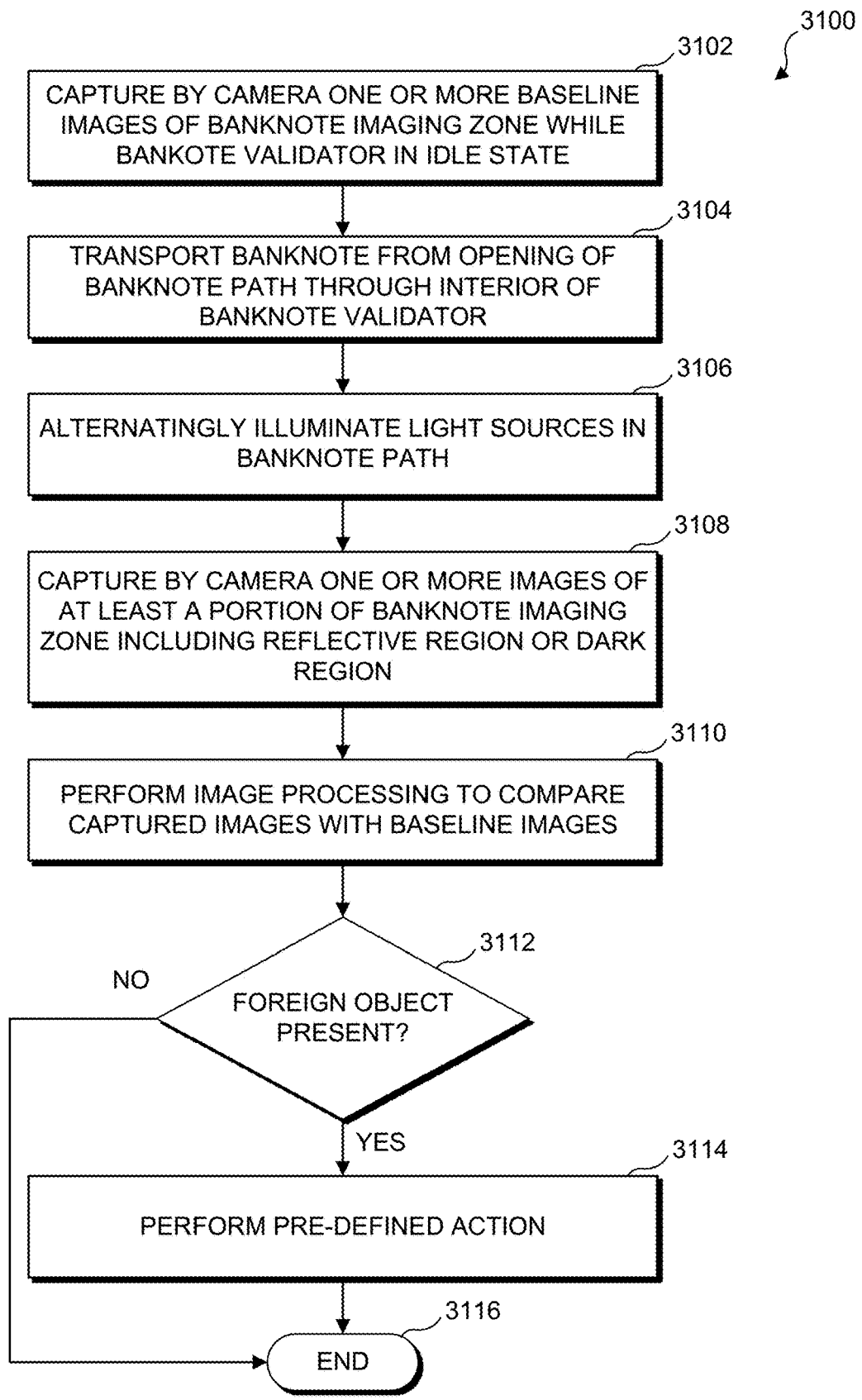
FIG. 31 illustrates a flow diagram of one embodiment of a foreign object detection process in accordance with various embodiments of the present disclosure.

FIG. 31 illustrates a flow diagram of one embodiment of a foreign object detection process 3100 in accordance with various embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 31 can be performed by a currency handling apparatus and/or a note validator, such as the currency handling apparatus 100 and/or the note validator 102 in FIGS. 1A and 1B, and can be performed as part of any embodiments of the banknote imaging and foreign object detection systems disclosed herein. The process can also be controlled or executed by a processor, such as the processor 2404.

At block 3102, a camera or image sensor captures one or more baseline images of a banknote imaging zone of a banknote path while the banknote validator, or other machine in which the process 3100 is being performed, is in an idle state. The idle state is a state such as when no banknotes are currently being transported through the machine. The baseline images thus provide for images that do not include any banknotes or other objects in the banknote imaging zone. At block 3104, a banknote is received and transported form an opening of a banknote path through an interior of the banknote validator. At block 3106, light sources in the banknote path can be alternatingly illuminated across the width of the banknote path, which can cause a shadow of a foreign object to appear in different positions in the banknote path. This assists with foreign object detection by allowing the shadow of the foreign object to be detected by the image sensor at different areas of the banknote path.

At block 3108, the camera or image sensor captures one or more images of at least a portion of the banknote imaging zone. The banknote imaging zone can include a reflective region or a dark region, or both, as disclosed herein, for detecting foreign objects of different colors and transparency. At block 3110, image processing is performed to compare the captured one or more images to the baseline images. At decision block 3112, the camera or image sensor or the processor determines if a foreign object is present in the one or more images. If so, the camera or image sensor or the processor performs a pre-defined action, such as ejecting the banknote and the foreign object from the banknote validator. The process 3100 ends at block 3116, either upon performance of the pre-defined action at block 3114, or if at decision block 3112 the camera or image sensor or the processor determines that no foreign object is present.

Figure 32:
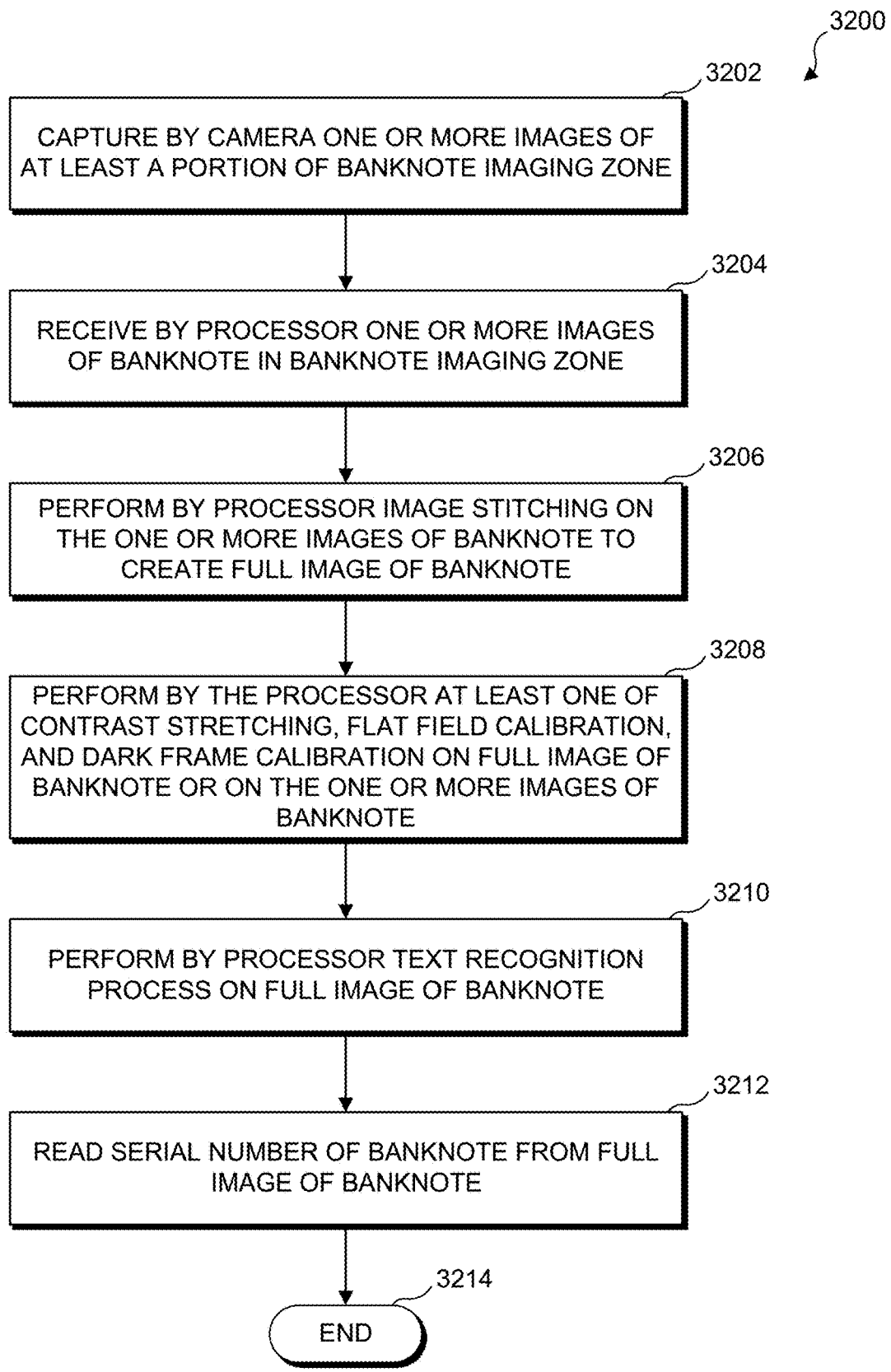
FIG. 32 illustrates a flow diagram of one embodiment of an image processing process in accordance with various embodiments of the present disclosure.

FIG. 32 illustrates a flow diagram of one embodiment of an image processing process 3200 in accordance with various embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 32 can be performed by a currency handling apparatus and/or a note validator, such as the currency handling apparatus 100 and/or the note validator 102 in FIGS. 1A and 1B, and can be performed as part of any embodiments of the banknote imaging systems disclosed herein. The process can also be controlled or executed by a processor, such as the processor 2404.

At block 3202, a camera or image sensor captures one or more images of at least a portion of a banknote imaging zone, in which a banknote can be imaged. At block 3204, the processor receives the one or more images of the banknote in the banknote imaging zone. At block 3206, the processor performs image stitching on the one or more images to create a full image of the banknote, as described herein. At block 3208, the processor can perform at least one of contrast stretching, flat field calibration, or dark frame calibration to improve the image quality of either the one or more images of the banknote in the banknote imaging zone, or of the full stitched image of the banknote. At block 3210, the processor performs a text recognition process, such as OCR, on the full image of the banknote, so that text on the banknote can be read by the processor. At block 3212, the processor reads the serial number of the banknote from the full image of the banknote, and performs other actions based on the serial number as disclosed herein. The process then ends at block 3214.

Figure 33:
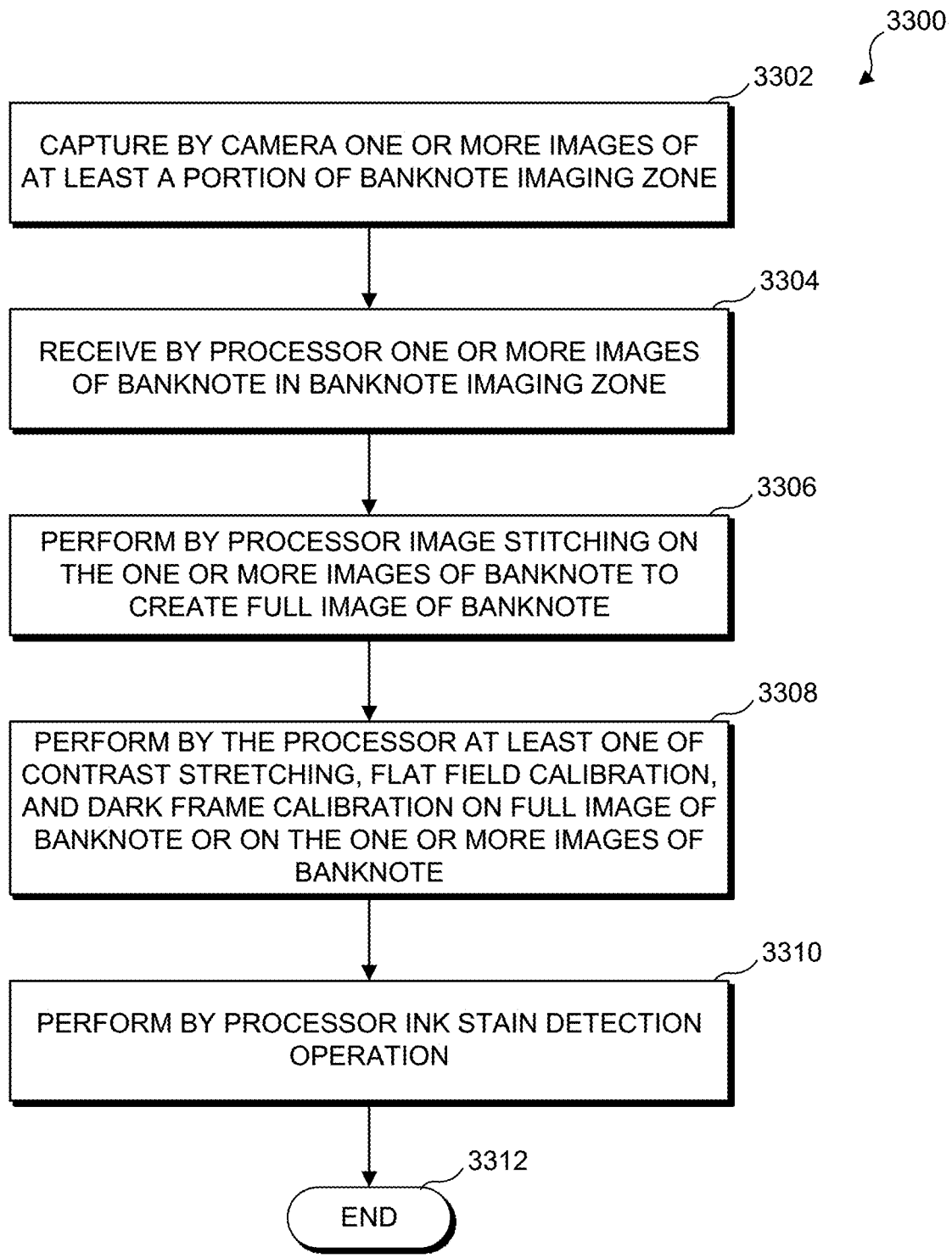
FIG. 33 illustrates a flow diagram of one embodiment of an image processing process 3300 in accordance with various embodiments of the present disclosure.

FIG. 33 illustrates a flow diagram of one embodiment of an image processing process 3300 in accordance with various embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 33 can be performed by a currency handling apparatus and/or a note validator, such as the currency handling apparatus 100 and/or the note validator 102 in FIGS. 1A and 1B, and can be performed as part of any embodiments of the banknote imaging systems disclosed herein. The process can also be controlled or executed by a processor, such as the processor 2404.

At block 3302, a camera or image sensor captures one or more images of at least a portion of a banknote imaging zone, in which a banknote can be imaged. At block 3304, the processor receives the one or more images of the banknote in the banknote imaging zone. At block 3306, the processor performs image stitching on the one or more images to create a full image of the banknote, as described herein. At block 3308, the processor can perform at least one of contrast stretching, flat field calibration, or dark frame calibration to improve the image quality of either the one or more images of the banknote in the banknote imaging zone, or of the full stitched image of the banknote. At block 3310, the processor performs an ink stain detection operation. The ink stain detection operation determines if the banknote has been stolen, impounded, or is otherwise fraudulent. If the ink stain detection operation determines that the banknote is fraudulent, the apparatus 100 can process the banknote according to location jurisdictional requirements. For example, the apparatus 100 can take the banknote and provide no credit to the customer, reject the banknote, or alert an operator. The process then ends at block 3312.

Figure 34:
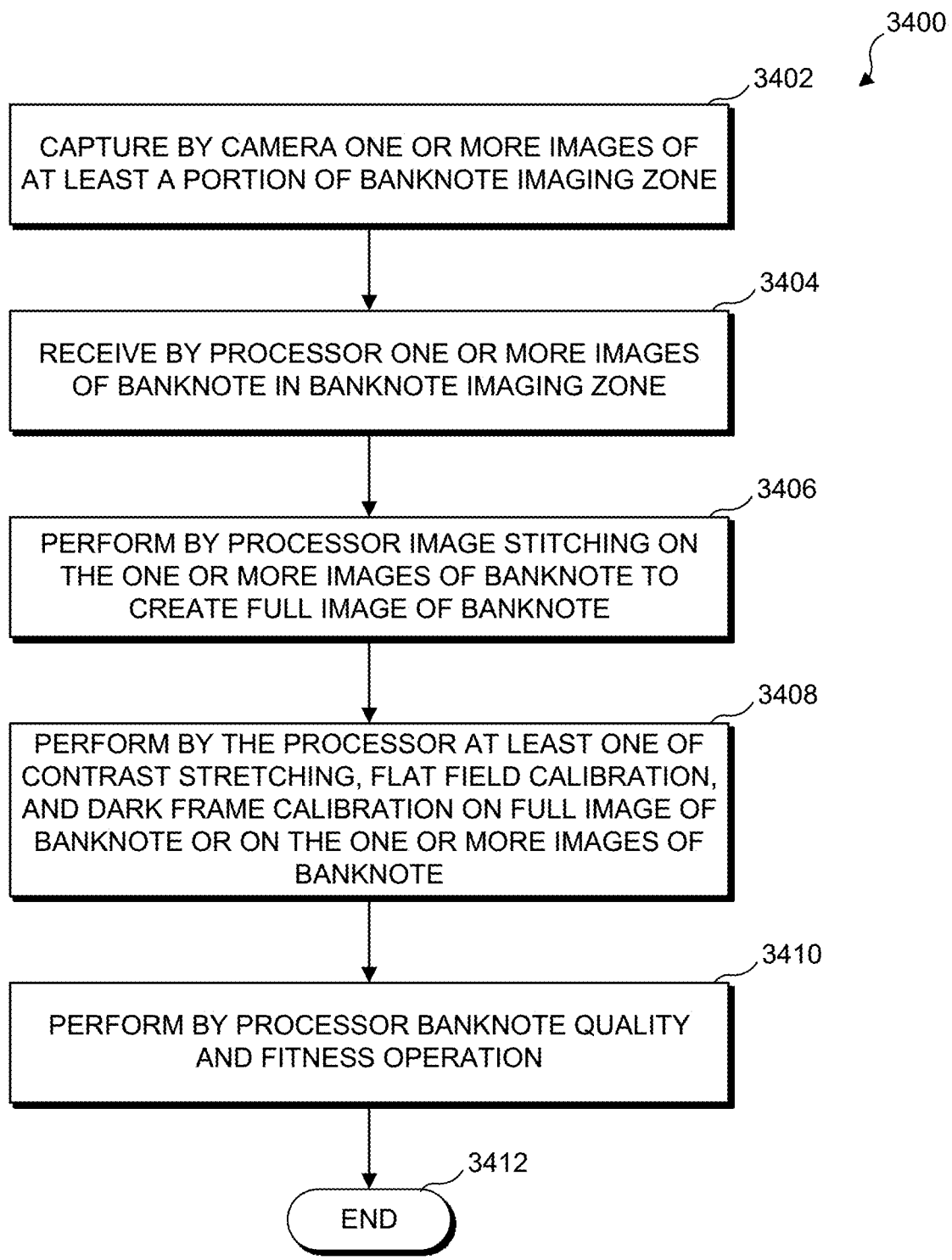
FIG. 34 illustrates a flow diagram of one embodiment of an image processing process in accordance with various embodiments of the present disclosure.

FIG. 34 illustrates a flow diagram of one embodiment of an image processing process 3400 in accordance with various embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 34 can be performed by a currency handling apparatus and/or a note validator, such as the currency handling apparatus 100 and/or the note validator 102 in FIGS. 1A and 1B, and can be performed as part of any embodiments of the banknote imaging systems disclosed herein. The process can also be controlled or executed by a processor, such as the processor 2404.

At block 3402, a camera or image sensor captures one or more images of at least a portion of a banknote imaging zone, in which a banknote can be imaged. At block 3404, the processor receives the one or more images of the banknote in the banknote imaging zone. At block 3406, the processor performs image stitching on the one or more images to create a full image of the banknote, as described herein. At block 3408, the processor can perform at least one of contrast stretching, flat field calibration, or dark frame calibration to improve the image quality of either the one or more images of the banknote in the banknote imaging zone, or of the full stitched image of the banknote. At block 3410, the processor performs a banknote quality and fitness operation. The banknote quality and fitness operation determines if the banknote is of low quality, such as if the banknote is wrinkled, torn, or in other conditions. If the banknote quality and fitness operation determines that the banknote is in poor condition, the apparatus 100 can process the banknote according to location jurisdictional requirements. For example, the apparatus 100 can take the banknote, store it in a separate storage unit, and provide full or partial credit to the customer. The apparatus 100 can also reject the banknote, or alert an operator. The process then ends at block 3412.

In one example embodiment, a banknote validator comprises a banknote path formed within an interior of the banknote validator to transport a banknote from an opening of the banknote path through the interior of the banknote validator, one or more banknote edge detection surfaces each configured to provide images of edges of a banknote in the banknote path, a camera or image sensor configured to capture the images of the edges of the banknote provided by the one or more banknote edge detection surfaces, a steerable drive wheel at least partially disposed within the banknote path, the steerable drive wheel operable to reorient a banknote in the banknote path, wherein the steerable drive wheel is operable to move from a first position to a second position to angle the steerable drive wheel in relation to the banknote path.

In one or more of the above examples, a helical cam coupled to a steering arm that is coupled to the steerable drive wheel, the helical cam operable to rotate on a motor shaft coupled to a steering motor, wherein, upon activation of the steering motor, rotating the helical cam causes the steering arm and the steerable drive wheel to move from the first position to the second position to reorient the banknote in the banknote path.

In one or more of the above examples, the steering motor is activated based on a detection by the camera or image sensor of a skew or offset of the banknote in relation to the banknote path.

In one or more of the above examples, the banknote validator further comprises a position sensor configured to identify a position of the steerable drive wheel, wherein the steering motor is activated based on the identified position of the steerable drive wheel to move the steering arm to another position.

In one or more of the above examples, the banknote validator further comprises an electromagnetic actuator disposed adjacent a steering arm that is coupled to the steerable drive wheel, and an arm coupled to the electromagnetic actuator and coupled to the steering arm, the arm operable to, upon activation of the electromagnetic actuator, rotate the steering arm, wherein, rotating the steering arm causes the steering arm and the steerable drive wheel to move from the first position to the second position to reorient the banknote in the banknote path.

In one or more of the above examples, the electromagnetic actuator is activated based on a detection by the camera or image sensor of a skew or offset of the banknote in relation to the banknote path.

In one or more of the above examples, the banknote validator further comprises a position sensor configured to identify a position of the steerable drive wheel, wherein the electromagnetic actuator is activated based on the identified position of the steerable drive wheel to move the steering arm to another position.

In one or more of the above examples, the banknote validator further comprises a drive gear operable to mesh with a plurality of teeth of a steering arm that is coupled to the steerable drive wheel, and a stepper motor coupled to the drive gear and operable to rotate the drive gear, wherein, upon activation of the stepper motor, rotating the drive gear causes the steering arm and the steerable drive wheel to move from the first position to the second position to reorient the banknote in the banknote path.

In one or more of the above examples, the stepper motor is activated based on a detection by the camera or image sensor of a skew or offset of the banknote in relation to the banknote path.

In one or more of the above examples, the banknote validator further comprises a position sensor configured to identify a position of the steerable drive wheel, wherein the stepper motor is activated based on the identified position of the steerable drive wheel to move the steering arm to another position.

In another example embodiment, a method of a banknote validator comprises reorienting a banknote in a banknote path, wherein the banknote path is formed within an interior of the banknote validator, and wherein reorienting the banknote in the banknote path includes capturing by a camera or image sensor one or more images of edges of a banknote in the banknote path, the one or more images provided by one or more edge detection surfaces, controlling a steerable drive wheel to move from a first position to a second position, and angling, as a result of moving the steerable drive wheel from the first position to the second position, the steerable drive wheel in relation to the banknote path, and transporting the banknote from an opening of the banknote path through an interior of the banknote validator.

In one or more of the above examples, a helical cam is coupled to a steering arm that is coupled to the steerable drive wheel, the helical cam is coupled to a motor shaft, and the motor shaft is coupled to a steering motor, and wherein reorienting the banknote in the banknote path further includes rotating the helical cam upon activation of the steering motor, causing the steering arm and the steerable drive wheel to move from the first position to the second position.

In one or more of the above examples, reorienting the banknote in the banknote path further includes detecting by the camera or image sensor a skew or offset of the banknote in relation to the banknote path, and activating the steering motor based on the detection of the skew or offset to rotate the helical cam.

In one or more of the above examples, reorienting the banknote in the banknote path further includes identifying by a position sensor a position of the steerable drive wheel, and activating the steering motor based on the identified position of the steerable drive wheel to move the steering arm to another position.

In one or more of the above examples, an electromagnetic actuator is disposed adjacent to a steering arm that is coupled to the steerable drive wheel, and a arm is coupled to the electromagnetic actuator and to the steering arm, and wherein reorienting the banknote in the banknote path further includes rotating the steering arm upon activation of the electromagnetic actuator, causing the steering arm and the steerable drive wheel to move from the first position to the second position.

In one or more of the above examples, reorienting the banknote in the banknote path further includes detecting by the camera or image sensor a skew or offset of the banknote in relation to the banknote path; and activating the electromagnetic actuator based on the detection of the skew or offset to rotate the steering arm.

In one or more of the above examples, reorienting the banknote in the banknote path further includes identifying by a position sensor a position of the steerable drive wheel, and activating the electromagnetic actuator based on the identified position of the steerable drive wheel to move the steering arm to another position.

In one or more of the above examples, a steering arm that is coupled to the steerable drive wheel includes a plurality of teeth meshed with a drive gear, and a stepper motor coupled to the drive gear, and wherein reorienting the banknote in the banknote path further includes rotating the drive gear upon activation of the stepper motor, causing the steering arm and the steerable drive wheel to move from the first position to the second position.

In one or more of the above examples, reorienting the banknote in the banknote path further includes detecting by the camera or image sensor a skew or offset of the banknote in relation to the banknote path, and activating the stepper motor based on the detection of the skew or offset to rotate the drive gear.

In one or more of the above examples, reorienting the banknote in the banknote path further includes identifying by a position sensor a position of the steerable drive wheel, and activating the stepper motor based on the identified position of the steerable drive wheel to move the steering arm to another position.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A banknote validator, comprising:
   a banknote path formed within an interior of the banknote validator to transport a banknote from an opening of the banknote path through the interior of the banknote validator;
   a plurality of banknote edge detection surfaces each configured to provide images of edges of the banknote in the banknote path, wherein a first one of the plurality of banknote edge detection surfaces is disposed near an entrance to the banknote path and adjacent a left side of the banknote path, and wherein a second one of the plurality of banknote edge detection surfaces is disposed near the entrance to the banknote path adjacent a right side of the banknote path;
   an image sensor configured to capture the images of the edges of the banknote provided by the plurality of banknote edge detection surfaces; and
   a steerable drive wheel at least partially disposed within the banknote path, the steerable drive wheel operable to reorient the banknote in the banknote path, wherein the steerable drive wheel is operable to move from a first position to a second position to angle the steerable drive wheel in relation to the banknote path.

2. The banknote validator of claim 1, further comprising:
a helical cam coupled to a steering arm that is coupled to the steerable drive wheel, the helical cam operable to rotate on a motor shaft coupled to a steering motor, wherein, upon activation of the steering motor, rotating the helical cam causes the steering arm and the steerable drive wheel to move from the first position to the second position to reorient the banknote in the banknote path.

3. The banknote validator of claim 2, wherein the steering motor is activated based on a detection by the image sensor of a skew or an offset of the banknote in relation to the banknote path.

4. The banknote validator of claim 3, further comprising:
a position sensor configured to identify a position of the steerable drive wheel, wherein the steering motor is activated based on the identified position of the steerable drive wheel to move the steering arm to another position.

5. The banknote validator of claim 1, further comprising:
an electromagnetic actuator disposed adjacent a steering arm that is coupled to the steerable drive wheel; and
an arm coupled to the electromagnetic actuator and coupled to the steering arm, the arm operable to, upon activation of the electromagnetic actuator, rotate the steering arm,
wherein, rotating the steering arm causes the steering arm and the steerable drive wheel to move from the first position to the second position to reorient the banknote in the banknote path.

6. The banknote validator of claim 5, wherein the electromagnetic actuator is activated based on a detection by the image sensor of a skew or an offset of the banknote in relation to the banknote path.

7. The banknote validator of claim 6, further comprising:
a position sensor configured to identify a position of the steerable drive wheel, wherein the electromagnetic actuator is activated based on the identified position of the steerable drive wheel to move the steering arm to another position.

8. The banknote validator of claim 1, further comprising:
a drive gear operable to mesh with a plurality of teeth of a steering arm that is coupled to the steerable drive wheel; and
a stepper motor coupled to the drive gear and operable to rotate the drive gear,
wherein, upon activation of the stepper motor, rotating the drive gear causes the steering arm and the steerable drive wheel to move from the first position to the second position to reorient the banknote in the banknote path.

9. The banknote validator of claim 8, wherein the stepper motor is activated based on a detection by the image sensor of a skew or an offset of the banknote in relation to the banknote path.

10. The banknote validator of claim 9, further comprising:
a position sensor configured to identify a position of the steerable drive wheel, wherein the stepper motor is activated based on the identified position of the steerable drive wheel to move the steering arm to another position.

11. A method of a banknote validator, comprising:
reorienting a banknote in a banknote path, wherein the banknote path is formed within an interior of the banknote validator, and wherein reorienting the banknote in the banknote path includes:
capturing by an image sensor one or more images of edges of the banknote in the banknote path, the one or more images provided by a plurality of edge detection surfaces, wherein a first one of the plurality of edge detection surfaces is disposed near an entrance to the banknote path and adjacent a left side of the banknote path, and wherein a second one of the plurality of edge detection surfaces is disposed near the entrance to the banknote path adjacent a right side of the banknote path;
controlling a steerable drive wheel to move from a first position to a second position; and
angling, as a result of moving the steerable drive wheel from the first position to the second position, the steerable drive wheel in relation to the banknote path; and
transporting the banknote from an opening of the banknote path through the interior of the banknote validator.

12. The method of claim 11, wherein a helical cam is coupled to a steering arm that is coupled to the steerable drive wheel, the helical cam is coupled to a motor shaft, and the motor shaft is coupled to a steering motor, and wherein reorienting the banknote in the banknote path further includes:
rotating the helical cam upon activation of the steering motor, causing the steering arm and the steerable drive wheel to move from the first position to the second position.

13. The method of claim 12, wherein reorienting the banknote in the banknote path further includes:
detecting by the image sensor a skew or an offset of the banknote in relation to the banknote path; and
activating the steering motor based on the detection of the skew or the offset to rotate the helical cam.

14. The method of claim 13, wherein reorienting the banknote in the banknote path further includes:
identifying by a position sensor a position of the steerable drive wheel; and
activating the steering motor based on the identified position of the steerable drive wheel to move the steering arm to another position.

15. The method of claim 11, wherein an electromagnetic actuator is disposed adjacent to a steering arm that is coupled to the steerable drive wheel, and an arm is coupled to the electromagnetic actuator and to the steering arm, and wherein reorienting the banknote in the banknote path further includes:
rotating the steering arm upon activation of the electromagnetic actuator, causing the steering arm and the steerable drive wheel to move from the first position to the second position.

16. The method of claim 15, wherein reorienting the banknote in the banknote path further includes:
detecting by the image sensor a skew or an offset of the banknote in relation to the banknote path; and
activating the electromagnetic actuator based on the detection of the skew or the offset to rotate the steering arm.

17. The method of claim 16, wherein reorienting the banknote in the banknote path further includes:
identifying by a position sensor a position of the steerable drive wheel; and
activating the electromagnetic actuator based on the identified position of the steerable drive wheel to move the steering arm to another position.

18. The method of claim 11, wherein a steering arm that is coupled to the steerable drive wheel includes a plurality of teeth meshed with a drive gear, and a stepper motor coupled to the drive gear, and wherein reorienting the banknote in the banknote path further includes:
- rotating the drive gear upon activation of the stepper motor, causing the steering arm and the steerable drive wheel to move from the first position to the second position.

19. The method of claim 18, wherein reorienting the banknote in the banknote path further includes:
- detecting by the image sensor a skew or an offset of the banknote in relation to the banknote path; and
- activating the stepper motor based on the detection of the skew or the offset to rotate the drive gear.

20. The method of claim 19, wherein reorienting the banknote in the banknote path further includes:
- identifying by a position sensor a position of the steerable drive wheel; and
- activating the stepper motor based on the identified position of the steerable drive wheel to move the steering arm to another position.

21. A banknote validator, comprising:
- a banknote path formed within an interior of the banknote validator to transport a banknote from an opening of the banknote path through the interior of the banknote validator;
- a banknote edge detection surface disposed adjacent an entrance to the banknote path and configured to provide images of edges of the banknote in the banknote path;
- an image sensor configured to capture the images of the edges of the banknote provided by the banknote edge detection surface; and
- a steerable drive wheel disposed downstream in the banknote path from the banknote edge detection surface and at least partially disposed within the banknote path, wherein the steerable drive wheel is operable to move from a first position to a second position to angle the steerable drive wheel in relation to the banknote path to reorient the banknote in the banknote path.

22. The banknote validator of claim 21, further comprising:
- a drive gear operable to mesh with a plurality of teeth of a steering arm that is coupled to the steerable drive wheel; and
- a stepper motor coupled to the drive gear and operable to rotate the drive gear,
- wherein, upon activation of the stepper motor, rotating the drive gear causes the steering arm and the steerable drive wheel to move from the first position to the second position to reorient the banknote in the banknote path.

23. The banknote validator of claim 22, wherein the stepper motor is activated based on a detection by the image sensor of a skew or an offset of the banknote in relation to the banknote path.

24. The banknote validator of claim 23, further comprising:
- a position sensor configured to identify a position of the steerable drive wheel, wherein the stepper motor is activated based on the identified position of the steerable drive wheel to move the steering arm to another position.

* * * * *